(12) United States Patent
Brink et al.

(10) Patent No.: US 12,473,547 B2
(45) Date of Patent: Nov. 18, 2025

(54) USE OF MESENCHYMAL LINEAGE PRECURSOR CELLS OR STEM CELLS (MLPSCs) FOR DELIVERY OF OLIGONUCLEOTIDES IN THE TREATMENT OF CANCER

(71) Applicant: Mesoblast International Sárl, Meyrin (CH)

(72) Inventors: Peter Brink, New York, NY (US); Ira Cohen, New York, NY (US); Richard Lin, New York, NY (US); Sergey Doronin, New York, NY (US); Irina Potapova, New York, NY (US); Virginijus Valiunas, New York, NY (US); Dan Devine, New York, NY (US); Anthony Sandrasagra, New York, NY (US); Nick Loizos, New York, NY (US); Silviu Itescu, Melbourne (AU)

(73) Assignee: Mesoblast International Sàrl, Meyrin (SE)

( * ) Notice: Subject to any disclaimer, the term of this patent is extended or adjusted under 35 U.S.C. 154(b) by 652 days.

(21) Appl. No.: 16/766,206

(22) PCT Filed: Nov. 21, 2018

(86) PCT No.: PCT/IB2018/001439
§ 371 (c)(1),
(2) Date: May 21, 2020

(87) PCT Pub. No.: WO2019/102268
PCT Pub. Date: May 31, 2019

(65) Prior Publication Data
US 2021/0163932 A1  Jun. 3, 2021

Related U.S. Application Data

(60) Provisional application No. 62/589,764, filed on Nov. 22, 2017.

(51) Int. Cl.
| | | |
|---|---|---|
| *C12N 15/113* | (2010.01) | |
| *A61K 35/28* | (2015.01) | |
| *A61K 38/45* | (2006.01) | |
| *A61P 35/00* | (2006.01) | |

(52) U.S. Cl.
CPC ............ *C12N 15/113* (2013.01); *A61K 35/28* (2013.01); *A61K 38/45* (2013.01); *A61P 35/00* (2018.01); *C12Y 204/01214* (2013.01); *C12N 2310/11* (2013.01); *C12N 2310/141* (2013.01); *C12N 2320/32* (2013.01)

(58) Field of Classification Search
CPC .............. C12N 15/113; C12N 2310/11; C12N 2310/141; C12N 2320/32; C12N 15/88; C12N 2310/14; C12N 2310/20; C12N 2501/65; C12N 2502/1358; C12N 2510/00; C12N 5/0663; C12N 5/0693; C12N 15/86; C12N 2750/14141; A61K 35/00; A61K 35/28; A61K 38/00; A61K 38/45; A61K 31/00; A61K 31/7088; A61P 35/00; C12Y 204/01214

USPC ........................ 424/1.11, 1.65, 1.69, 9.1, 9.2
See application file for complete search history.

(56) References Cited

U.S. PATENT DOCUMENTS

| | | |
|---|---|---|
| 5,197,985 A | 3/1993 | Caplan, I et al. |
| 5,226,914 A | 7/1993 | Caplan et al. |
| 5,486,359 A | 1/1996 | Caplan et al. |
| 5,578,475 A | 11/1996 | Jessee |
| 5,591,625 A | 1/1997 | Gerson et al. |
| 5,643,736 A | 7/1997 | Bruder et al. |
| 5,736,396 A | 4/1998 | Bruder et al. |
| 5,827,740 A | 10/1998 | Pittenger |
| 5,855,619 A | 1/1999 | Caplan et al. |
| 5,908,784 A | 6/1999 | Johnstone et al. |
| 5,965,436 A | 10/1999 | Thiede et al. |
| 6,020,202 A | 2/2000 | Jessee |
| 6,022,540 A | 2/2000 | Bruder et al. |
| 6,030,836 A | 2/2000 | Thiede et al. |
| 6,051,429 A | 4/2000 | Hawley-Nelson et al. |
| 6,149,906 A | 11/2000 | Mosca |
| 6,261,549 B1 | 7/2001 | Fernandez et al. |
| 6,328,960 B1 | 12/2001 | McIntosh et al. |
| 6,355,239 B1 | 3/2002 | Bruder et al. |
| 6,368,636 B1 | 4/2002 | McIntosh et al. |
| 6,387,367 B1 | 5/2002 | Davis-Sproul et al. |
| 6,387,369 B1 | 5/2002 | Pittenger et al. |
| 6,482,231 B1 | 11/2002 | Abatangelo et al. |

(Continued)

FOREIGN PATENT DOCUMENTS

| | | |
|---|---|---|
| CA | 2473108 A1 | 7/2003 |
| CA | 2736353 A1 | 2/2010 |

(Continued)

OTHER PUBLICATIONS

Torres et al, PLOS One, vol. 8. Issue 11, e80580 (12 pages total) (Year: 2013).*

(Continued)

*Primary Examiner* — Jennifer Chin
(74) *Attorney, Agent, or Firm* — Sterne, Kessler, Goldstein & Fox P.L.L.C.

(57) ABSTRACT

The present disclosure relates to cellular compositions that are modified to introduce a nucleic acid or vector expressing the same. Such compositions may be used to deliver nucleic acid to a target cell and treat disease such as cancer.

10 Claims, 43 Drawing Sheets

Figure 1A:
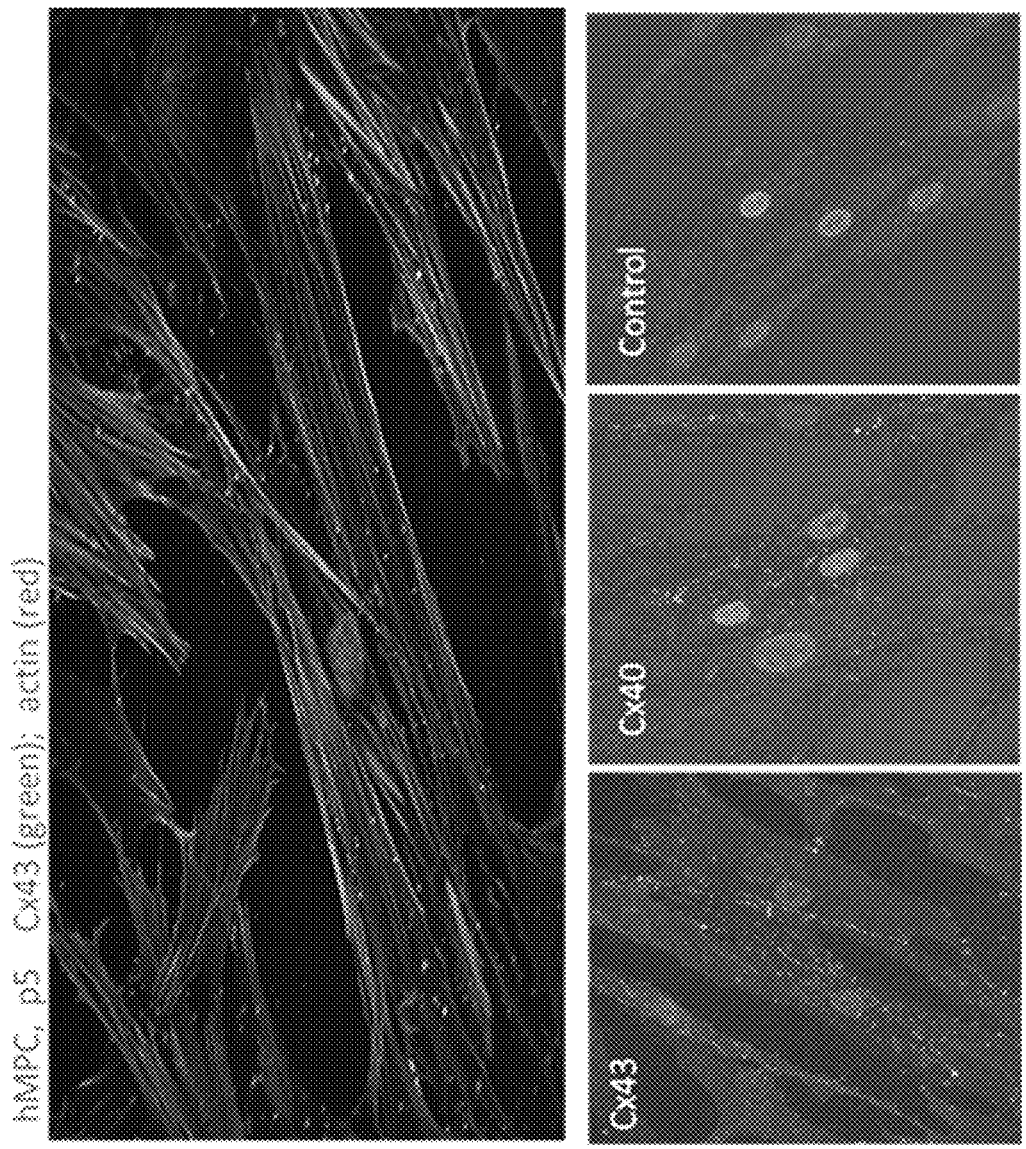

Specification includes a Sequence Listing.

(56) References Cited

U.S. PATENT DOCUMENTS

| | | |
|---|---|---|
| 6,541,024 B1 | 4/2003 | Kadiyala et al. |
| 6,627,442 B1 | 9/2003 | Humeau et al. |
| 6,653,134 B2 | 11/2003 | Prockop et al. |
| 6,685,936 B2 | 2/2004 | McIntosh et al. |
| 6,723,561 B2 | 4/2004 | Russell et al. |
| 6,761,887 B1 | 7/2004 | Kavalkovich et al. |
| 6,797,269 B2 | 9/2004 | Mosca et al. |
| 6,835,377 B2 | 12/2004 | Goldberg et al. |
| 6,875,430 B2 | 4/2005 | McIntosh et al. |
| 6,905,678 B2 | 6/2005 | Havenga et al. |
| 6,936,281 B2 | 8/2005 | Seshi |
| 6,974,571 B2 | 12/2005 | Prockop et al. |
| 7,078,230 B2 | 7/2006 | Wilkison et al. |
| 7,153,500 B2 | 12/2006 | Qasba et al. |
| 7,344,711 B2 | 3/2008 | Bonastre et al. |
| 7,364,900 B2 | 4/2008 | Black et al. |
| 7,491,388 B1 | 2/2009 | McIntosh et al. |
| 7,615,374 B2 | 11/2009 | Vodyanyk et al. |
| 7,732,203 B2 | 6/2010 | Suh et al. |
| 8,105,580 B2 | 1/2012 | Fraser et al. |
| 8,142,773 B2 | 3/2012 | Aslan et al. |
| 8,147,824 B2 | 4/2012 | Maziarz et al. |
| 8,404,229 B2 | 3/2013 | Fraser et al. |
| 8,440,177 B2 | 5/2013 | Gonzalez et al. |
| 8,486,695 B2 | 7/2013 | Danilkovitch et al. |
| 8,637,004 B2 | 1/2014 | Danilkovich et al. |
| 8,940,293 B2 | 1/2015 | Li et al. |
| 8,962,318 B2 | 2/2015 | Lim et al. |
| 9,050,178 B2 | 6/2015 | Barry et al. |
| 9,095,562 B2 | 8/2015 | Centeno et al. |
| 9,453,203 B2 | 9/2016 | May et al. |
| 9,694,035 B2 | 7/2017 | Aggarwal et al. |
| 9,814,580 B2 | 11/2017 | Barry et al. |
| 9,828,586 B2 | 11/2017 | Tom et al. |
| 9,943,547 B2 | 4/2018 | Aggarwal et al. |
| 9,963,678 B2 | 5/2018 | Tom et al. |
| 10,016,470 B2 | 7/2018 | Bonastre et al. |
| 10,316,065 B2 | 6/2019 | Carrio et al. |
| 10,400,218 B2 | 9/2019 | Itescu et al. |
| 10,550,369 B2 | 2/2020 | Tom et al. |
| 10,668,101 B2 | 6/2020 | Aggarwal et al. |
| 10,716,814 B2 | 7/2020 | Aggarwal et al. |
| 10,729,727 B2 | 8/2020 | Aggarwal et al. |
| 10,828,334 B1 | 11/2020 | Aggarwal et al. |
| 10,960,025 B2 | 3/2021 | Aggarwal et al. |
| 11,389,484 B2 | 7/2022 | Aggarwal et al. |
| 11,491,188 B2 | 11/2022 | Itescu et al. |
| 11,708,560 B2 | 7/2023 | Tom et al. |
| 11,795,435 B2 | 10/2023 | Simmons et al. |
| 11,821,004 B2 | 11/2023 | Danilkovich et al. |
| 2002/0037278 A1 | 3/2002 | Ueno et al. |
| 2002/0064519 A1 | 5/2002 | Bruder et al. |
| 2003/0059412 A1 | 3/2003 | Prockop et al. |
| 2003/0118567 A1 | 6/2003 | Stewart |
| 2003/0165482 A1 | 9/2003 | Rolland et al. |
| 2004/0018174 A1 | 1/2004 | Palasis |
| 2004/0033214 A1 | 2/2004 | Young et al. |
| 2004/0166097 A1 | 8/2004 | Prockop et al. |
| 2004/0241145 A1 | 12/2004 | Hata et al. |
| 2005/0008626 A1 | 1/2005 | Fraser et al. |
| 2005/0031600 A1 | 2/2005 | Mickle et al. |
| 2005/0048035 A1 | 3/2005 | Fraser et al. |
| 2005/0048036 A1 | 3/2005 | Hedrick et al. |
| 2005/0095228 A1 | 5/2005 | Fraser et al. |
| 2005/0153442 A1 | 7/2005 | Katz et al. |
| 2005/0158397 A1 | 7/2005 | Chopp et al. |
| 2005/0239897 A1 | 10/2005 | Pittenger et al. |
| 2005/0260174 A1 | 11/2005 | Fraser et al. |
| 2005/0260175 A1 | 11/2005 | Hedrick et al. |
| 2006/0063141 A1 | 3/2006 | McGann et al. |
| 2006/0083720 A1 | 4/2006 | Fraser et al. |
| 2006/0134596 A1 | 6/2006 | Sjogren et al. |
| 2006/0275272 A1 | 12/2006 | Li et al. |
| 2006/0280729 A1 | 12/2006 | Mistry |
| 2007/0036768 A1 | 2/2007 | Fraser et al. |
| 2007/0123996 A1 | 5/2007 | Sugaya et al. |
| 2007/0253931 A1 | 11/2007 | Varney et al. |
| 2008/0095749 A1 | 4/2008 | Aggarwal et al. |
| 2008/0175825 A1 | 7/2008 | Hampson et al. |
| 2008/0213227 A1 | 9/2008 | Aggarwal et al. |
| 2008/0219957 A1 | 9/2008 | Lim et al. |
| 2008/0241113 A1 | 10/2008 | Walton et al. |
| 2008/0292592 A1 | 11/2008 | Chada et al. |
| 2009/0010896 A1 | 1/2009 | Centeno et al. |
| 2009/0180997 A1 | 7/2009 | Pittenger et al. |
| 2009/0208463 A1 | 8/2009 | Pittenger et al. |
| 2009/0214487 A1 | 8/2009 | Varney et al. |
| 2009/0220464 A1 | 9/2009 | Aggarwal et al. |
| 2009/0324609 A1 | 12/2009 | Lodie et al. |
| 2010/0034793 A1 | 2/2010 | McNiece et al. |
| 2010/0040583 A1 | 2/2010 | Falanga |
| 2010/0166712 A1 | 7/2010 | Sadiq et al. |
| 2010/0172885 A1 | 7/2010 | Pittenger et al. |
| 2010/0330048 A1 | 12/2010 | Aggarwal et al. |
| 2011/0027238 A1 | 2/2011 | Aggarwal et al. |
| 2011/0142807 A1 | 6/2011 | Pittenger et al. |
| 2011/0195054 A1 | 8/2011 | Cohen et al. |
| 2011/0200612 A1 | 8/2011 | Schuster et al. |
| 2011/0311496 A1 | 12/2011 | Pittenger et al. |
| 2011/0318314 A1 | 12/2011 | Aggarwal et al. |
| 2011/0318315 A1 | 12/2011 | Aggarwal et al. |
| 2012/0052049 A1 | 3/2012 | Woods et al. |
| 2012/0201791 A1 | 8/2012 | Yoo |
| 2012/0269774 A1 | 10/2012 | Ichim et al. |
| 2013/0330300 A1 | 12/2013 | Shi et al. |
| 2014/0027321 A1 | 1/2014 | Langh-Lagerlof |
| 2014/0105872 A1 | 4/2014 | Danilkovich et al. |
| 2014/0273211 A1 | 9/2014 | Slukvin et al. |
| 2014/0328807 A1 | 11/2014 | Aggarwal et al. |
| 2014/0363522 A1* | 12/2014 | Lengyel ............. A61K 31/4155 514/110 |
| 2015/0272997 A1 | 10/2015 | Aggarwal et al. |
| 2015/0307844 A1 | 10/2015 | Sturm |
| 2016/0199413 A1 | 7/2016 | Simonson et al. |
| 2016/0361362 A1 | 12/2016 | Koblar et al. |
| 2017/0107495 A1 | 4/2017 | Itescu et al. |
| 2018/0008642 A1 | 1/2018 | Danilkovich et al. |
| 2018/0021380 A1 | 1/2018 | Han et al. |
| 2018/0087032 A1 | 3/2018 | Danilkovich et al. |
| 2019/0240259 A1 | 8/2019 | Aggarwal et al. |
| 2020/0197444 A1 | 6/2020 | Danilkovich et al. |
| 2020/0231936 A1 | 7/2020 | Tom et al. |
| 2020/0246387 A1 | 8/2020 | Aggarwal et al. |
| 2020/0345781 A1 | 11/2020 | Honmou et al. |
| 2021/0171913 A1 | 6/2021 | Danilkovitch et al. |
| 2022/0079991 A1 | 3/2022 | Itescu |
| 2022/0143097 A1 | 5/2022 | Itescu et al. |
| 2022/0160776 A1 | 5/2022 | Itescu et al. |
| 2022/0226386 A1 | 7/2022 | Itescu |
| 2022/0275337 A1 | 9/2022 | Devine et al. |
| 2022/0364059 A1 | 11/2022 | Bukulmez et al. |
| 2023/0076630 A1 | 3/2023 | Aggarwal et al. |
| 2023/0089901 A1 | 3/2023 | Danilkovich et al. |
| 2023/0097931 A1 | 3/2023 | Itescu |
| 2023/0104108 A1 | 4/2023 | Itescu |
| 2023/0165904 A1 | 6/2023 | Itescu |
| 2023/0172991 A1 | 6/2023 | Itescu |
| 2023/0220349 A1 | 7/2023 | Simmons |
| 2023/0293589 A1 | 9/2023 | Itescu |
| 2023/0293590 A1 | 9/2023 | Itescu et al. |
| 2023/0398154 A1 | 12/2023 | Itescu et al. |
| 2024/0041934 A1 | 2/2024 | Istescu et al. |
| 2024/0091266 A1 | 3/2024 | Itescu et al. |
| 2024/0117315 A1 | 4/2024 | Tom et al. |
| 2024/0197787 A1 | 6/2024 | Itescu |
| 2024/0207323 A1 | 6/2024 | Itescu et al. |

FOREIGN PATENT DOCUMENTS

| | | |
|---|---|---|
| CN | 1382450 A | 12/2002 |
| CN | 1536075 A | 10/2004 |
| CN | 108715833 A | 10/2018 |
| CN | 111297899 A | 6/2020 |
| CN | 112522191 A | 3/2021 |

(56) References Cited

FOREIGN PATENT DOCUMENTS

| | | | |
|---|---|---|---|
| EP | 1279738 | A1 | 1/2003 |
| EP | 2476751 | A1 | 7/2012 |
| EP | 3583945 | A1 | 12/2019 |
| ES | 2385450 | T3 | 7/2012 |
| KR | 20200015174 | A | 2/2020 |
| WO | WO-9630031 | A1 | 10/1996 |
| WO | WO-9741208 | A1 | 11/1997 |
| WO | WO-9951247 | A1 | 10/1999 |
| WO | WO-0049136 | A1 | 8/2000 |
| WO | WO-0126470 | A1 | 4/2001 |
| WO | WO-2001080865 | A2 | 11/2001 |
| WO | WO-03080083 | A1 | 10/2003 |
| WO | WO-03082200 | A2 | 10/2003 |
| WO | WO-2004003164 | A2 | 1/2004 |
| WO | WO-2004052177 | A2 | 6/2004 |
| WO | WO-2004085630 | A1 | 10/2004 |
| WO | WO-2005059111 | A2 | 6/2005 |
| WO | WO-2004022579 | A3 | 7/2005 |
| WO | WO-2005086922 | A2 | 9/2005 |
| WO | WO-2005093044 | A1 | 10/2005 |
| WO | WO-2006108229 | A1 | 10/2006 |
| WO | WO-2006112365 | A1 | 10/2006 |
| WO | WO-2006136244 | A2 | 12/2006 |
| WO | WO-2007087139 | A2 | 8/2007 |
| WO | WO-2007088229 | A1 | 8/2007 |
| WO | WO-2007124594 | A1 | 11/2007 |
| WO | WO-2007127408 | A2 | 11/2007 |
| WO | WO-2008011133 | A2 | 1/2008 |
| WO | WO-2008110579 | A2 | 9/2008 |
| WO | WO-2008116157 | A2 | 9/2008 |
| WO | WO-2008141177 | A1 | 11/2008 |
| WO | WO-2009028870 | A2 | 3/2009 |
| WO | WO-2010019886 | A1 | 2/2010 |
| WO | WO-2010108931 | A1 | 9/2010 |
| WO | WO-2010111522 | A2 * | 9/2010 ............ A61K 35/28 |
| WO | WO-2010128182 | A1 | 11/2010 |
| WO | WO-2012048093 | A2 | 4/2012 |
| WO | WO-2013005053 | A2 | 1/2013 |
| WO | WO-2013112942 | A1 | 8/2013 |
| WO | WO-2013116778 | A2 | 8/2013 |
| WO | WO-2014204814 | A1 | 12/2014 |
| WO | WO-2015016761 | A2 | 2/2015 |
| WO | WO-2015077624 | A1 | 5/2015 |
| WO | WO-2015089280 | A1 | 6/2015 |
| WO | WO-2015166082 | A1 | 11/2015 |
| WO | WO-2016086020 | A1 | 6/2016 |
| WO | WO-2016102601 | A1 | 6/2016 |
| WO | WO-2016139340 | A1 | 9/2016 |
| WO | WO-2017132358 | A1 | 8/2017 |
| WO | WO-2017144552 | A1 | 8/2017 |
| WO | WO-2017165641 | A1 | 9/2017 |
| WO | WO-2018002930 | A1 | 1/2018 |
| WO | WO-2018023114 | A1 | 2/2018 |
| WO | WO-2018053529 | A1 | 3/2018 |
| WO | WO-2018182612 | A1 | 10/2018 |
| WO | WO-2018202853 | A1 | 11/2018 |
| WO | WO-2019051623 | A1 | 3/2019 |
| WO | WO-2019102268 | A1 | 5/2019 |
| WO | WO-2020141473 | A1 | 7/2020 |
| WO | WO-2020141483 | A1 | 7/2020 |
| WO | WO-2020157660 | A1 | 8/2020 |
| WO | WO-2020234450 | A1 | 11/2020 |
| WO | WO-2021024207 | A1 | 2/2021 |
| WO | WO-2021165420 | A1 | 8/2021 |
| WO | WO-2021176001 | A1 | 9/2021 |
| WO | WO-2021180850 | A1 | 9/2021 |
| WO | WO-2021180851 | A1 | 9/2021 |
| WO | WO-2021198454 | A1 | 10/2021 |
| WO | WO-2022034506 | A1 | 2/2022 |
| WO | WO-2022132986 | A2 | 6/2022 |
| WO | WO-2022159731 | A1 | 7/2022 |
| WO | WO-2024121820 | A1 | 6/2024 |

OTHER PUBLICATIONS

Gradiz et al, Scientific Reports, vol. 6:21648 (14 pages) (Year: 2016).*
Akimov, S.S., et al., "Bypass of senescence, immortalization, and transformation of human hematopoietic progenitor cells," Stem Cells, 23(9):1423-1433, AlphaMed Press, North Carolina (2005).
Bader, A.G., et al., "Developing therapeutic microRNAs for cancer," Gene Therapy, 18(12):1121-1126, Macmillan Publishers Limited, New York (2011).
Barberi, et al., "Derivation of Multipotent Mesenchymal Precursor from Human Embryonic Stem Cells," PloS medicine, 2(6):0554-0559, Public Library of Science, United States (2005).
Brink, P.R., et al., "Can gap junctions deliver?" Biochimica et Biophysica Acta (BBA)—Biomembranes, 1818(8):2076-2081, Elsevier, Netherlands (2012).
Brink, P.R., et al., "In vivo cellular delivery of siRNA," IDrugs, 13(6):383-387, Current Drugs Ltd. United Kingdom (2010).
Griffiths-Jones, S., "The microRNA Registry," Nucleic Acids Research, 32(1):D109-D111, Oxford University Press, England (2004).
International Search Report and Written Opinion for International Application No. PCT/IB2008/001439, European Patent Office, Netherlands, mailed on May 6, 2019, 20 pages.
Kabara, M., et al., "Immortalized multipotent pericytes derived from the vasa vasorum in the injured vasculature. A cellular tool for studies of vascular remodeling and regeneration," Laboratory Investigation, 94:1340-1354, USCAP, California (2014).
Kozomara, A., et al., "miRBase: annotating high confidence microRNAs using deep sequencing data," Nucleic Acids Research, 42(Database issue):D68-D73, Oxfor Universy Press, England (2014).
Lennox, K.A., and Behlke, M.A., "Chemical Modification and Design of Anti-miRNA Oligonucleotides," Gene Therapy, 18(12):1111-1120, Macmillan Publishers Limited, New York (2011).
Liu, S., et al., "Connexin43 Mediated Delivery of ADAMTS5 Targeting siRNAs from Mesenchymal Stem Cells to Synovial Fibroblasts," PLOS One, 10(6):e0129999, Public Library of Science, United States (2015).
Matuskova, M., et al., "Intrinsic properties of tumour cells have a key impact on the bystander effect mediated by genetically engineered mesenchymal stromal cells," Journal of Gene Medicine, 14(12):776-787, John Wiley & Sons, Ltd., New York (2012).
NCBI Reference Sequence NM_004523.3, Homo sapiens kinesin family member 11(KIF11), mRNA (Oct. 20, 2018), 6 pages.
Obinata, M., "Conditionally immortalized cell lines with differentiated functions established from temperature-sensitive T-antigen transgenic mice." Genes Cells, 2:235-244, Blackwell Science Limited, Oxford (1997).
Pereboeva, L., et al., "Approaches to utilize mesenchymal progenitor cells as cellular vehicles," Stem Cells, 21(4):389-404, AlphaMed Press, North Carolina (2003).
Rimkute, L., et al., "The role of neural connexins in HeLa cell mobility and intercellular communication through tunneling tubes," BMC Cell Biology, 17(3), 12 pages, BioMed Central, Springer Nature, United Kingdom (2016).
Simmons, P.J. and Torok-Storb, B., "Identification of stromal cell precursors in human bone marrow by a novel monoclonal antibody, STRO-1," Blood, 78(1):55-62, The American Society of Hematology, United Sates (1991).
Vodyanik, M.A., et al., "A mesoderm-derived precursor for mesenchymal stem and endothelial cells," Cell Stem cell, 7(6):718-728, Elsevier, Netherlands (2010).
Co-pending Application, U.S. Appl. No. 16/815,784, inventors Aggarwal, S., et al., filed on Mar. 11, 2020, (Not Published).
International Search Report and Written Opinion for International Application No. PCT/IB2021/057381, mailed Nov. 12, 2021, 12 pages.
International Search Report and Written Opinion for Application No. PCT/IB2020/057410, mailed Oct. 6, 2020, 11 pages.
Fleming, J. B., et al., "Molecular consequences of silencing mutant K-ras in pancreatic cancer cells: justification for K-ras-directed therapy," Mol Cancer Res 3(7):413-423, American Association for Cancer Research, United States (Jul. 2005).

(56) References Cited

OTHER PUBLICATIONS

Lv, F.J., et al., "Concise Review: the Surface Markers and Identity of Human Mesenchymal Stem Cells," Stem Cells 32(6):1408-1419, AlphaMed Press, United States (Jun. 2014).
Co-pending Application, U.S. Appl. No. 17/906,160, inventor Itescu, S., filed Sep. 12, 2022 (US 20230172991).
Co-pending Application, U.S. Appl. No. 17/906,150, inventor Itescu, S., filed Sep. 12, 2022 (US 20230104108).
Co-pending Application, U.S. Appl. No. 17/905,742, inventor Itescu, S., filed Sep. 6, 2022 (Not Yet Published).
Co-pending Application, U.S. Appl. No. 17/995,385, inventor Itescu, S., filed Oct. 3, 2022 (US 20230165904).
Aggarwal, S., et al., "Human Mesenchymal Stem Cells Modulate Allogeneic Immune Cell Responses," Blood 105(4):1815-1822, American Society of Hematology, United States (Feb. 2005).
Al-Khaldi, A., et al., "Postnatal Bone Marrow Stromal Cells Elicit A Potent VEGF-dependent Neoangiogenic Response In Vivo," Gene Therapy 10(8):621-629, Nature Publishing Group, United Kingdom (Apr. 2003).
Al-Khaldi, A.A., et al., "Therapeutic Angiogenesis Using Autologous Bone Marrow Stromal Cells: Improved Blood Flow In a Chronic Limb Ischemia Model," Annals of Thoracic Surgery 75(1):204-209, Elsevier, Netherlands (Jan. 2003).
Al-Khaldi, A.A., et al., "VEGF-Dependent Angiogenic Response Induced by Ex-Vivo Cultured Marrow Stromal Cells," Circulation 104(17):123, Lippincott Williams & Wilkins, United States (2001).
Baksh, D., et al., "Adult Mesenchymal Stem Cells: Characterization, Differentiation, and Application in Cell and Gene Therapy," Journal of Cellular and Molecular Medicine 8(3):301-316, Wiley-Blackwell, United Kingdom (Jul. 2004).
Ballas, C.B., et al., "Adult Bone Marrow Stem Cells For Cell and Gene Therapies: Implications For Greater Use," Journal of Cellular Biochemistry 38:20-28, Wiley, United States (2002).
Barry, F.P and Murphy, J.M., "Mesenchymal Stem Cells: Clinical Applications and Biological Characterization," International Journal of Biochemistry & Cell Biology 36:568-584, Elsevier, Netherlands (Apr. 2004).
Barry, F.P., "Biology And Clinical Applications of Mesenchymal Stem Cells," Birth Defects Research Part C: Embryo Today 69(3):250-256, Wiley, United States (Aug. 2003).
Bobis, S., et al., "Mesenchymal Stem Cells: Characteristics and Clinical Applications," Folia Histochemica ET Cytobiologica 44(4):215-230, Polish Histochemical and Cytochemical Society at VM Media, Poland (2006).
Chulpanova, D.S., et al., "Application of Mesenchymal Stem Cells for Therapeutic Agent Delivery in Anti-tumor Treatment," Frontiers in Pharmacology 9:259, Frontiers Media, Switzerland (Mar. 2018).
De Miguel, M.P., et al., "Immunosuppressive Properties of Mesenchymal Stem Cells: Advances and Applications," Current Molecular Medicine 12(5):574-591, Bentham Science Publishers, Netherlands (Jun. 2012).
Deans, R.J. and Moseley, A.B., "Mesenchymal Stem Cells: Biology and Potential Clinical Uses," Experimental Hematology 28(8):875-884, Elsevier Science Inc., Netherlands (Aug. 2000).
Deng, Y., et al., "Efficiency of Adenoviral Vector Mediated CTLA4Ig Gene Delivery Into Mesenchymal Stem Cells," Chinese Medical Journal 116(11):1649-1654, Chinese Medical Association, China (Nov. 2003).
Devine, S.M., et al., "Mesenchymal Stem Cells Distribute To a Wide Range of Tissues Following Systemic Infusion into Nonhuman Primates," Blood 101(8):2999-3001, American Society of Hematology, United States (Apr. 2003).
Djouad, F., et al., "Immunosuppressive Effect of Mesenchymal Stem Cells Favors Tumor Growth in Allogeneic Animals," Blood 102(10):3837-3844, American Society of Hematology, United States (Nov. 2003).
Du, W., et al., "Stem Cell-released Oncolytic Herpes Simplex Virus Has Therapeutic Efficacy in Brain Metastatic Melanomas," Proceedings of the National Academy of Sciences 114(30):E6157-E6165, National Acad Sciences (Jul. 2017).

Fischer, U, M., et al., "Pulmonary Passage is a Major Obstacle for Intravenous Stem Cell Delivery: the Pulmonary First-pass Effect," Stem cells and development 18(5):683-92, Mary Ann Liebert, Inc., United States (Jun. 2009).
Fu, X., et al., "Expression of a Fusogenic Membrane Glycoprotein by an Oncolytic Herpes Simplex Virus Potentiates the Viral Antitumor Effect," Molecular Therapy 7(6):748-754, Cell Press, United States (Jun. 2003).
Gao, J., et al., "The Dynamic in Vivo Distribution of Bone Marrow-derived Mesenchymal Stem Cells After Infusion," Cells. Tissues. Organs 169(1):12-20, Karger, Switzerland (2001).
Griffin, M.D., et al.,. "Anti-donor Immune Responses Elicited by Allogeneic Mesenchymal Stem Cells: What Have We Learned so Far?," Immunology and Cell Biology 91(1):40-51, Wiley, United States (Jan. 2013).
Gronthos, S., et al., "Molecular and Cellular Characterisation of Highly Purified Stromal Stem Cells Derived From Human Bone Marrow," Journal of Cell Science 116(Pt 9):1827-1835, Company of Biologists, United Kingdom (May 2003).
Gronthos, S., et al., "Surface Protein Characterization of Human Adipose Tissue-derived Stromal Cells," Journal of Cellular Physiology 189(1):54-63, Wiley-Liss, United States (Oct. 2001).
Guedan, S., et al., "GALV Expression Enhances the Therapeutic Efficacy of an Oncolytic Adenovirus by Inducing Cell Fusion and Enhancing Virus Distribution," Gene Therapy 19(11):1048-1057, Nature Publishing Group, United Kingdom (Nov. 2012).
Guo, X.R., et al., "PTEN-mRNA Engineered Mesenchymal Stem Cell-mediated Cytotoxic Effects on U251 Glioma Cells," Oncology Letters 11(4):2733-2740, Spandidos Publications, Greece (Apr. 2016).
Guo, Z., et al., "Biological Features of Mesenchymal Stem Cells From Human Bone Marrow," Chinese Medical Journal 114(9):950-953, Wolters Kluwer-Medknow, China (Sep. 2001).
Hackney, J.A., et al., "A Molecular Profile of a Hematopoietic Stem Cell Niche," PNAS, 99(20): 13061-13066, National Academy of Sciences, United States (Oct. 2002).
Hamada, H., et al., "Mesenchymal Stem Cells (MSC) as Therapeutic Cytoreagents for Gene Therapy," Cancer Science 96(3):149-156, Wiley Publishing, United Kingdom (Mar. 2005).
Hopkins, B.D., et al., "A Secreted PTEN Phosphatase That Enters Cells To Alter Signaling and Survival," Science 341(6144):399-402, American Association for the Advancement of Science, United States (Jul. 2013).
Horwitz, E.M., et al., "Clarification of the Nomenclature for MSC: The International Society for Cellular Therapy Position Statement," Cytotherapy 7(5):393-395, Elsevier, United Kingdom (2005).
Izadpanah, R., et al., "Biologic Properties of Mesenchymal Stem Cells Derived From Bone Marrow and Adipose Tissue," Journal of Cellular Biochemistry 99(5):1285-1297, Wiley-Liss, United States (Dec. 2006).
Jagasia, M.H., et al., "National Institutes of Health Consensus Development Project on Criteria for Clinical Trials in Chronic Graft-versus-host Disease: I. The 2014 Diagnosis and Staging Working Group Report," Biology of Blood and Marrow Transplantation 21(3):389-401, Carden Jennings Publishing, United States (Mar. 2015).
Jiang, Y., et al., "Pluripotency of Mesenchymal Stem Cells Derived From Adult Marrow," Nature, 418(6893):41-49, Nature Publishing Group, United Kingdom (Jul. 2002).
Jorgensen, C., et al., "Engineering Mesenchymal Stem Cells for Immunotherapy," Gene Therapy 10(10):928-931, Nature Publishing Group, United Kingdom (2003).
Keshavarz, M., et al. , "Oncolytic Newcastle Disease Virus Delivered by Mesenchymal Stem Cells-engineered System Enhances the Therapeutic Effects Altering Tumor Microenvironment," Virology Journal 17(1):64, BioMed Central, England (May 2020).
Koc, O.N., et al., "Rapid Hematopoietic Recovery After Coinfusion of Autologous-blood Stem Cells and Culture-expanded Marrow Mesenchymal Stem Cells in Advanced Breast Cancer Patients Receiving High-dose Chemotherapy," Journal of Clinical Oncology 18(2):307-316, American Society of Clinical Oncology, United States (Jan. 2000).

(56) References Cited

OTHER PUBLICATIONS

Krause, D.S., et al., "Multi-organ, Multi-lineage Engraftment by a Single Bone Marrow-derived Stem Cell," Cell 105(3):369-377, Cell Press, United States (May 2001).

Le Blanc, K. and Ringden, O., "Immunobiology of Human Mesenchymal Stem Cells and Future Use in Hematopoietic Stem Cell Transplantation," Biology of Blood and Marrow Transplantation 11(5):321-334, Carden Jennings Publishing, United States (May 2005).

Le Blanc, K., et al., "HLA Expression and Immunologic Properties of Differentiated and Undifferentiated Mesenchymal Stem Cells," Experimental Hematology 31(10):890-896, Elsevier Science Inc., Netherlands (Oct. 2003).

Le Blanc, K., "Immunomodulatory Effects of Fetal and Adult Mesenchymal Stem Cells," Cytotherapy 5(6):485-489, Elsevier, United Kingdom (2003).

Lee, S.T., et al., "Treatment of high-risk acute myelogenous leukaemia by myeloblative chemoradiotherapy followed by co-infusion of T cell-depleted haematopoietic stem cells and culture-expanded marrow mesenchymal stem cells from elated donor with one fully mismatched human leucocyte antigen haplotype," British Journal of Haematology 118:1138-1131, Wiley, United States (2002).

Lindner, U., et al., "Mesenchymal Stem or Stromal Cells: Toward a Better Understanding of Their Biology?" Transfusion Medicine and Hemotherapy 37(2):75-83, S. Karger, Switzerland (Apr. 2010).

Lukomska, B., et al., "Challenges and Controversies in Human Mesenchymal Stem Cell Therapy," Stem Cells International 2019: Article ID (9628536), SAGE—Hindawi Access to Research, United States (Apr. 2019).

Mahasa, K.J., et al., "Mesenchymal Stem Cells Used as Carrier Cells of Oncolytic Adenovirus Results in Enhanced Oncolytic Virotherapy," Scientific Reports 10:425, Nature Publishing Group, London (Jan. 2020).

McIntosh, K. and Bartholomew, A., "Stromal Cell Modulation of The Immune System," Graft Review 3(6):324-8, SAGE Publications, United States (2000).

Mesoblast Limited, "Mesoblast Heart Failure Cell Therapy Receives Orphan Drug Designation From FDA For Prevention Of Gastrointestinal Bleeding In Patients With Left Ventricular Assist Devices," Investorsmedia.mesoblast.com, accessed at http://investorsmedia.mesoblast.com/static-files/c08cebeb-456b-49d4-8e0d-cfc5dfl1Od9e on Mar. 31, 2020, 3 pages (Jun. 2019).

Nakashima, H. and Chiocca, E.A., "Switching a Replication-defective Adenoviral Vector Into a Replication-competent, Oncolytic Adenovirus," Journal of Virology 88(1):345-353, American Society for Microbiology, United States (Jan. 2014).

Newman, R.E., et al., "Treatment of Inflammatory Diseases With Mesenchymal Stem Cells," Inflammation & Allergy Drug Targets 8(2):110-123, Bentham Science Publishers, United Arab Emirates (Jun. 2009).

Ohlsson, L.B., et al., "Mesenchymal Progenitor Cell-mediated Inhibition of Tumor Growth in Vivo and in Vitro in Gelatin Matrix," Experimental and Molecular Pathology 75(3):248-255, Elsevier, Netherlands (Dec. 2003).

Pittenger, M.F., and Martin, B.J., "Mesenchymal Stem Cells and Their Potential as Cardiac Therapeutics," Circ. Res. 95: 9-20, American Heart Association, United States (2004).

Pittenger, M.F., et al., "Multilineage Potential of Adult Human Mesenchymal Stem Cells," Science 284(5411):143-147, American Association for the Advancement of Science, United States (Apr. 1999).

Prockop, D.J., "Marrow Stromal Cells as Stem Cells for Nonhematopoietic Tissues," Science 276(5309):71-74, American Association for the Advancement of Science, United States (Apr. 1997).

Ramasamy, R., et al., "The Immunosuppressive Effects of Human Bone Marrow-derived Mesenchymal Stem Cells Target T Cell Proliferation but Not Its Effector Function," Cellular Immunology 251(2):131-136, Elsevier, Netherlands (Feb. 2008).

Rankin, J.A., "Biological Mediators of Acute Inflammation," AACN Clinical Issues 15(1):3-17, American Association of Critical-Care Nurses, United States (Jan. 2004).

Rasmusson, I., "Immune Modulation by mesenchymal stem cells," Experimental Cell Research 312:2169-2179, Elsevier, Netherlands (Jul. 2006).

Rayment, E.A., et al., "Concise Review: Mind the Gap: Challenges in Characterizing and Quantifying Cell- and Tissue-based Therapies for Clinical Translation," Stem Cells (Dayton, Ohio) 28(5):996-1004, Oxford University Press, United Kingdom (2010).

Ruano, D., et al., "First-in-Human, First-in-Child Trial of Autologous MSCs Carrying the Oncolytic Virus Icovir-5 in Patients with Advanced Tumors," Molecular Theraphy 28(4):1033-1042, Cell Press, United States (Apr. 2020).

Russell, L., et al., "PTEN Expression by an Oncolytic Herpesvirus Directs T-cell Mediated Tumor Clearance," Nature Communications 9(1):5006, Nature Publishing Group, United Kingdom (Nov. 2018).

Shen, Y.H., et al., "Arg-Gly-Asp (RGD)-modified E1a/E1b Double Mutant Adenovirus Enhances Antitumor Activity in Prostate Cancer Cells in Vitro and in Mice," PLoS One 11(1):e0147173, Public Library of Science, United States (Jan. 2016).

Sonabend, A.M., et al., "Mesenchymal Stem Cells Effectively Deliver an Oncolytic Adenovirus to Intracranial Glioma," Stem Cells 26(3):831-841, AlphaMed Press, United States (Mar. 2008).

Tolar, J., et al., "Concise Review: Hitting the Right Spot With Mesenchymal Stromal Cells," Stem Cells 28(8):1446-1555, Oxford University Press, United Kingdom (Aug. 2010).

Tse, W.T., et al., "Suppression of Allogeneic T-cell Proliferation by Human Marrow Stromal Cells: Implications in Transplantation," Transplantation 75(3):389-397, Lippincott Williams & Wilkins, United States (Feb. 2003).

Tuli, R., et al., "Characterization of multipotential mesenchymal progenitor cells derived from human trabecular bone," Stem Cells 21(6):681-693, Oxford University Press, United Kingdom (2003).

Ullah, I., et al., "Human mesenchymal stem cells—current trends and future prospective," Bioscience Reports 35(2):e00191, Springer, United States (Apr. 2015).

Wagers, A.J., et al., "Cell Fate Determination From Stem Cells," Gene Therapy 9(10):606-612, Nature Publishing Group, United Kingdom (May 2002).

Yang, Z.S., et al., "Cancer Cell-oriented Migration of Mesenchymal Stem Cells Engineered With an Anticancer Gene (PTEN): An Imaging Demonstration," Oncology Targets and Therapy 7:441-446, Dove Medical Press, New Zealand (Mar. 2014).

Zhou, S. Z., et al., "Adeno-associated virus 2-mediated high efficiency gene transfer into immature and mature subsets of hematopoietic progenitor cells in human umbilical cord blood," J Exp Med 179(6):1867-1875, Rockefeller University Press, United States (Jun. 1994).

International Search Report and Written Opinion for Application No. PCT/IB2018/001439, mailed on May 6, 2019, 20 pages.

Samineni, S., et al., "Role of CEACAM1, ECM, and mesenchymal stem cells in an orthotopic model of human breast cancer," Int J Breast Cancer 2011:381080, Hindawi Limited, Egypt (2011).

International Search Report and Written Opinion for International Application No. PCT/IB2021/055055, European Patent Office, Netherlands, mailed Sep. 17, 2021, 10 pages.

Dos Santos, F., et al., "Toward a clinical-grade expansion of mesenchymal stem cells from human sources: a microcarrier-based culture system under xeno-free conditions," Tissue Eng Part C Methods 17(12):1201-1210, Mary Ann Liebert Inc., United States (Dec. 2011).

International Search Report and Written Opinion for International Application No. PCT/IB2023/062429, European Patent Office, Netherlands, mailed Mar. 5, 2024, 12 pages.

Pereira, T., et al., "MSCs conditioned media and umbilical cord blood plasma metabolomics and composition," PLoS One 9(11):e113769, Public Library of Science, United States (Nov. 2014).

(56) References Cited

OTHER PUBLICATIONS

Eisenberg, C.A., et al., "Establishment of the mesodermal cell line QCE-6. A model system for cardiac cell differentiation," Circ Res 78(2):205-216, Lippincott Williams and Wilkins Ltd., United States (Feb. 1996).

Pilgrim, C.R., et al., "A Review of Fetal Bovine Serum in the Culture of Mesenchymal Stromal Cells and Potential Alternatives for Veterinary Medicine," Front Vet Sci 9:859025, Frontiers Media SA, Switzerland (May 2022).

International Search Report and Written Opinion for International Application No. PCT/IB2021/057314, European Patent Office, Netherlands, mailed Oct. 22, 2021, 10 pages.

Martire, A., et al., "Mesenchymal stem cells attenuate inflammatory processes in the heart and lung via inhibition of TNF signaling," Basic Res Cardiol 111(5):54, D. Steinkopff-Verlag, Germany (Sep. 2016).

Yan, L., et al., "Critical Role of Tumor Necrosis Factor Signaling in Mesenchymal Stem Cell-Based Therapy for Autoimmune and Inflammatory Diseases," Front Immunol 9:1658, Frontiers Media SA, Switzerland (Jul. 2018).

Burand, A.J., et al., "Function of Cryopreserved Mesenchymal Stromal Cells With and Without Interferon-γ Prelicensing is Context Dependent," Stem Cells 35(5):1437-1439, Oxford University Press, United States (May 2017).

Co-pending Application, U.S. Appl. No. 18/484,347, inventor Danilkovitch, A., et al., filed Oct. 10, 2023 (Not yet Published).

Co-pending Application, U.S. Appl. No. 18/711,167, inventor Itescu, S., et al., filed Nov. 17, 2022 (Not yet Published).

\* cited by examiner

| | exp1 | exp2 | exp3 | | mean | STD | | mean | STD |
|---|---|---|---|---|---|---|---|---|---|
| none | 0.39 | 0.44 | 0.45 | none | 0.41 | 0.04 | none | 65.94 | 5.83 |
| mir15a | 0.27 | 0.35 | 0.31 | mir15a | 0.31 | 0.06 | mir15a | 49.02 | 9.47 |
| mir16-1 | 0.36 | 0.48 | 0.36 | mir16-1 | 0.42 | 0.09 | mir16-1 | 67.06 | 14.23 |
| mir34a | 0.22 | 0.28 | 0.21 | mir34a | 0.25 | 0.04 | mir34a | 39.84 | 6.68 |
| mir155 | 0.62 | 0.50 | 0.63 | mir155 | 0.56 | 0.09 | mir155 | 89.34 | 13.56 |
| KIF11 | 0.49 | 0.40 | 0.64 | KIF11 | 0.45 | 0.07 | KIF11 | 71.02 | 10.43 |
| PLK1 | 0.33 | 0.35 | 0.39 | PLK1 | 0.34 | 0.02 | PLK1 | 53.99 | 2.73 |
| death | 0.16 | 0.09 | 0.15 | death | 0.13 | 0.05 | death | 20.05 | 7.27 |
| negative | 0.70 | 0.55 | 0.84 | negative | 0.63 | 0.10 | negative | 100.00 | 16.63 |
| let7b | 0.54 | 0.62 | 0.61 | let7b | 0.58 | 0.06 | let7b | 92.37 | 8.88 |

Top 10 down regulated genes in MPCs

| ID | Trans Avg (log2) | Ctrl Avg (log2) | Trans Expressed | Ctrl Expressed | Fold Change | P-val | FDR P-val | Gene Symbol | Description |
|---|---|---|---|---|---|---|---|---|---|
| TC1000008471.hg.1 | 5.92 | 10.13 | T | T | -18.47 | 3.77E-09 | 8.09E-05 | KIF11 | kinesin family member 11 |
| TC0300012145.hg.1 | 13.24 | 14.93 | T | T | -3.22 | 8.42E-06 | 0.0215 | FSTL1; MIR198 | follistatin like 1; microRNA 198 |
| TC0100016260.hg.1 | 8.98 | 10.6 | T | T | -3.07 | 0.0002 | 0.1311 | ALDH9A1 | aldehyde dehydrogenase 9 family, member A1 |
| TC1200008535.hg.1 | 9.68 | 11.28 | T | T | -3.02 | 2.08E-06 | 0.0111 | ELK3 | ELK3, ETS-domain protein (SRF accessory protein 2) |
| TC0700012180.hg.1 | 8.48 | 9.87 | T | T | -2.63 | 6.56E-07 | 0.0047 | SYPL1 | synaptophysin-like 1 |
| TC2000007016.hg.1 | 5.83 | 7.2 | T | T | -2.58 | 0.0047 | 0.276 | GINS1 | GINS complex subunit 1 (Psf1 homolog) |
| TC0X00007937.hg.1 | 5.12 | 6.49 | T | T | -2.58 | 0.0498 | 0.4747 | DRP2 | dystrophin related protein 2 |
| TC0900010444.hg.1 | 8.32 | 9.55 | T | T | -2.34 | 2.17E-05 | 0.0383 | CARNMT1 | carnosine N-methyltransferase 1 |
| TC0200010264.hg.1 | 6.74 | 7.92 | T | T | -2.27 | 0.0007 | 0.1658 | MFSD6 | major facilitator superfamily domain containing 6 |
| TC0400012432.hg.1 | 9.4 | 10.51 | T | T | -2.17 | 4.37E-06 | 0.0188 | HMGB2 | high mobility group box 2 |

Top 10 down regulated genes in MSCs

| ID | Trans Avg (log2) | Ctrl Avg (log2) | Trans Expressed | Ctrl Expressed | Fold Change | P-val | FDR P-val | Gene Symbol | Description |
|---|---|---|---|---|---|---|---|---|---|
| TC1000008471.hg.1 | 5.19 | 9.51 | T | T | -20.07 | 5.24E-08 | 0.0011 | KIF11 | kinesin family member 11 |
| TC0300012145.hg.1 | 13.34 | 15.23 | T | T | -3.71 | 7.13E-05 | 0.1386 | FSTL1; MIR198 | follistatin like 1; microRNA 198 |
| TC0100009181.hg.1 | 5.52 | 7.28 | T | T | -3.39 | 2.06E-06 | 0.0147 | PLPPR4 | phospholipid phosphatase related 4 |
| TC0700012180.hg.1 | 8.23 | 9.96 | T | T | -3.32 | 6.47E-05 | 0.1386 | SYPL1 | synaptophysin-like 1 |
| TC1200008535.hg.1 | 9.21 | 10.84 | T | T | -3.11 | 6.46E-06 | 0.0346 | ELK3 | ELK3, ETS-domain protein (SRF accessory protein 2) |
| TC0400010132.hg.1 | 9.2 | 10.59 | T | T | -2.61 | 0.0002 | 0.1399 | TAPT1 | transmembrane anterior posterior transformation 1 |
| TC0100016260.hg.1 | 9.59 | 10.96 | T | T | -2.58 | 1.42E-06 | 0.0147 | ALDH9A1 | aldehyde dehydrogenase 9 family, member A1 |
| TC0600008166.hg.1 | 5.45 | 6.73 | T | T | -2.43 | 0.0039 | 0.3538 | SLC25A27 | solute carrier family 25, member 27 |
| TC1700011121.hg.1 | 11.28 | 12.5 | T | T | -2.34 | 0.0001 | 0.1386 | TOB1 | transducer of ERBB2, 1 |
| TC1600008698.hg.1 | 10.68 | 11.89 | T | T | -2.31 | 0.0392 | 0.4823 | GSE1 | Gse1 coiled-coil protein |

FIG. 34

USE OF MESENCHYMAL LINEAGE PRECURSOR CELLS OR STEM CELLS (MLPSCs) FOR DELIVERY OF OLIGONUCLEOTIDES IN THE TREATMENT OF CANCER

CROSS-REFERENCE TO RELATED APPLICATIONS

The present application is a U.S. national stage entry of PCT/IB2018/001439, filed on Nov. 21, 2018, which claims priority to U.S. Ser. No. 62/589,764 filed on Nov. 22, 2017, each of which is hereby incorporated by reference in its entirety.

The present application contains a Sequence Listing which has been submitted electronically in ASCII format and is hereby incorporated by reference in its entirety. Said ASCII copy, created on Dec. 3, 2020, is named 3944_0640001_Seqlisting_ST25_UPDATED.txt and is 8,643 bytes in size.

FIELD OF THE INVENTION

The present disclosure relates to cellular compositions that are modified to introduce a nucleic acid or vector expressing the same. Such compositions may be used to deliver nucleic acid to a target cell and treat diseases such as cancer.

BACKGROUND OF THE INVENTION

Nucleic acids, either single or double stranded, or both, have been shown to pass through gap junctions formed by connexin proteins in HeLa cell pairs modified to express connexin proteins. Transfer was demonstrated by a single electrode delivery of fluorescent-tagged oligonucleotides to a donor cell and determining their transfer to the target cell via gap junction mediated communication.

Improved methods of delivering nucleic acids to target cells are required.

SUMMARY OF THE INVENTION

The present inventors have identified that mesenchymal lineage precursor or stem cells are able to direct a high rate of nucleic acid transfer to target cells. The present inventors have also identified that mesenchymal lineage precursor or stem cells can deliver nucleic acids to cancer cells to reduce cancer cell growth. Surprisingly, these capabilities of mesenchymal lineage precursor or stem cells are maintained despite knockout of a key protein involved in transfer of nucleic acids between cells.

Another advantage of using mesenchymal lineage precursor or stem cells for delivery of nucleic acids to target cells is the ability of the cells home to target tissues. The migration and adhesion capacity of mesenchymal lineage precursor or stem cells makes them particularly suitable for this purpose.

Accordingly, in an example, the present disclosure relates to a method of delivering an oligonucleotide into a target cell, the method comprising contacting a target cell with a mesenchymal lineage precursor or stem cell expressing one or more of the markers selected from the group consisting of α1, α2, α3, α4 and α5, αv, β1 and β3, wherein said cell has been modified to introduce an oligonucleotide or a vector expressing the oligonucleotide. In an example, the contacting occurs under conditions permitting the mesenchymal lineage precursor or stem cell to form a gap junction with the target cell, whereby the oligonucleotide is delivered to the target cell by traversing the gap junction. In an example, the gap junction is formed by Cx40 or Cx43. In another example, the gap junction is formed by Cx43. In another example, delivery of the oligonucleotide is via a mechanism other than Cx43. For example, oligonucleotide may be delivered by traversing a gap junction formed by Cx40, Cx45, Cx30.3, Cx31 or Cx31.1. In another example, oligonucleotide may be delivered via formation of exosomes. In another example, delivery of the oligonucleotide is independent of cell to cell contact. In this example, delivery of the oligonucleotide does not occur via a connexin.

In an example, the target cell is a cancer cell or white blood cell. For example, the cancer cell can be a lung cancer, pancreatic cancer, colorectal cancer, liver cancer, cervical cancer, prostate cancer, osteosarcoma or melanoma cell. In another example, the target cell is a syncytial cell. For example, the syncytial cell can be a cardiac myocyte, smooth muscle cell, epithelial cell, connective tissue cell or syncytial cancer cell.

In another example, the present disclosure relates to a method of treating cancer in a subject, the method comprising administering to the subject a composition comprising mesenchymal lineage precursor or stem cells expressing one or more of the markers selected from the group consisting of α1, α2, α3, α4 and α5, αv, β1 and β3, wherein said cells are modified to introduce an oligonucleotide or a plasmid expressing the oligonucleotide.

In an example, the mesenchymal lineage precursor or stem cells express a connexin that is also expressed by cells comprising the subject's cancer. In an example, the connexin is Cx40 or Cx43. In an example, cells comprising the subject's cancer express Cx43.

In another example, the mesenchymal lineage precursor or stem cells express CD46.

In an example, the cancer is selected from the group consisting of lung cancer, pancreatic cancer, colorectal cancer, liver cancer, cervical cancer, prostate cancer, osteosarcoma and melanoma. In an example, the method comprises administering a composition according to the present disclosure.

In an example, the oligonucleotide is about 12-24 nucleotides in length. In another example, the oligonucleotide is RNA. In another example, the oligonucleotide is an antisense molecule. In another example, the oligonucleotide is a shRNA. In another example, the oligonucleotide is a siRNA. In an example, the siRNA is KIF11 siRNA or PLK1 siRNA. In another example, the siRNA is KIF11 siRNA.

In an example, the KIF11 siRNA binds towards the 5' end of KIF11 mRNA as shown in SEQ ID NO: 1 (NCBI reference number NM 004523.3). In an example, the KIF11 siRNA binds the KIF11 mRNA transcript between bp 800 and bp 3,600 from the 5' end. In another example, the KIF11 siRNA binds the KIF11 mRNA transcript between bp 900 and bp 3,200 from the 5' end. In an example, the oligonucleotide comprises the nucleic acid sequence as shown in any one of SEQ ID NOs: 2, 3, 4, 5, 6 or 7. In an example, the oligonucleotide consists of the nucleic acid sequence as shown in any one of SEQ ID NOs: 2, 3, 4, 5, 6 or 7. In an example, the oligonucleotide comprises the nucleic acid sequence as shown in SEQ ID NO: 3. In another example, the oligonucleotide consists of the nucleic acid sequence as shown in SEQ ID NO: 3. In an example, the oligonucleotide comprises the nucleic acid sequence as shown in SEQ ID NO: 4. In another example, the oligonucleotide consists of the nucleic acid sequence as shown in SEQ ID NO: 4. In an example, the oligonucleotide comprises the nucleic acid sequence as shown in SEQ ID NO: 7. In another example, the oligonucleotide consists of the nucleic acid sequence as shown in SEQ ID NO: 7. In an example, the oligonucleotide comprises the nucleic acid sequence as shown in any one of SEQ ID NOs: 3, 4 or 7. In another example, the oligonucleotide consists of the nucleic acid sequence as shown in any one of SEQ ID NOs: 3, 4 or 7. In these examples, the target cell may be a bone cancer cell. In an example, the cancer may be sarcoma. In another example, the target cell may be a pancreatic cancer cell. In an example, the cancer may be pancreatic cancer. In another example, the target cell may be a prostate cancer cell. In an example, the cancer may be prostate cancer.

In another example, the oligonucleotide comprises the nucleic acid sequence as shown in any one of SEQ ID NOs: 2, 3, 4, 5, 6, 7, 8 or 9. In an example, the oligonucleotide consists of the nucleic acid sequence as shown in any one of SEQ ID NOs: 2, 3, 4, 5, 6, 7, 8 or 9. In an example, the oligonucleotide consists of the nucleic acid sequence as shown in SEQ ID NOs: 8 or 9.

In another example, the oligonucleotide is 18-22 nucleotides in length. In another example, the oligonucleotide is a miRNA. In an example, miRNAs can be selected from the group consisting of miR-155, miR-155-inh, miR-181-B1, miR-15a, miR-16-1, miR-21, miR-34a, miR-221, miR-29a, let-7b.

In another example, the mesenchymal lineage precursor or stem cells are modified to introduce an oligonucleotide or vector expressing the same that kills the target cell but does not substantially affect viability of the mesenchymal lineage precursor or stem cell. In another example, the mesenchymal lineage precursor or stem cells are modified to introduce an inhibitory oligonucleotide or vector expressing the same that does not kill the mesenchymal lineage precursor or stem cells before they can deliver the inhibitory oligonucleotide to a target cell such as a cancer cell.

The present inventors have also identified that mesenchymal lineage precursor or stem cells can be modified to introduce various inhibitory oligonucleotides known to kill cancer cells and/or reduce cancer cell growth. Surprisingly, these modified mesenchymal lineage precursor or stem cells remain viable and are able to deliver the inhibitory oligonucleotide to cancer cells in levels sufficient to kill cancer cells and/or reduce cell growth.

Accordingly, in another example, the present disclosure relates to a composition comprising mesenchymal lineage precursor or stem cells expressing one or more of the markers selected from the group consisting of α1, α2, α3, α4 and α5, αv, β1 and β3, wherein said cells are modified to introduce an inhibitory oligonucleotide or comprise a vector expressing the inhibitory oligonucleotide.

In an example, the inhibitory oligonucleotide is about 12-24 nucleotides in length. In another example, the inhibitory oligonucleotide is RNA. In another example, the inhibitory oligonucleotide is an antisense molecule. In another example, the inhibitory oligonucleotide is a shRNA. In another example, the inhibitory oligonucleotide is a siRNA. In another example, the inhibitory oligonucleotide is 18-22 nucleotides in length. In another example, the inhibitory oligonucleotide is a miRNA. In an example, miRNAs can be selected from the group consisting of miR-155, miR-155-inh, miR-181-B1, miR-15a, miR-16-1, miR-21, miR-34a, miR-221, miR-29a, let-7b.

In an example, the mesenchymal lineage precursor or stem cells also express STRO-1. Accordingly, in an example, the present disclosure relates to a method of delivering an oligonucleotide into a target cell, the method comprising contacting a target cell with a mesenchymal lineage precursor or stem cell expressing STRO-1 and one or more of the markers selected from the group consisting of α1, α2, α3, α4 and α5, αv, β1 and β3, wherein said cell has been modified to introduce an oligonucleotide or a vector expressing the oligonucleotide. In another example, the present disclosure relates to a method of treating cancer in a subject, the method comprising administering to the subject a composition comprising mesenchymal lineage precursor or stem cells expressing STRO-1 and one or more of the markers selected from the group consisting of α1, α2, α3, α4 and α5, αv, β1 and β3, wherein said cells are modified to introduce an oligonucleotide or a plasmid expressing the oligonucleotide. In another example, the present disclosure relates to a composition comprising mesenchymal lineage precursor or stem cells expressing STRO-1 and one or more of the markers selected from the group consisting of α1, α2, α3, α4 and α5, αv, β1 and β3, wherein said cells are modified to introduce an inhibitory oligonucleotide or comprise a vector expressing the inhibitory oligonucleotide. In another example, the mesenchymal lineage precursor or stem cells are substantially STRO-1$^{bri}$. In another example, the mesenchymal lineage precursor or stem cell is not modified to express Cx40 or Cx43.

In an example, modified mesenchymal lineage precursor or stem cells comprise sufficient levels of oligonucleotide to reduce viability of a target cell such as, for example, a cancer cell. In an example, modified mesenchymal lineage precursor or stem cells comprise sufficient levels of inhibitory oligonucleotide to effect transfer of between 0.25 to 5 nM of the inhibitory oligonucleotide to a target cell. In another example, modified mesenchymal lineage precursor or stem cells comprise sufficient levels of inhibitory oligonucleotide to effect transfer of between 0.5 to 5 nM of the inhibitory oligonucleotide to a target cell. In another example, modified mesenchymal lineage precursor or stem cells comprise sufficient levels of inhibitory oligonucleotide to effect transfer of between 0.5 to 4 nM of the inhibitory oligonucleotide to a target cell. In another example, modified mesenchymal lineage precursor or stem cells comprise sufficient levels of inhibitory oligonucleotide to effect transfer of between 0.5 to 3.5 nM of the inhibitory oligonucleotide to a target cell.

In another example, the mesenchymal lineage precursor or stem cells are derived from pluripotent cells. For example, the mesenchymal lineage precursor or stem cells may be derived from induced pluripotent stem (iPS) cells.

In an example, mesenchymal lineage precursor or stem cells are modified to introduce the oligonucleotide using a viral vector. In an example, the viral vector is selected from the group consisting of Lentivirus, Baculovirus, Retrovirus, Adenovirus (AdV), Adeno-associated virus (AAV) or a recombinant form thereof. In another example, the viral vector is a AAV. In another example, the viral vector is a recombinant AAV.

In an example, modified mesenchymal lineage precursor or stem cells have been treated to effect modification of cell surface glycans on the mesenchymal lineage precursor or stem cells. In an example, the treatment involves exposure of the mesenchymal lineage precursor or stem cell to a glycosylstrasferase under conditions which result in modification of cell-surface glycans on the mesenchymal precursor lineage cell or stem cell.

In an example, mesenchymal lineage precursor or stem cell are exposed to an exogenous glycosyltranferase.

In another example, mesenchymal lineage precursor or stem cells have been modified to express a glycosyltranferase. In an example, the mesenchymal lineage precursor or stem cell have been modified to introduce a nucleic acid encoding a glycosyltransferase, wherein expression of the glycosyltransferase in the cell results in enhanced retention of the cell at a site of inflammation in vivo.

In an example, the glycosyltransferase is a fucosyltransferase, a galactosyltransferase, or a sialyltransferase. In an example, the fucosyltransferase is an alpha 1,3 fucosyltransferase such as an alpha 1,3 fucosyltransferase III, alpha 1,3 fucosyltransferase IV, an alpha 1,3 fucosyltransferase VI, an alpha 1,3 fucosyltransferase VII or an alpha 1,3 fucosyltransferase IX.

Any example herein shall be taken to apply mutatis mutandis to any other example unless specifically stated otherwise.

The present disclosure is not to be limited in scope by the specific examples described herein, which are intended for the purpose of exemplification only. Functionally-equivalent products, compositions and methods are clearly within the scope of the disclosure, as described herein.

Throughout this specification, unless specifically stated otherwise or the context requires otherwise, reference to a single step, composition of matter, group of steps or group of compositions of matter shall be taken to encompass one and a plurality (i.e. one or more) of those steps, compositions of matter, groups of steps or group of compositions of matter.

The disclosure is hereinafter described by way of the following non-limiting Examples and with reference to the accompanying drawings.

BRIEF DESCRIPTION OF THE ACCOMPANYING DRAWINGS

Figures 1, 3:
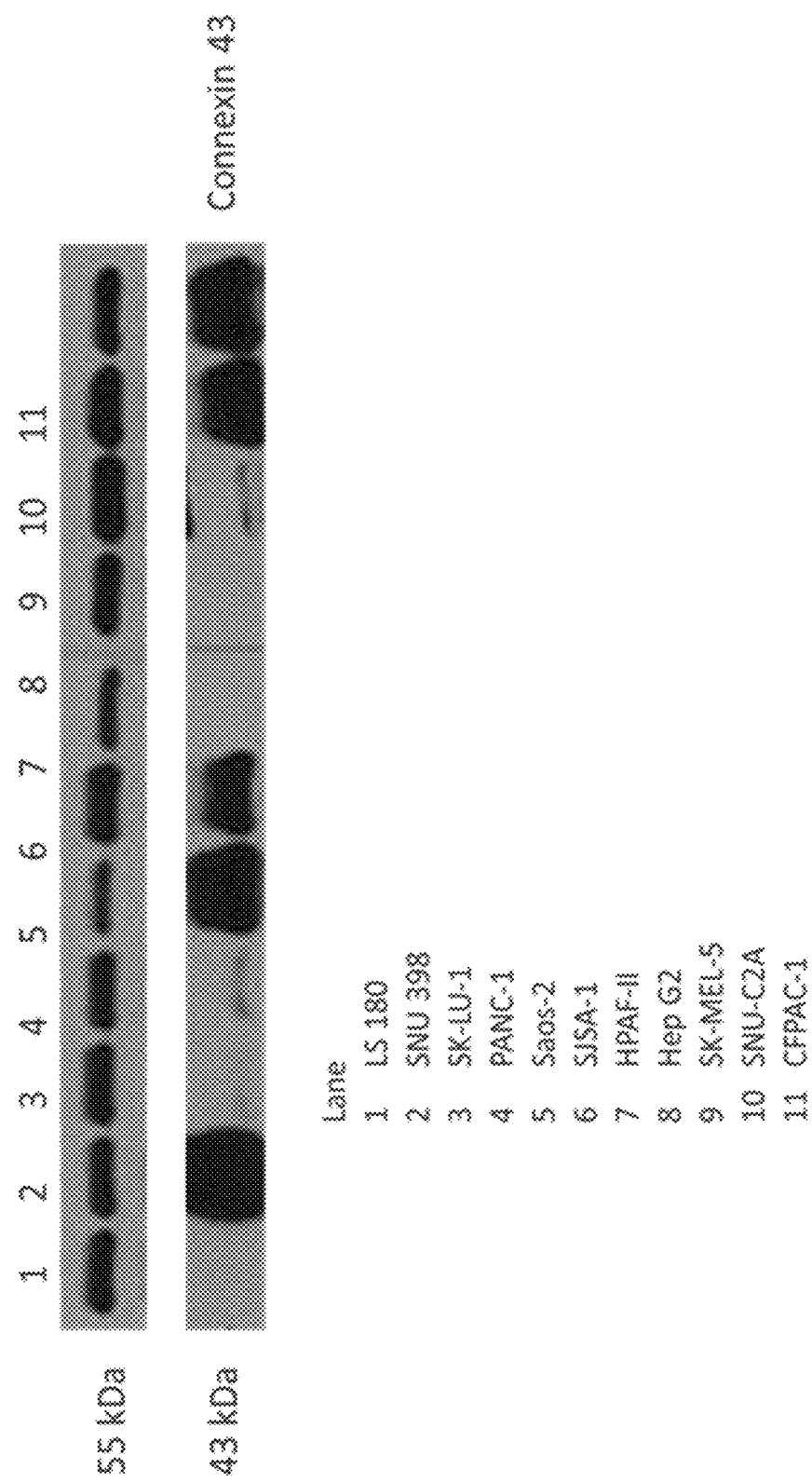
Figures 2, 3:
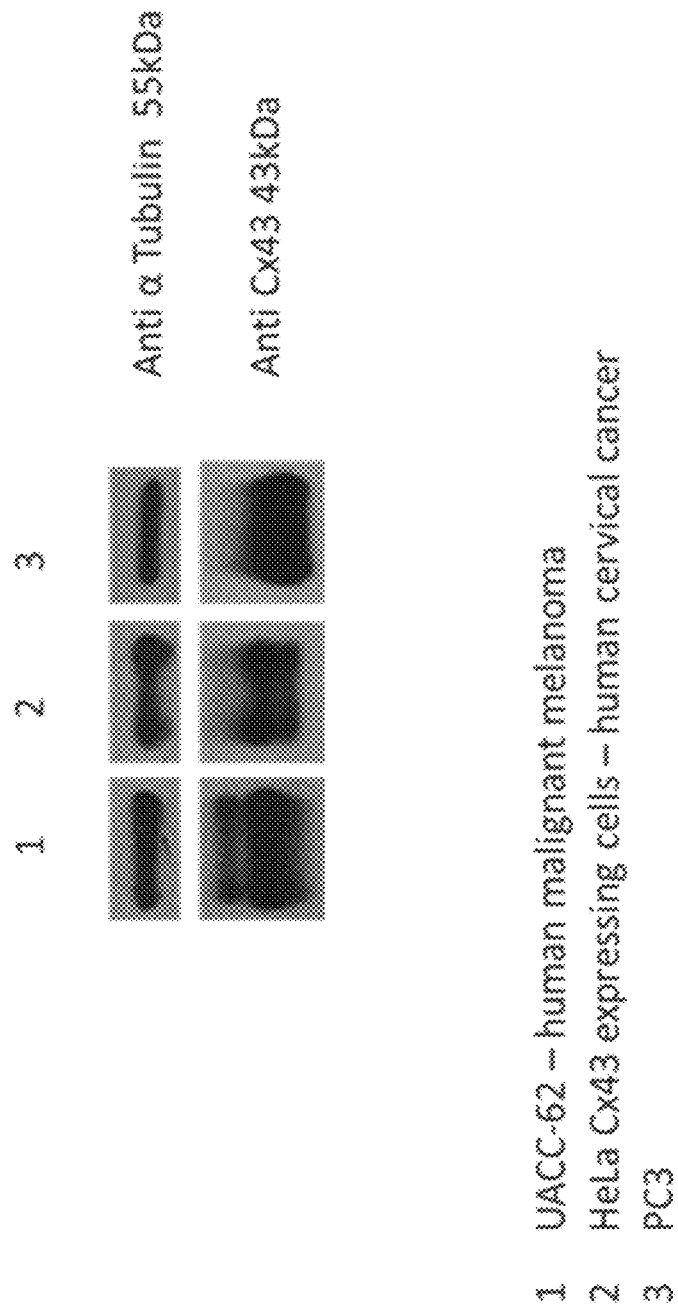

FIG. 1. MPCs (A) and MSCs (B) Express Gap Junction Proteins: Connexin Cx43 & Cx40.

Figure 2:
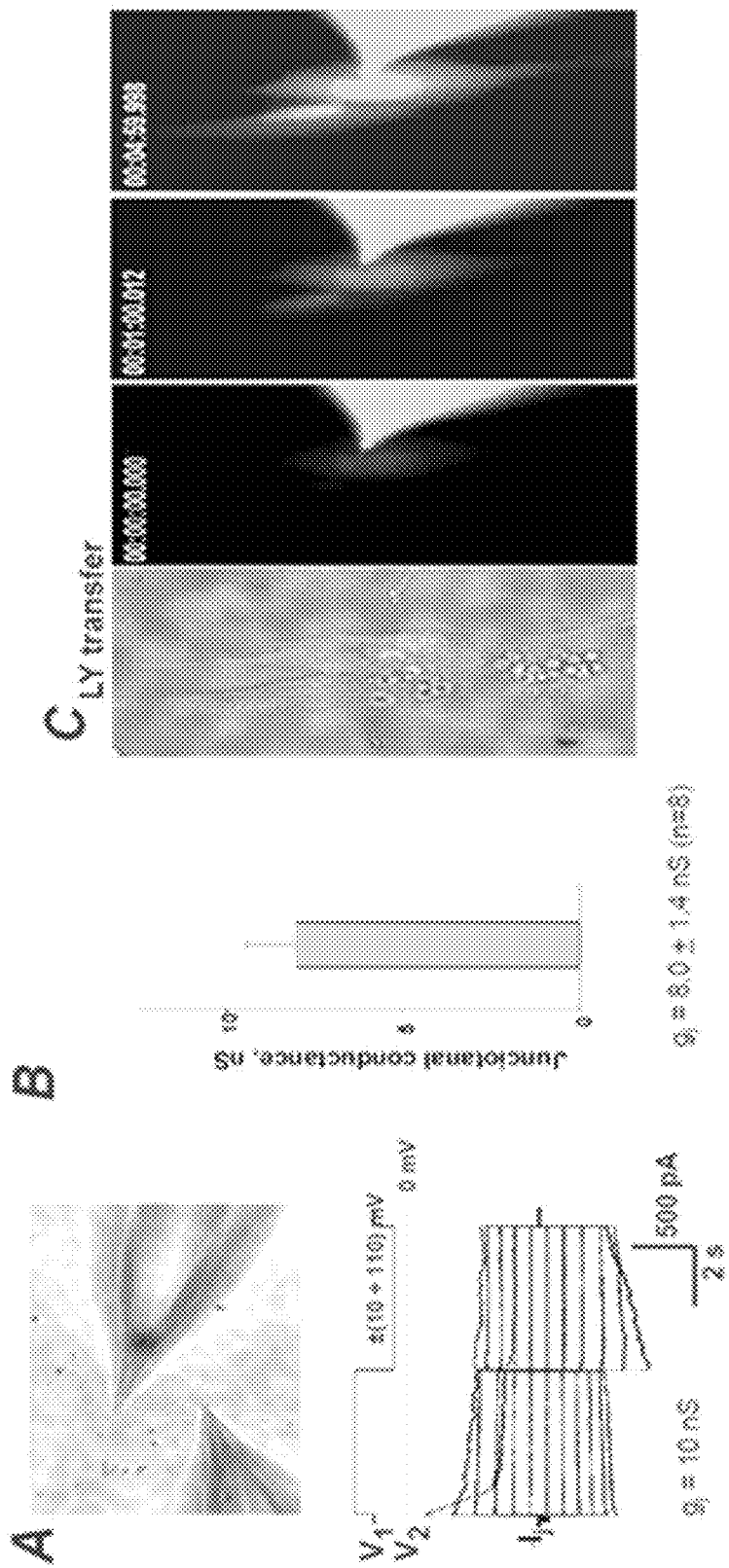

FIG. 2. Patch clamp technique—MPC expression of functional gap junctions.

FIG. 3. Cx43 Expression in Tumour Lines in Screening Panel.

Figure 4:
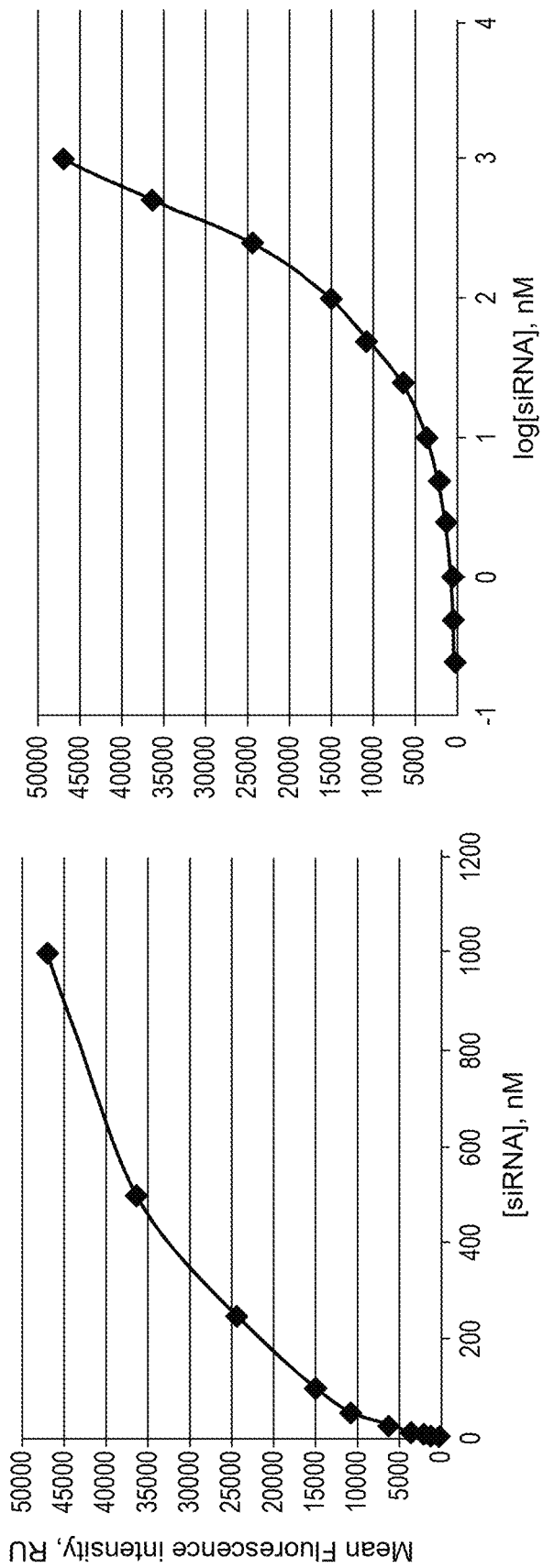

FIG. 4. MPCs transfected with a Cyanine 3 Fluoescent Labeled siRNA using Lipofectamine: 1-1000 nM extracellular concentration.

Figure 5I:
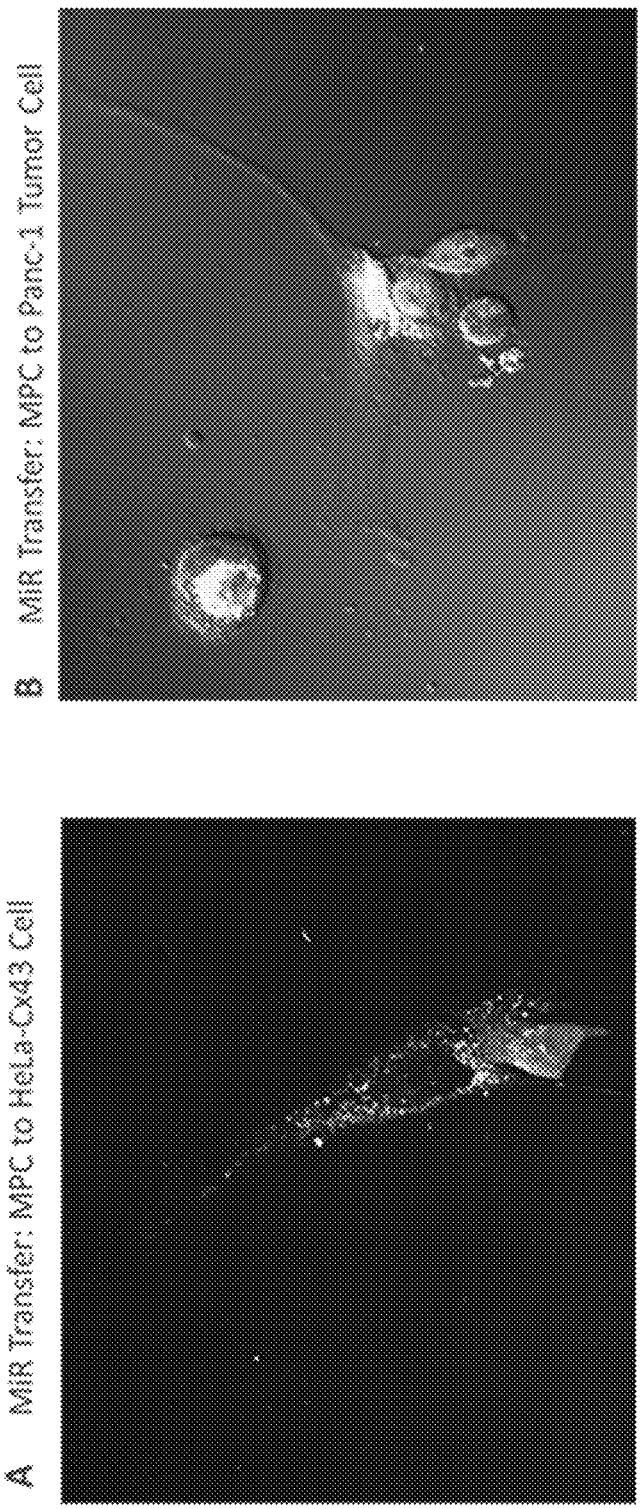
Figure 5:
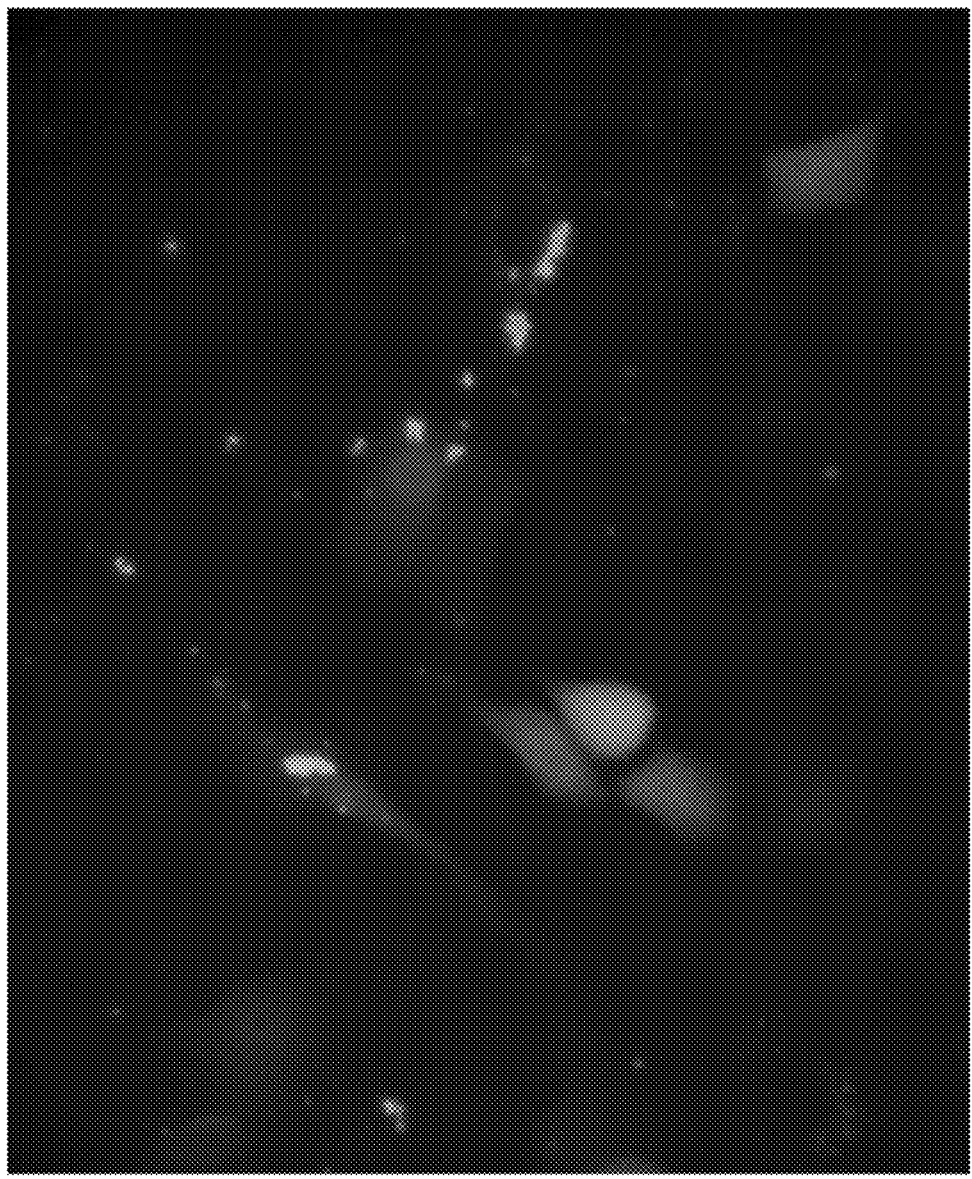

FIG. 5. (i). MPCs Transfer of Cy-5-MiR16 via gap junctions to (A) GFP expressing HeLa-Cx43 cells and (B) GFP expressing PANC-1 cells. (ii). MPCs Transfer of KIF11 siRNA to GFP expressing PANC-1 cells.

FIG. 6. (A) Co-Culture of KIF11 siRNA (100 nM) loaded MPCs & PANC-1 Tumour Cells. (B) Co-Culture of KIF11 siRNA (500 nM) loaded MPCs & PANC-1 Tumour Cells.

Figure 7:
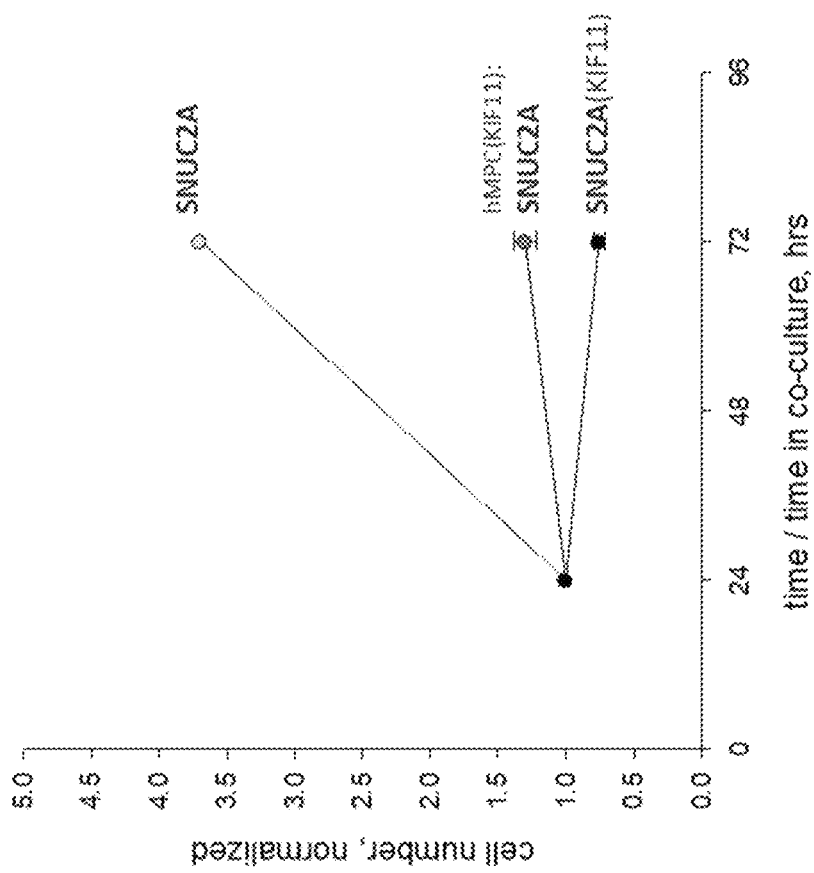

FIG. 7. Co-Culture of KIF11 siRNA (500 nM) loaded MPCs & SNUC2A Tumour Cells.

Figure 8A:
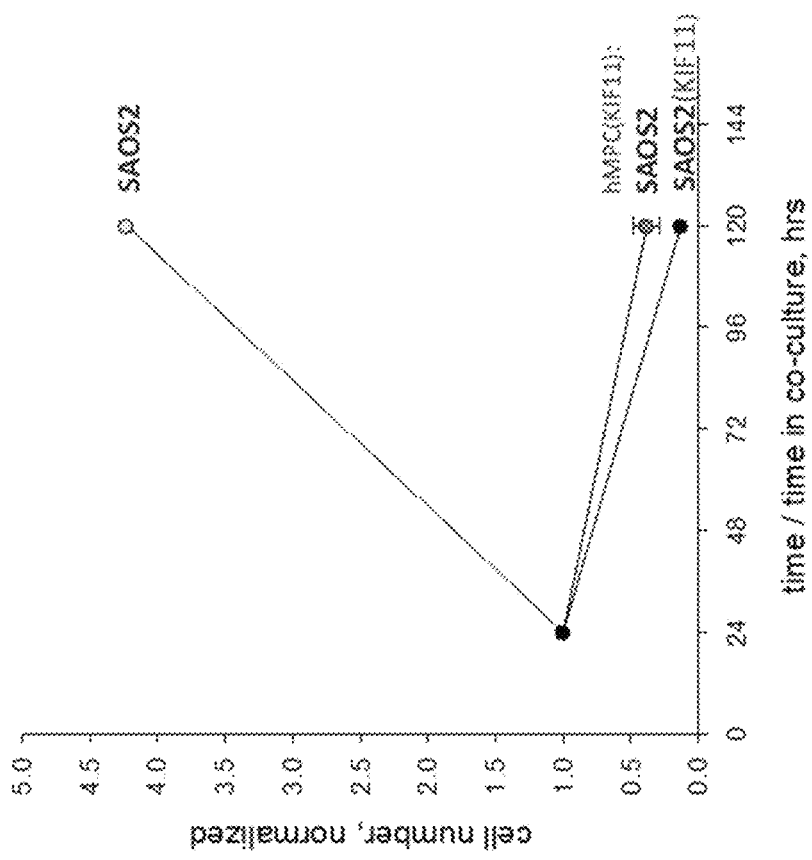
Figure 8B:
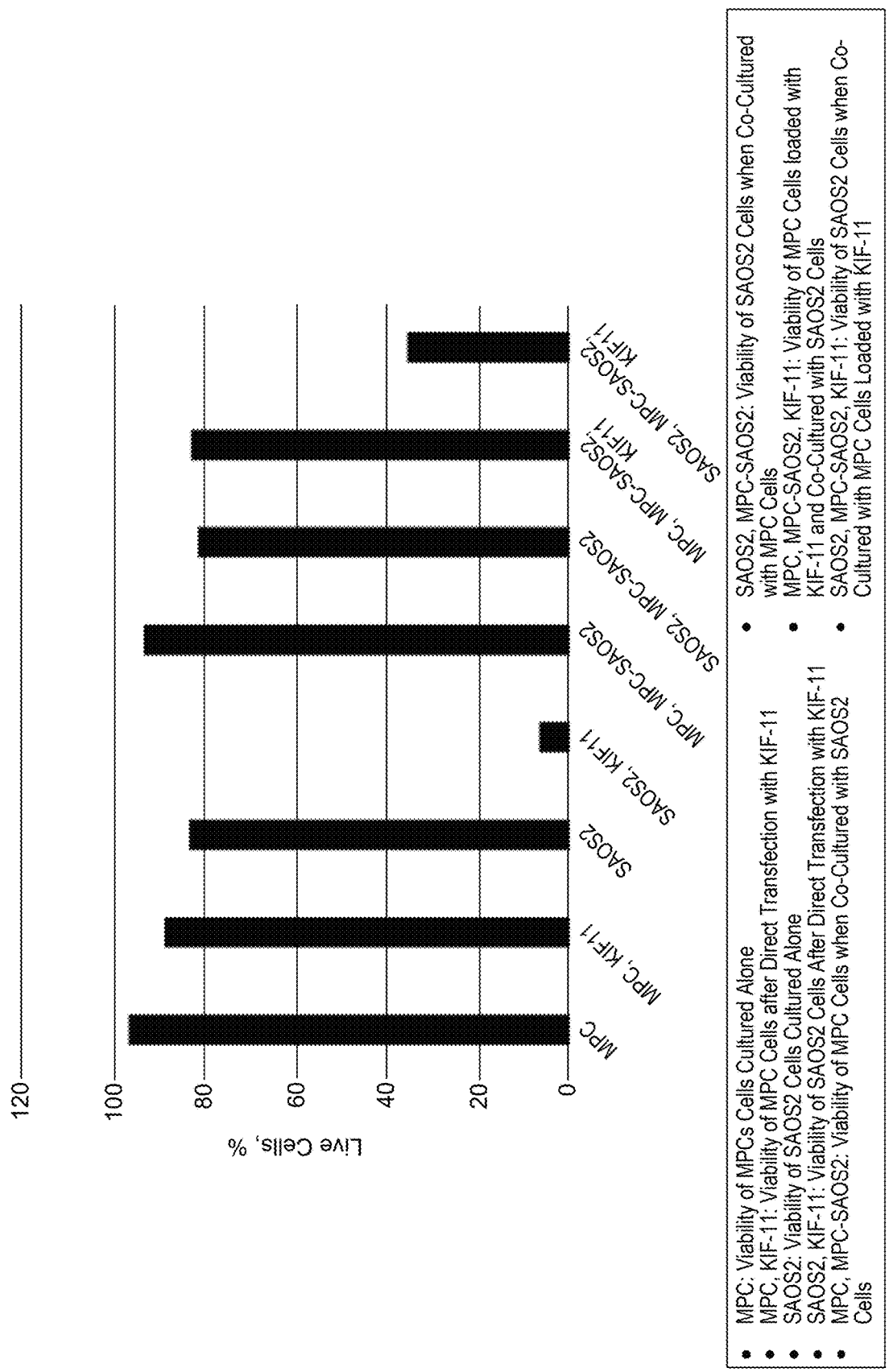

FIGS. 8. (A) and (B) Co-Culture of KIF11 siRNA (500 nM) loaded MPCs & SAOS2 Tumour Cells.

Figure 9:
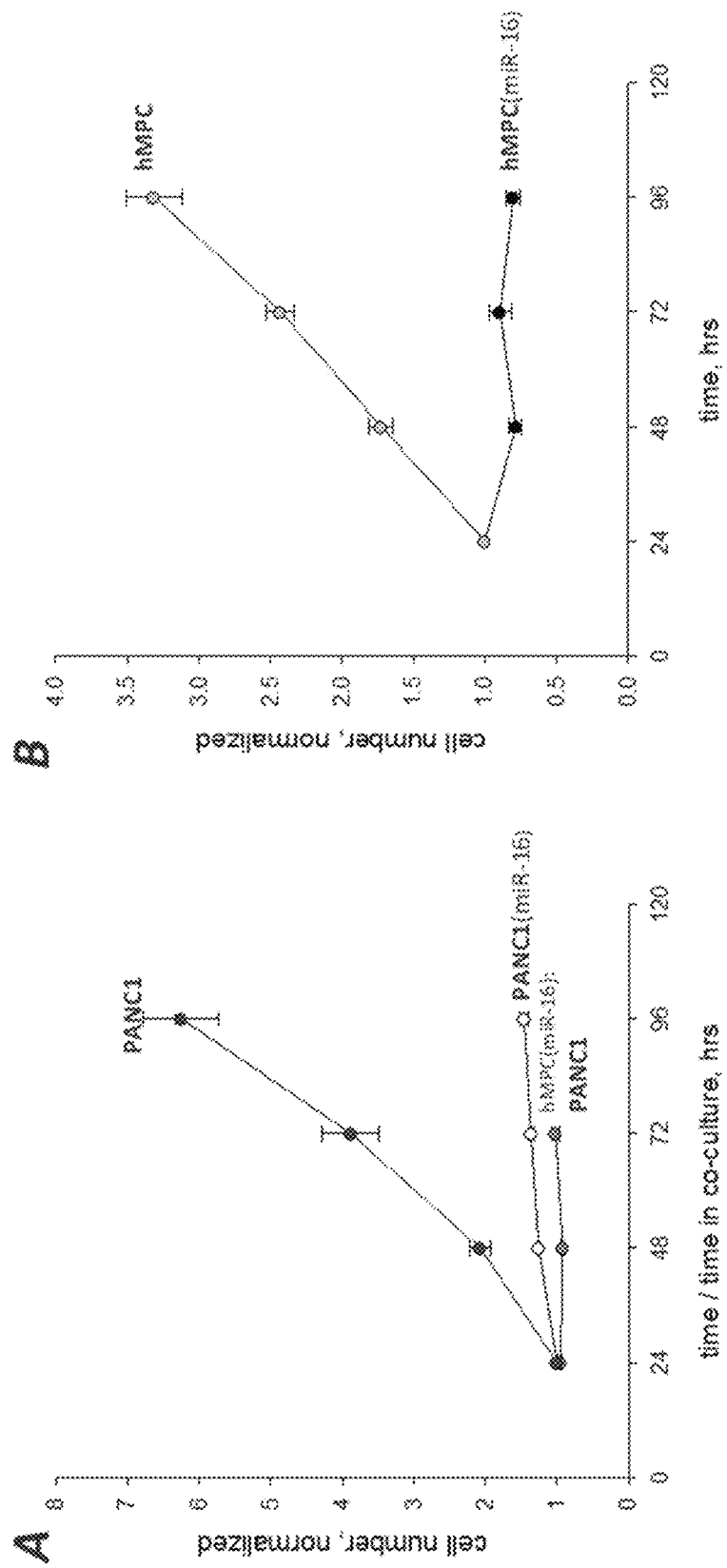

FIG. 9. (A) Co-Culture of Mir-16 (100 nM) loaded MPCs & PANC-1 Tumour Cells. (B) Co-Culture Mir-16 (100 nM) loaded MPCs & untransfected MPCs.

Figure 10:
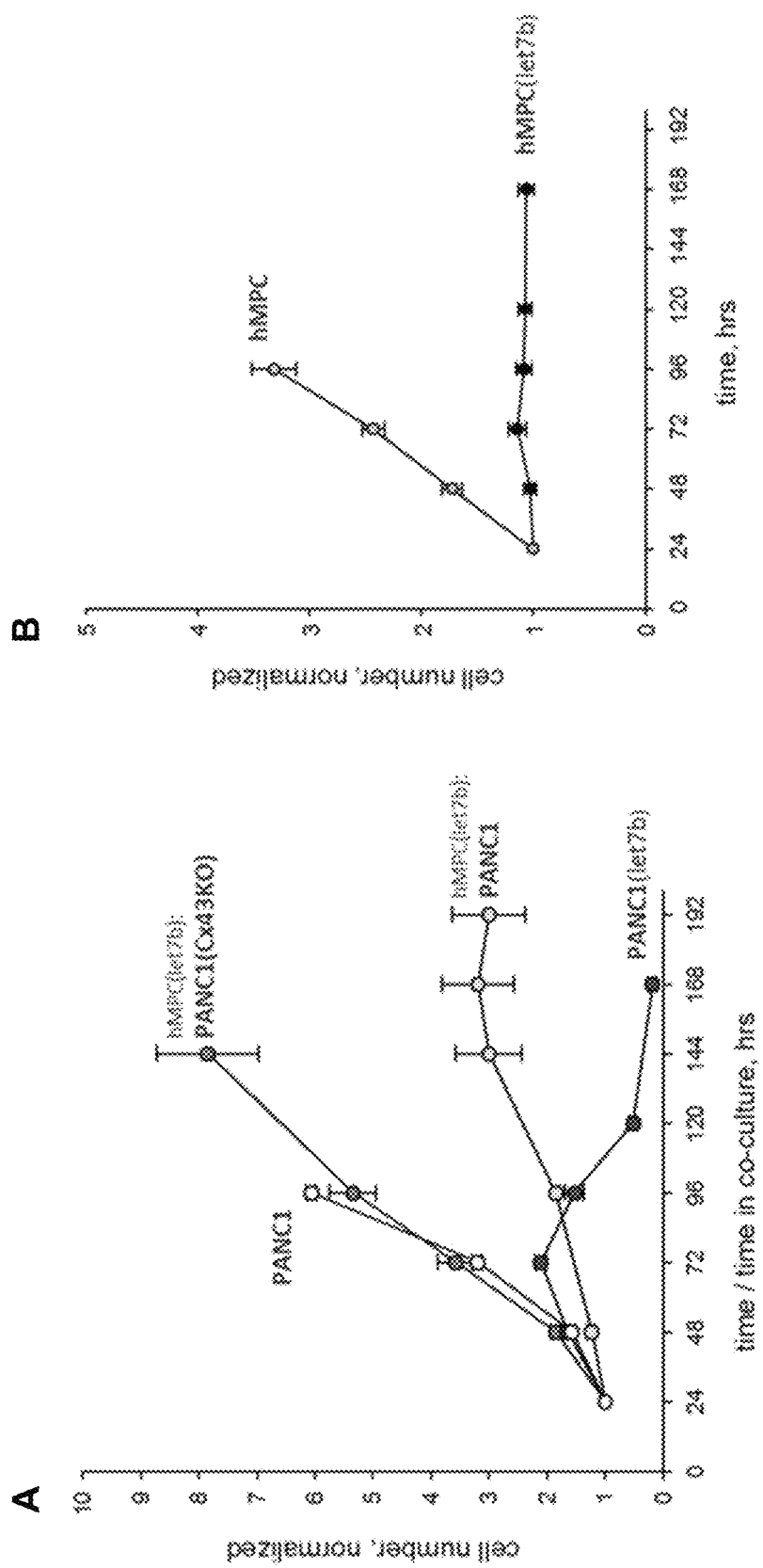

FIG. 10. (A) Co-culture let7b (500 nM) loaded MPCs and PANC-1 (CRISP/Cas9 Cx43 KO) or PANC-1. Growth of PANC-1 cells transfected with let7b and untransfected PANC-1 cells also shown. (B) Growth of MPC transfected with let7b and untransfected MPC.

Figure 11:
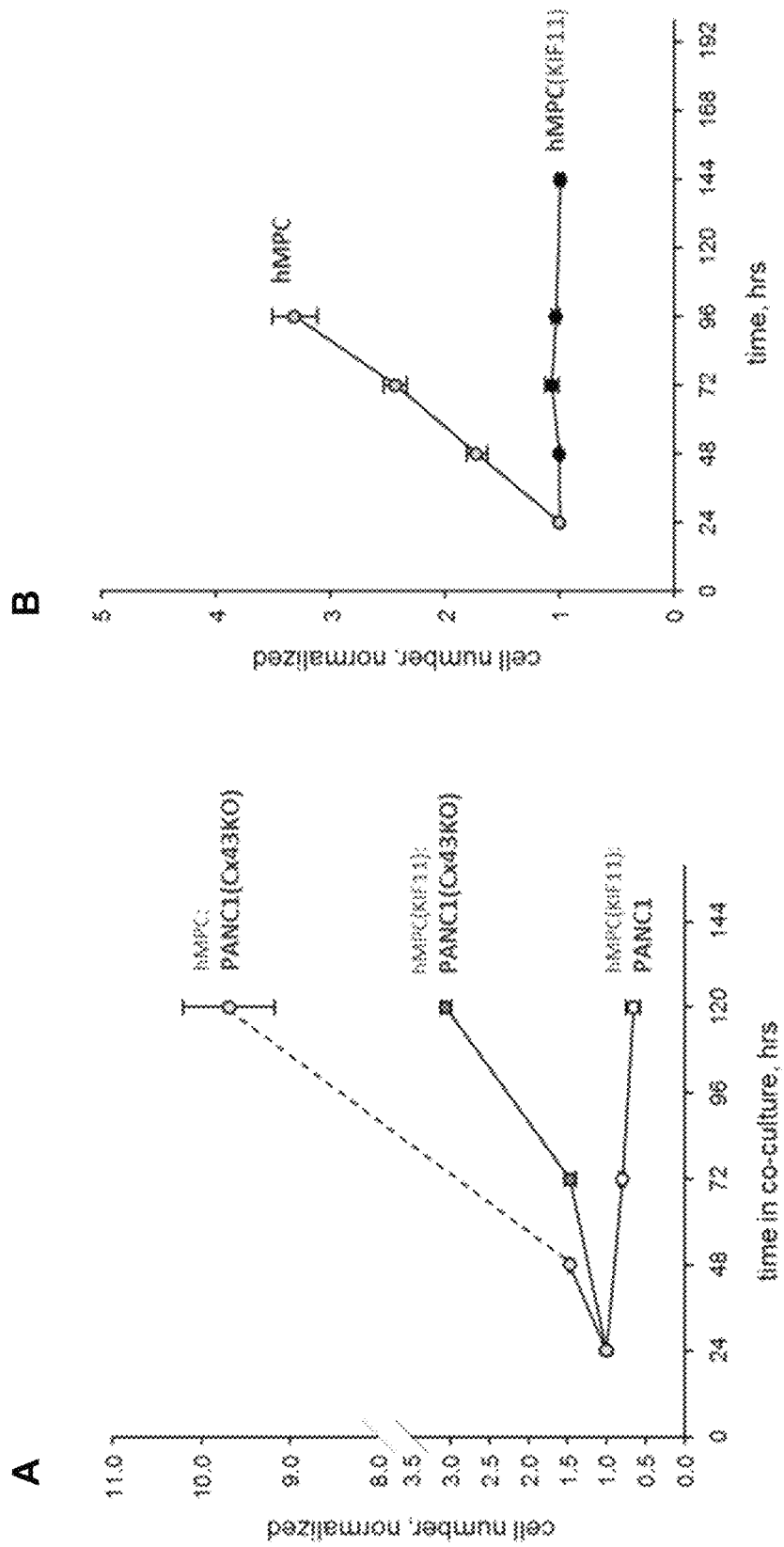

FIG. 11. (A) Co-Culture of KIF11 siRNA (500 nM) loaded MPCs and PANC-1 (CRISP/Cas9 Cx43 KO) or PANC-1. Growth of PANC-1 (CRISP/Cas9 Cx43 KO) cells with untransfected MPC also shown. (B) Growth of KIF11 siRNA (500 nM) loaded MPCs and untransfected MPC.

Figure 12:
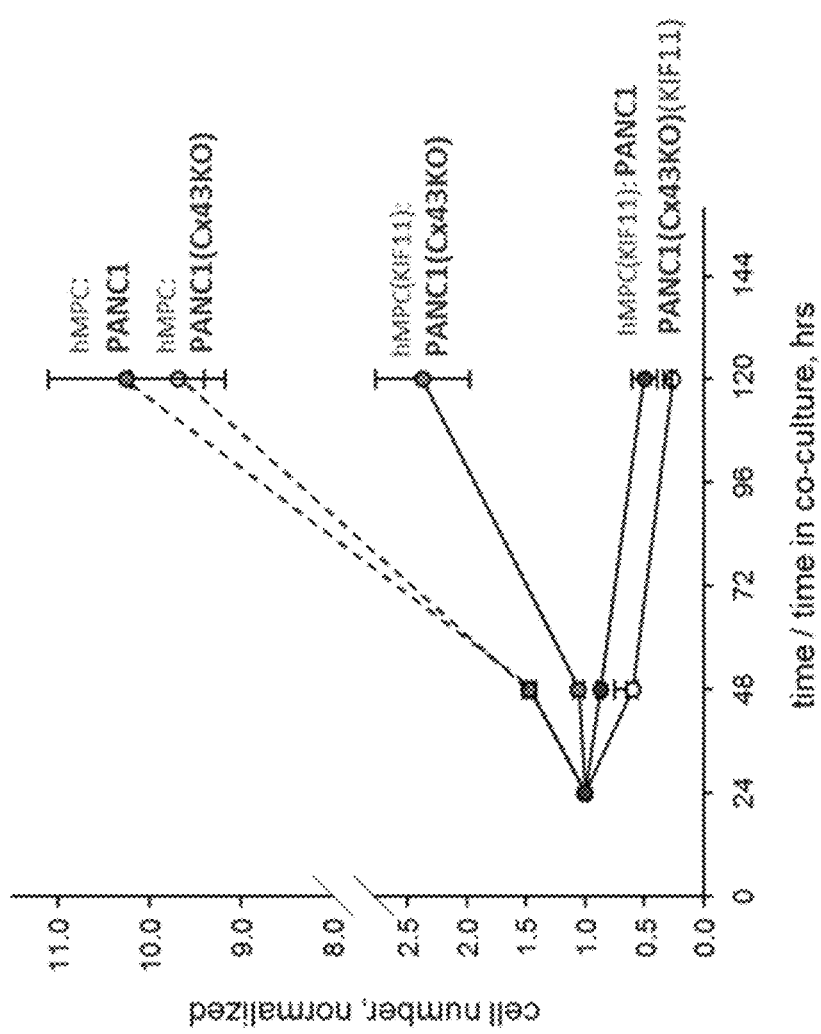

FIG. 12. Data combined: Co-culture KIF11 siRNA (500 nM) loaded MPCs and PANC-1 (CRISP/Cas9 Cx43 KO) or PANC-1. Growth of untransfected MPC co-cultured with PANC-1 (CRISP/Cas9 Cx43 KO) or PANC-1, and growth of PANC-1 (CRISP/Cas9 Cx43 KO) transfected with KIF11 also shown.

Figure 13:
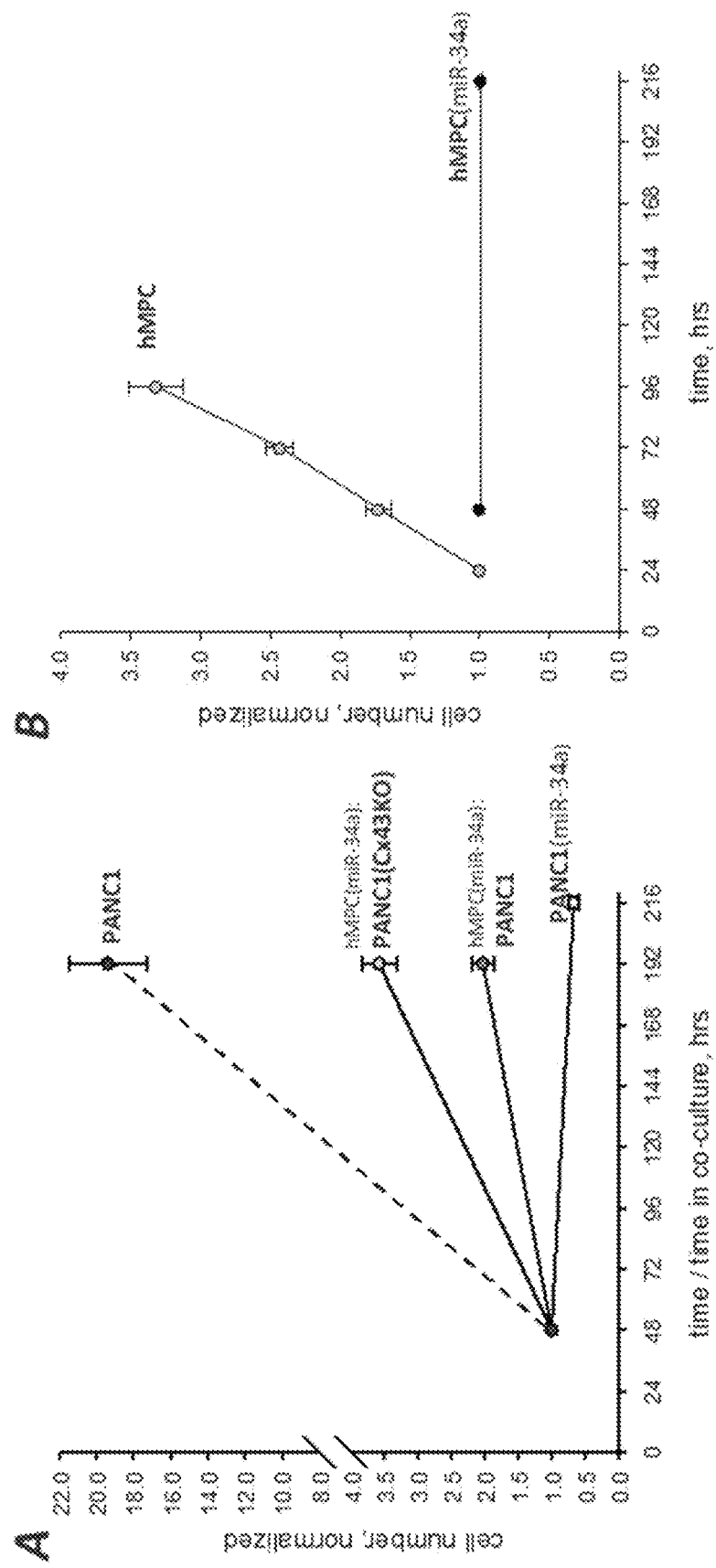

FIG. 13. (A) Co-Culture of Mir-34a (500 nM) loaded MPCs and PANC-1 (CRISP/Cas9 Cx43 KO) or PANC-1. Growth of PANC-1 cells with untransfected MPC, and PANC-1 transfected cells also shown. (B) Growth of Mir-34a (500 nM) loaded MPCs and untransfected MPC.

Figure 14A:
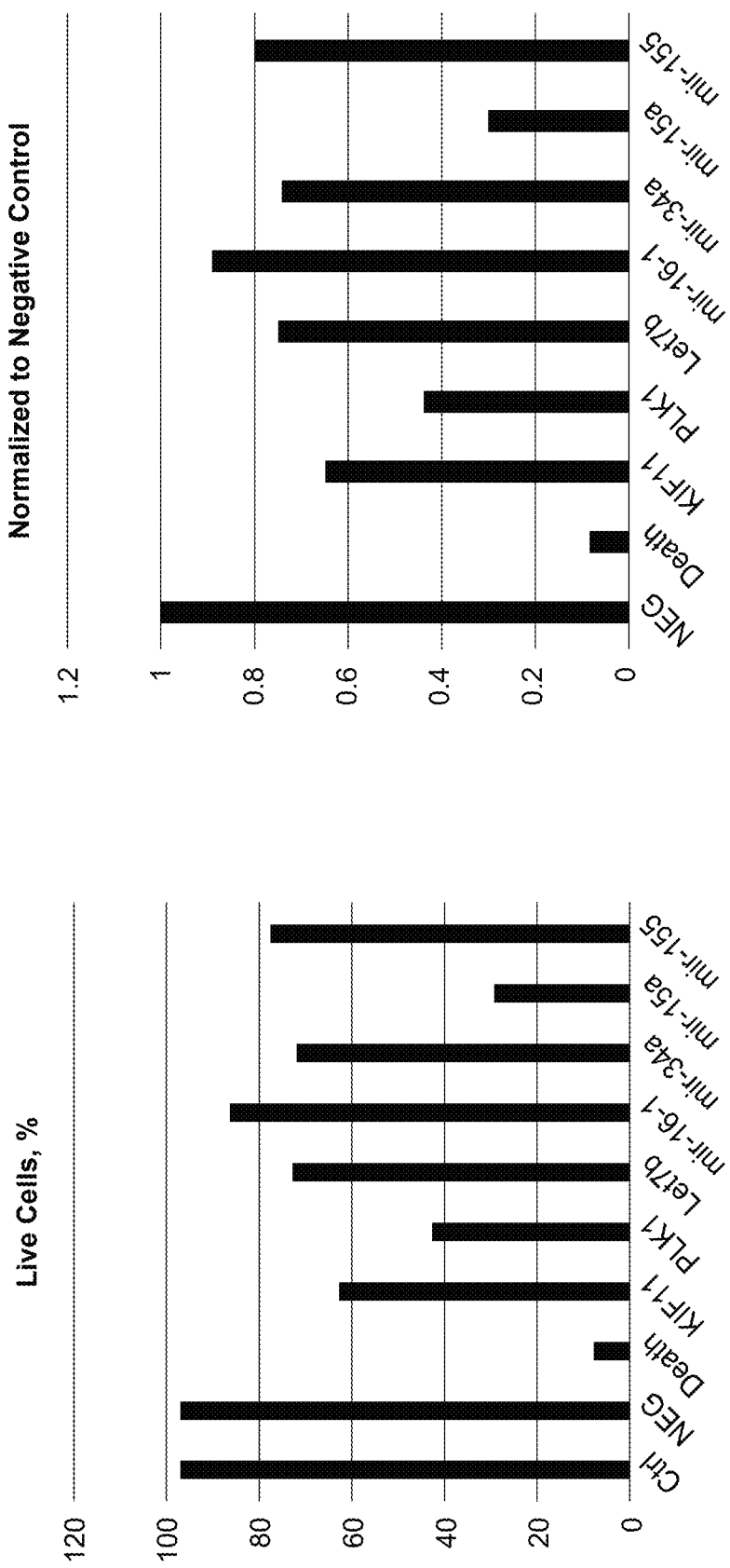
Figure 14B:
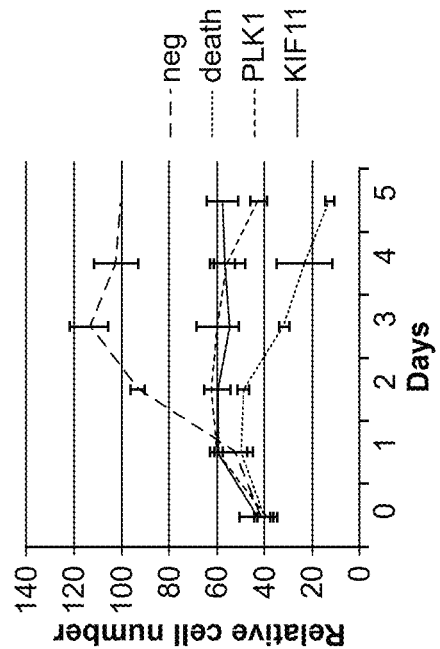
Figure 14B:
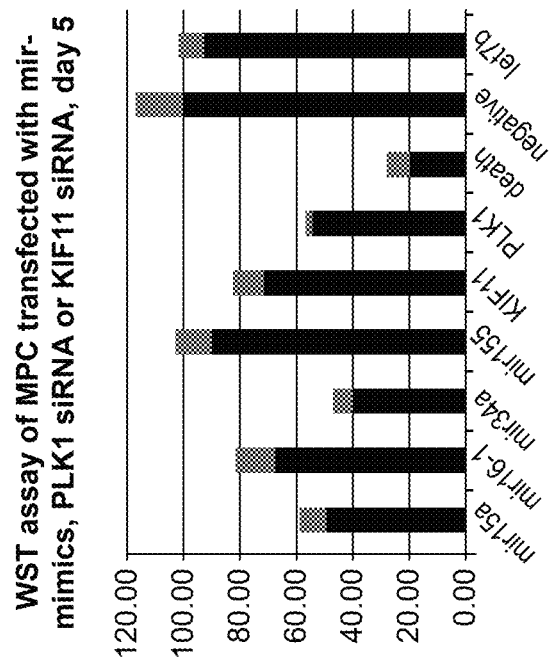

FIG. 14. (A) Death of MPCs transfected with mir-mimics, PLK1 siRNA or KIF11 siRNA, day 5; Fluorometric assay of cell number of MPCs transfected with non-targeting siRNA, death siRNA, PLK1 siRNA and KIF11 siRNA (B) WST assay of MPCs transfected with mir-mimics, PLK1 siRNA or KIF11 siRNA, day 5.

Figure 15A:
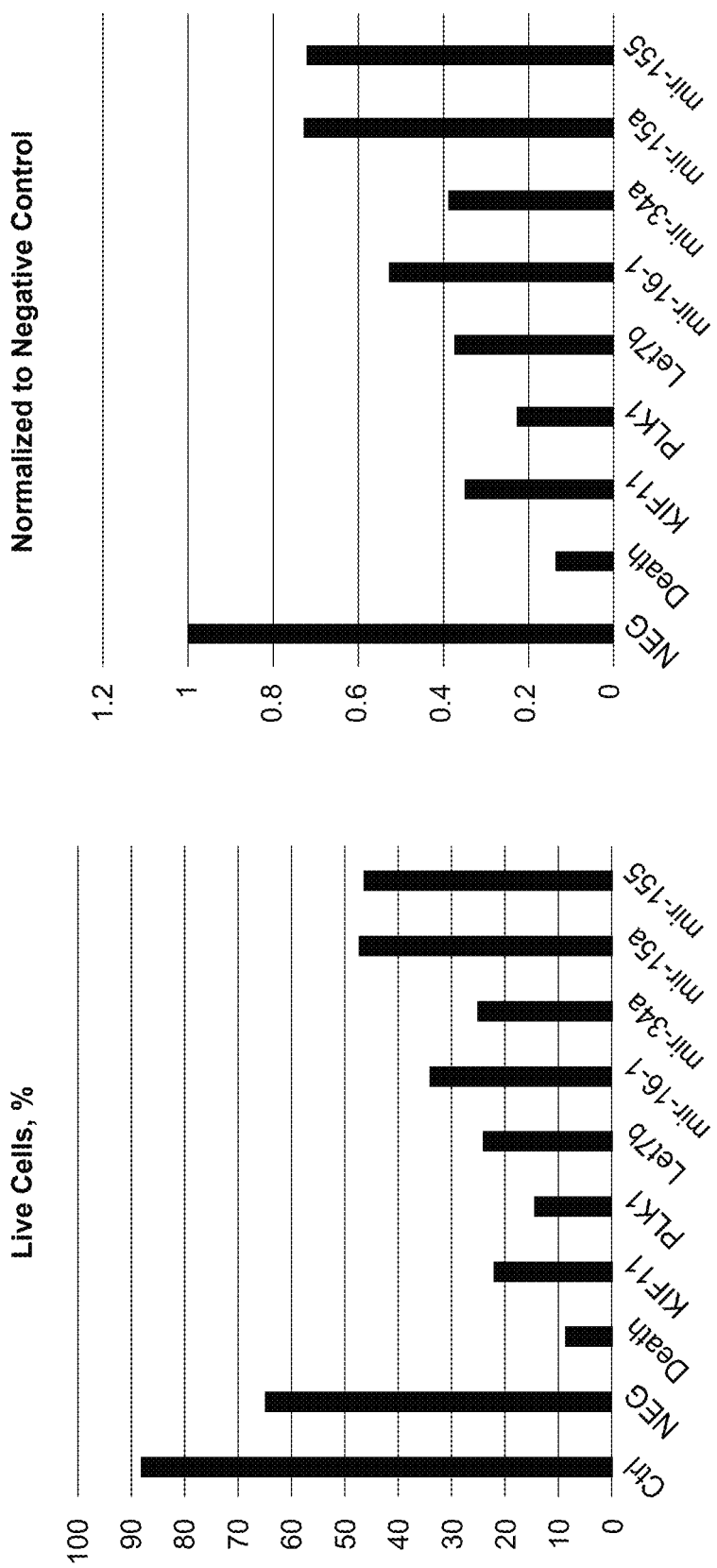
Figure 15B:
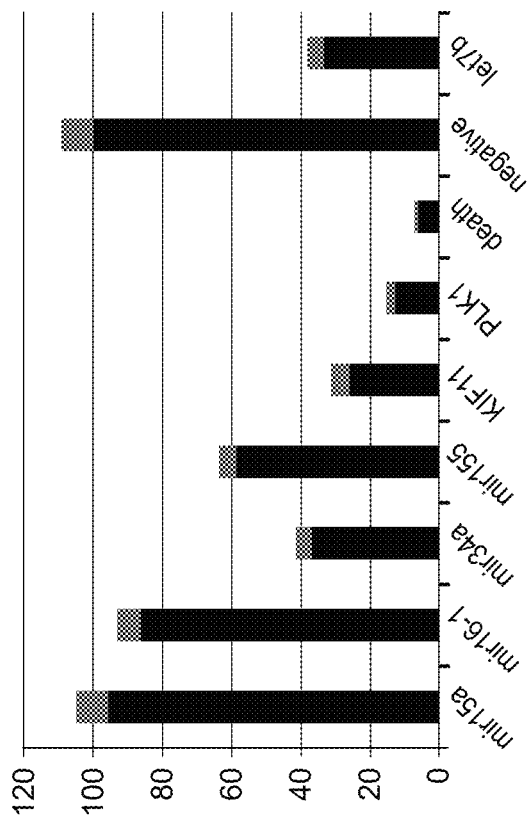

FIG. 15. (A) Death of PANC-1 cells transfected with mir-mimics, PLK1 siRNA or KIF11 siRNA, day 5 (B) WST assay PANC-1 cells transfected with mir-mimics, PLK1 siRNA or KIF11 siRNA, day 5.

Figure 16A:
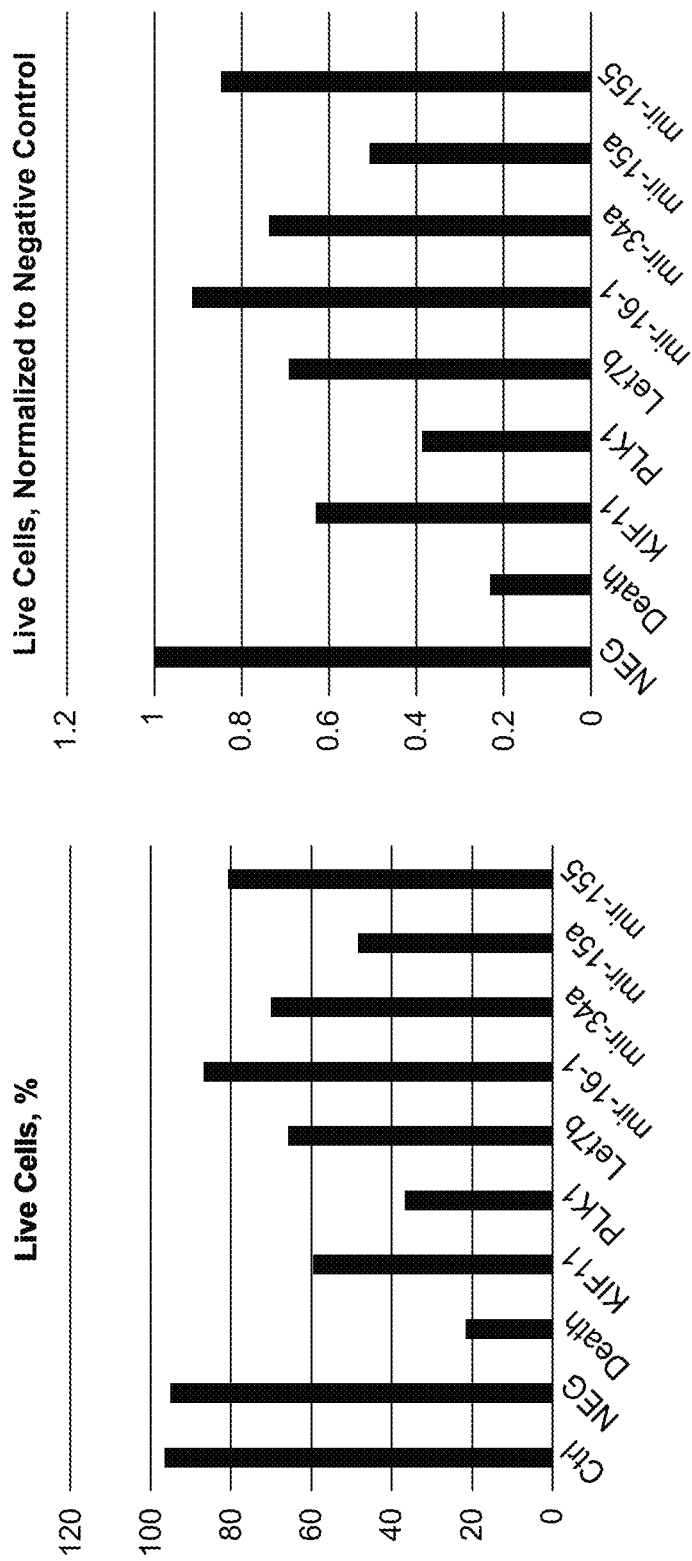
Figure 16B:
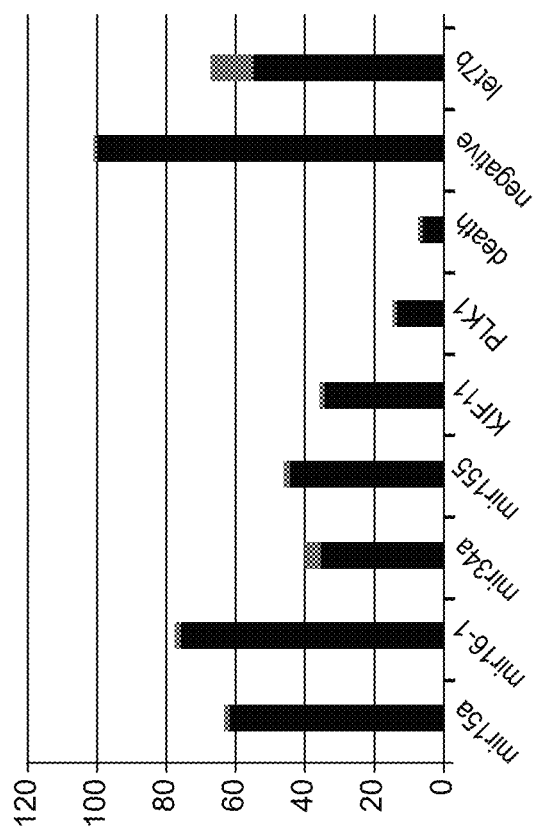

FIG. 16. (A) Death of PC3 cells transfected with mir-mimics, PLK1 siRNA or KIF11 siRNA, day 5 (II) (B) WST assay of PC3 cells transfected with mir-mimics, PLK1 siRNA or KIF11 siRNA, day 5.

Figure 17A:
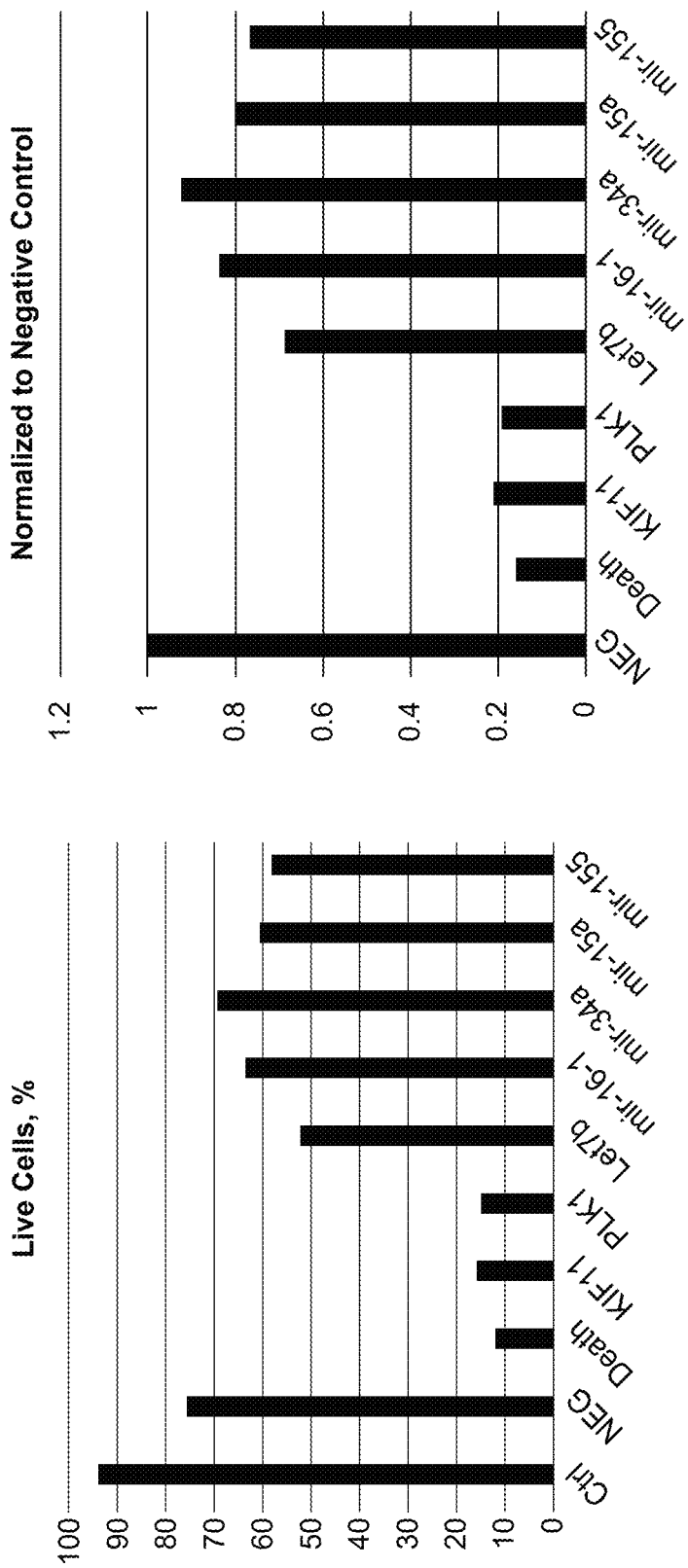
Figure 17B:
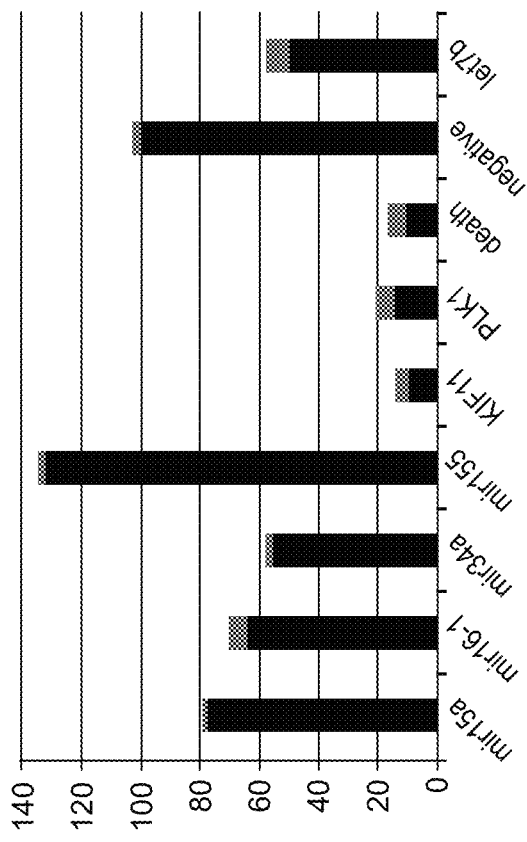

FIG. 17. (A) Death of SAOS2 cells transfected with mir-mimics, PLK1 siRNA or KIF11 siRNA, day 5 (II) (B) WST assay of SAOS2 cells transfected with mir-mimics, PLK1 siRNA or KIF11 siRNA, day 5.

Figure 18:
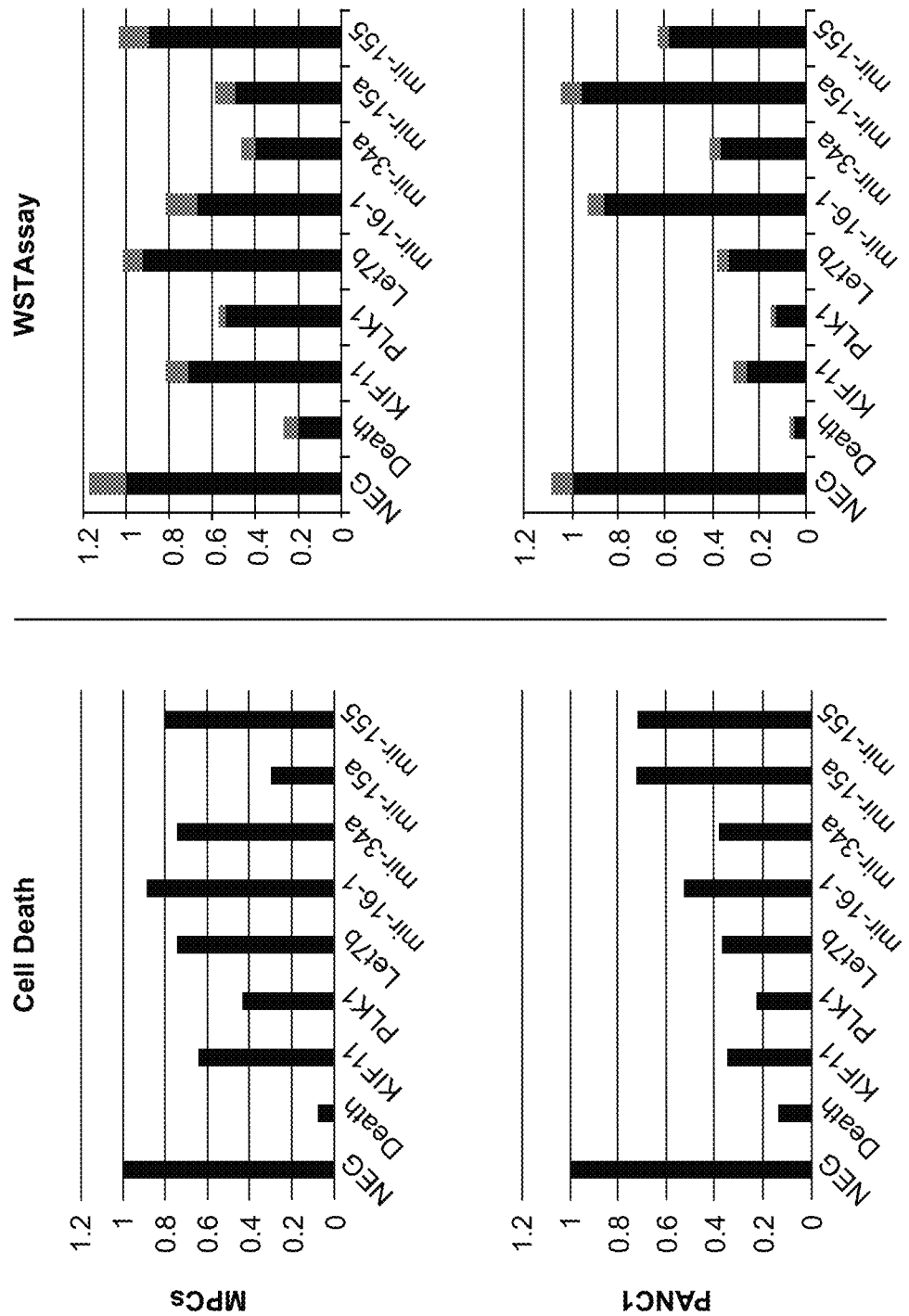

FIG. 18. Comparative analysis of cell death and WST Assays (MPCs; PANC-1).

Figure 19:
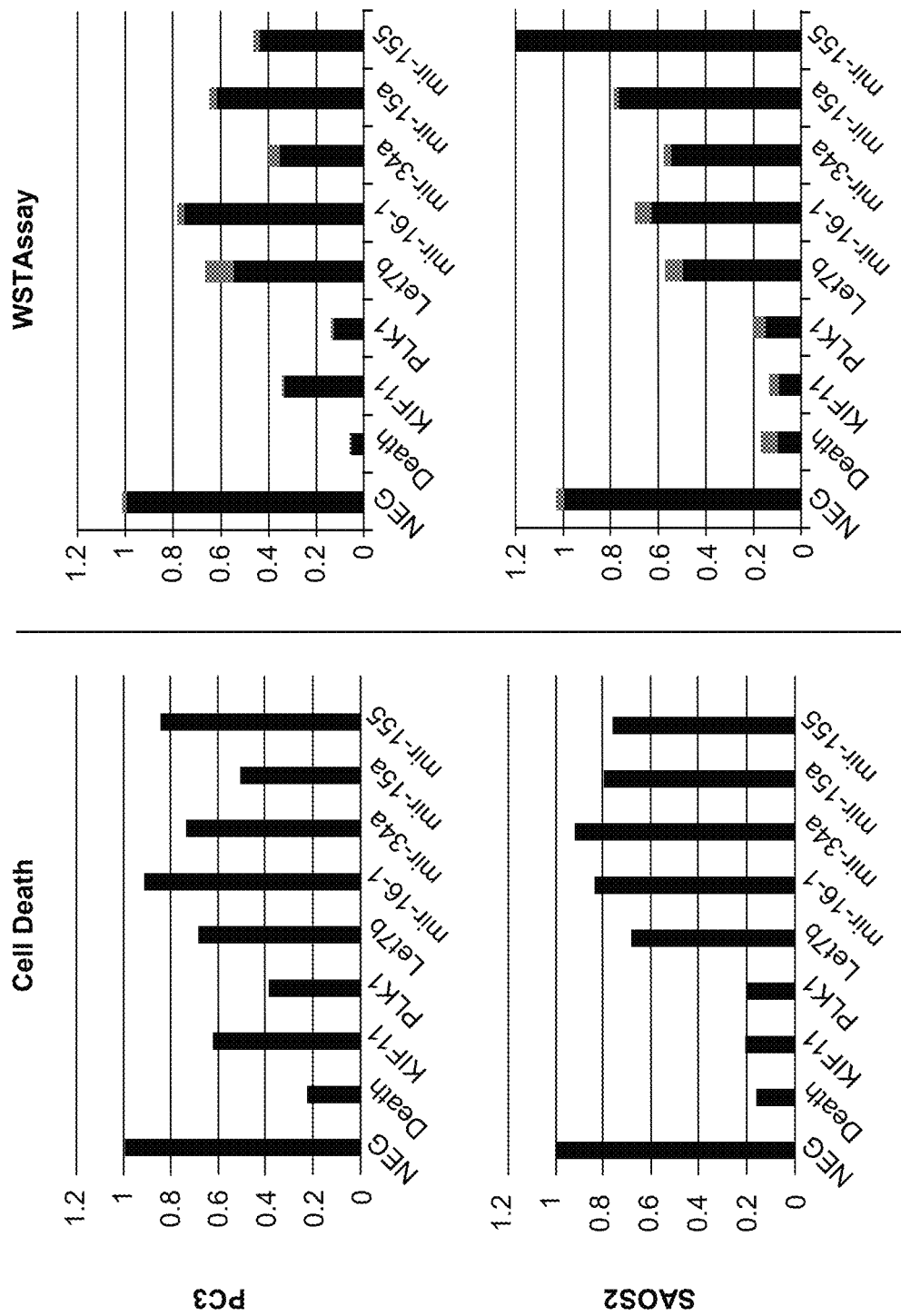

FIG. 19. Comparative analysis of cell death and WST Assays (PC3; SAOS2).

Figure 20:
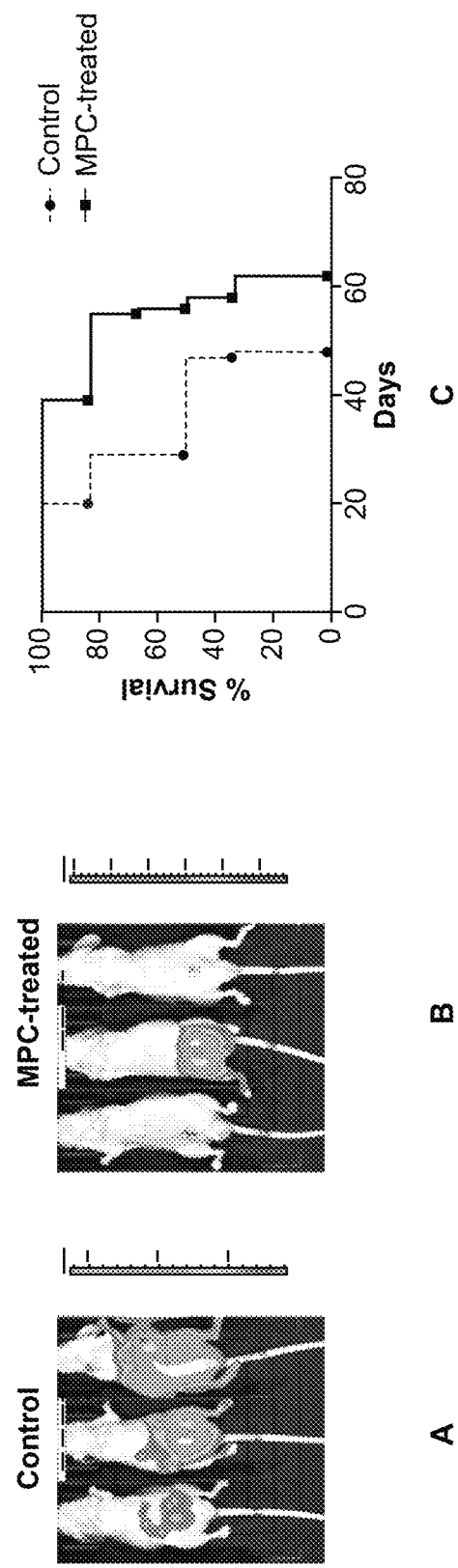

FIG. 20. PC3 prostate xenograft tumour model. Mice were orthotopically implanted in the prostate with 0.5 million PC3 cells expressing luciferase, with (treated) or without (control) 0.5 million MPC loaded with 500 nM siRNA against KIF11. One week later, mice were injected with luciferin and imaged to visualise tumours. Panel (A) shows control mice and Panel (B) shows MPC treated mice. Panel (C) shows the survival curves for treated and untreated mice.

Figure 21:
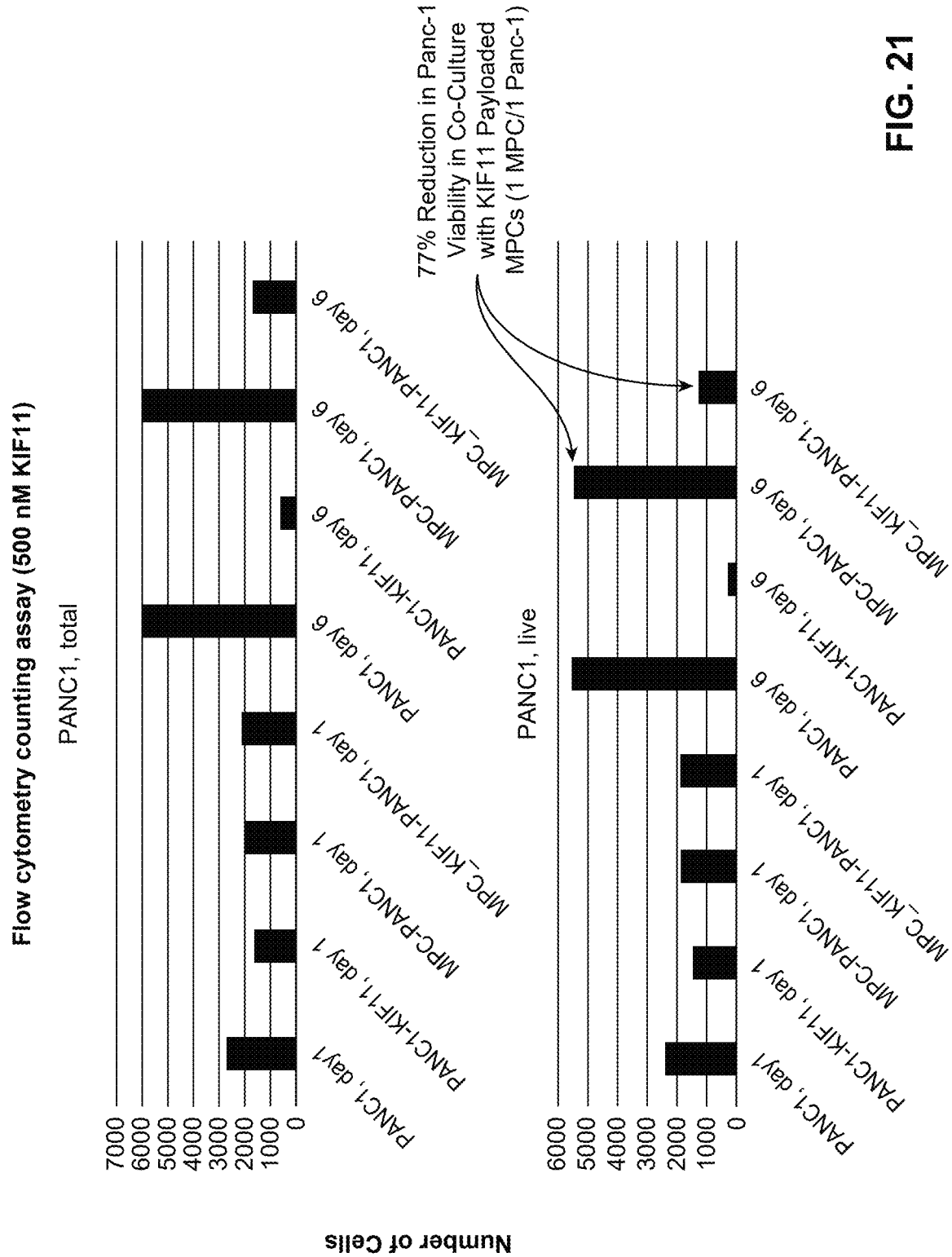

FIG. 21. Measurement of Total (Panel A) and Live (Panel B) PANC-1 cells after Co-Culture with MPCs transfected with 500 nM KIF11 (1/1 ratio of MPCs/PANC-1 cells). X-Axis for Panel A and B:
  PANC-1, day 1: Number of PANC-1 cells after 1 day in culture (PANC-1 cells cultured alone)
    PANC-1-KIF11 siRNA, day 1: Number of PANC-1 transfected with 500 nM KIF11 measured after 1 day in culture
  MPC-PANC-1, day 1: Number of PANC-1 cells after 1 day in co-culture with MPCs (1/1 ratio)
  MPC_KIF11-PANC-1: Number of PANC-1 cells after 1 day in co-culture with MPCs transfected with KIF11 (500 nM; 1/1 Ratio)
  PANC-1, day 6: Number of PANC-1 cells after 6 days in culture (PANC-1 cells cultured alone)
  PANC-1-KIF11 siRNA, day 6: Number of PANC-1 transfected with 500 nM KIF11 measured after 6 days in culture.
  MPC-PANC-1, day 1: Number of PANC-1 cells after 6 days in co-culture with MPCs (1/1 ratio)
  MPC_KIF11-PANC-1: Number of PANC-1 cells after 6 days in co-culture with MPCs transfected with KIF11 (500 nM; 1/1 Ratio).

Figure 22:
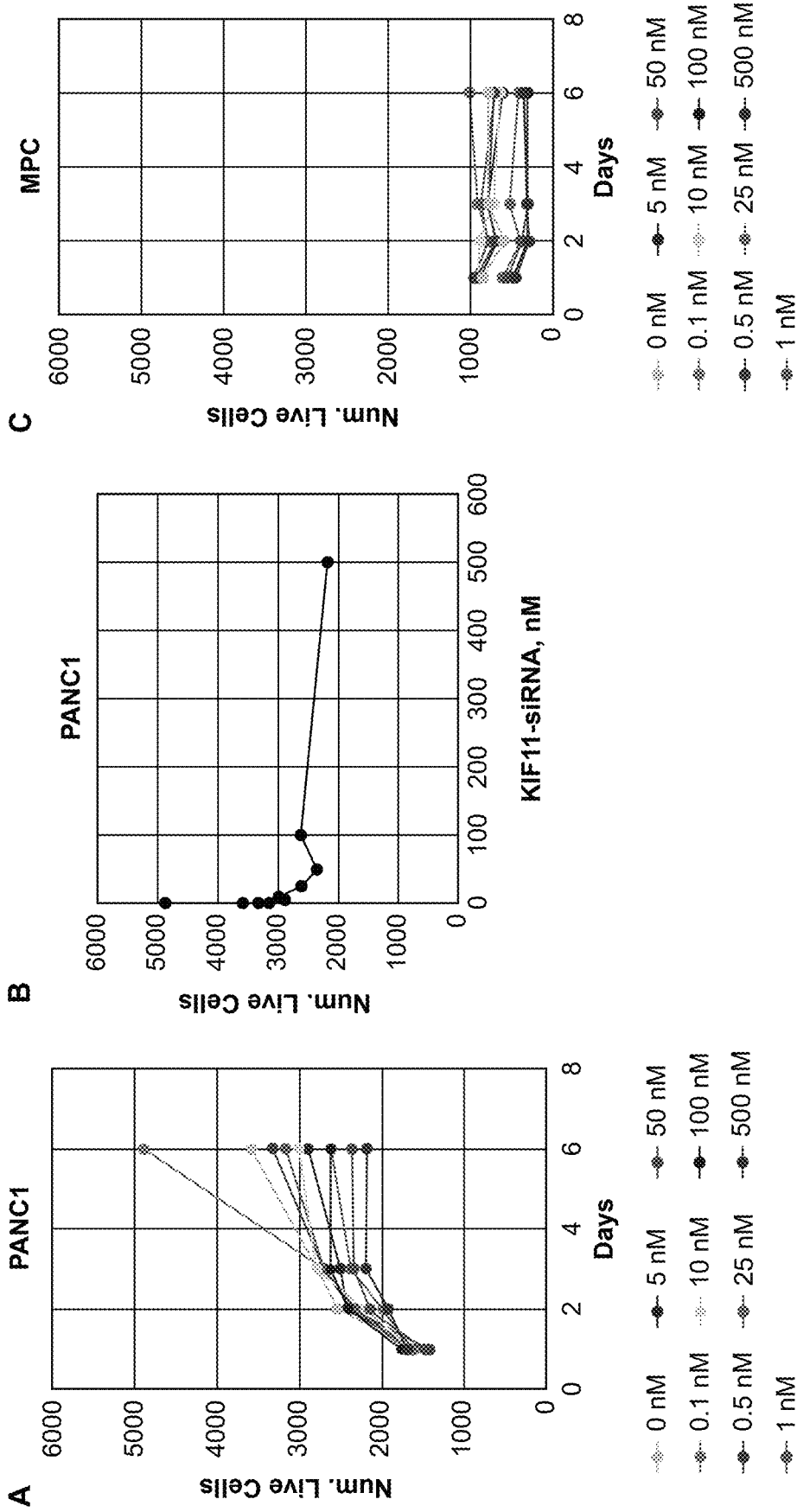

FIG. 22. Effect of KIF11 siRNA from MPCs to PANC-1 cells in co-culture. Panel A shows time course of PANC-1 cell growth in co-culture with MPCs loaded with KIF11-siRNA (0-500 nM). Panel B shows dose-response curve of PANC-1 cell growth in co-culture with MPCs loaded with KIF11-siRNA (0-500 nM) on day 5 of cell culture. Panel C shows time course of MPCs growth after transfection with KIF11 siRNA (0-500 nM) in co-culture with PANC-1. Results represent average of three independent measurements.

Figure 23:
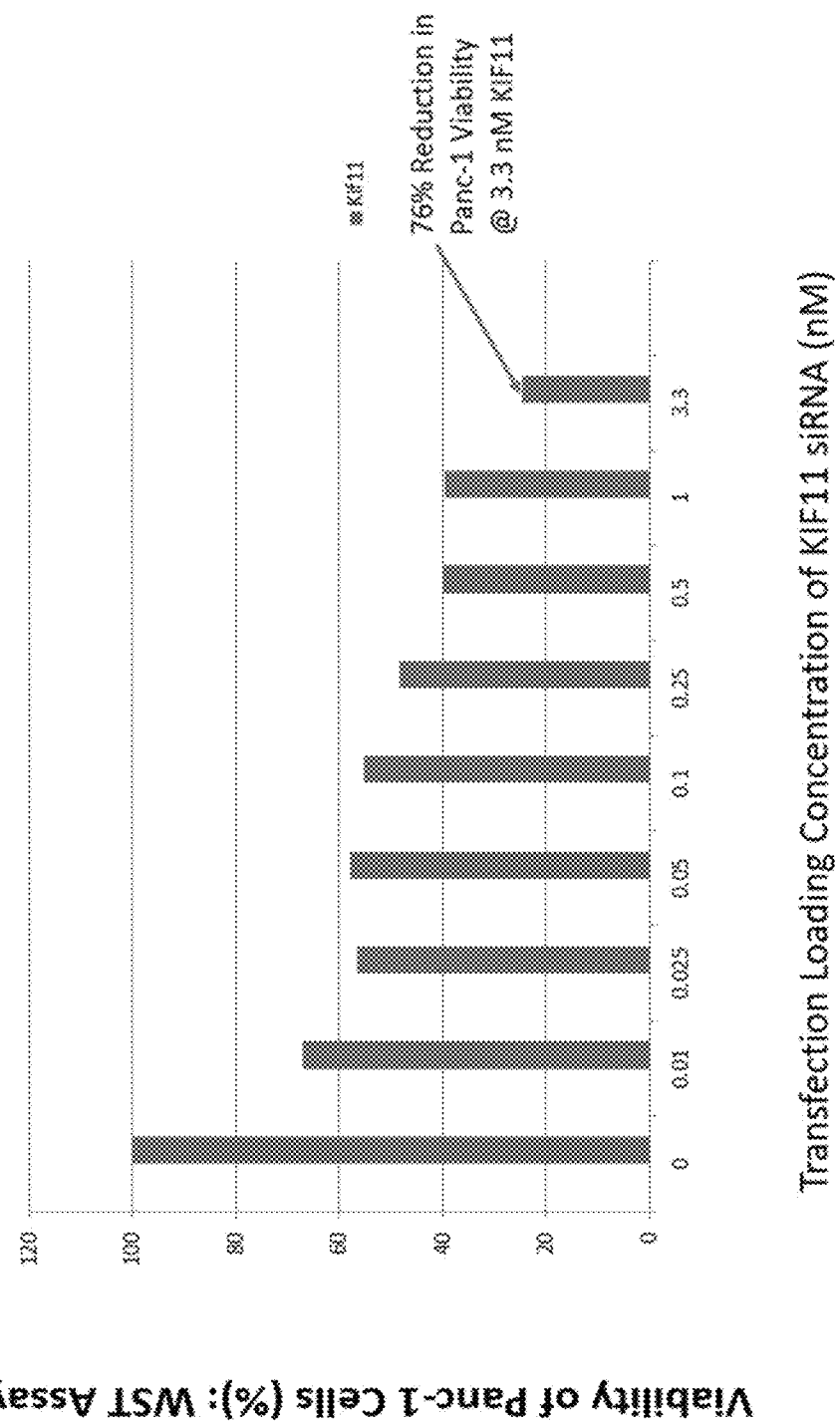

FIG. 23. Dose dependent inhibition of PANC-1 cell viability by KIF11 (direct transfection).

Figure 24:
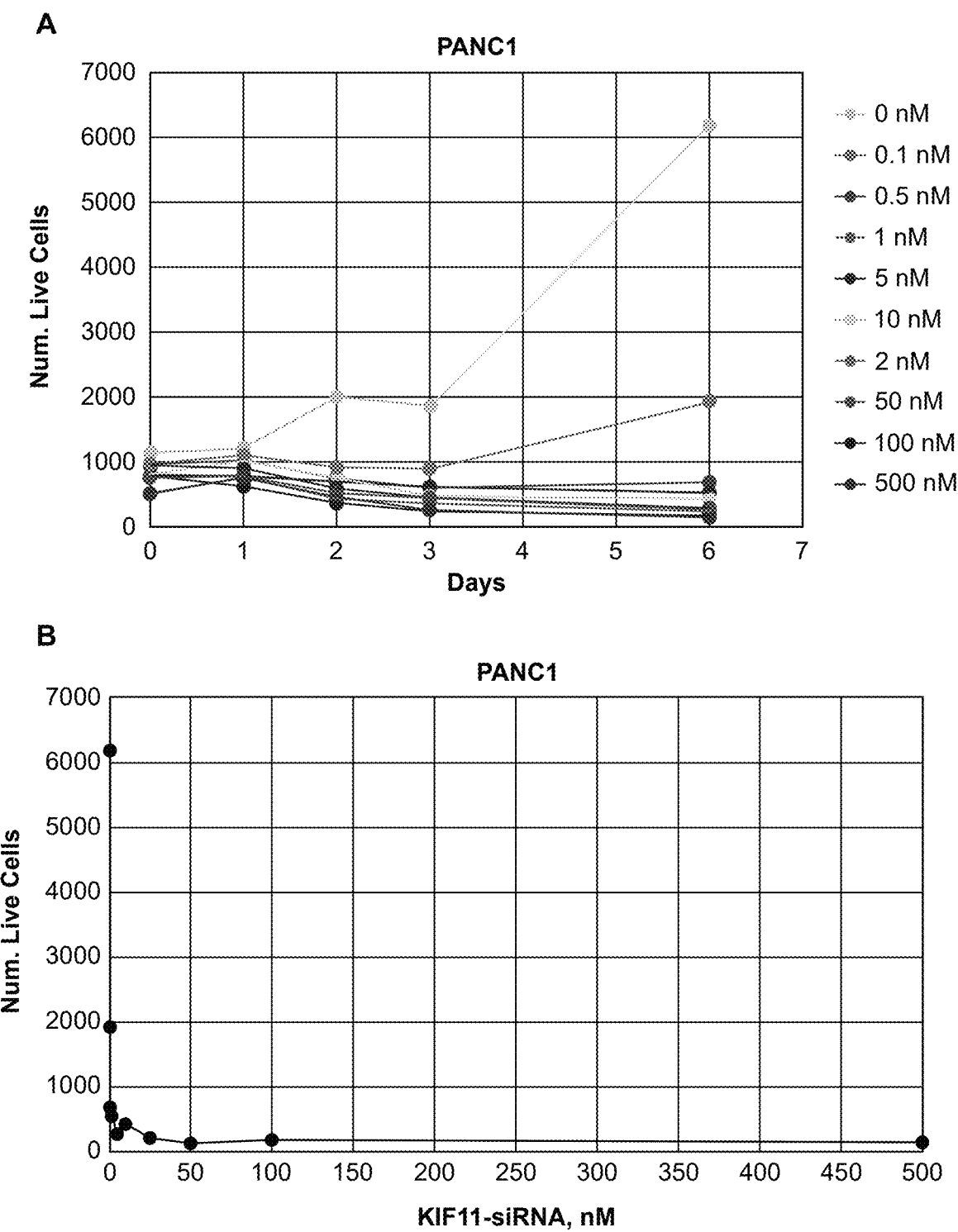

FIG. 24. Effect of KIF11 siRNA on PANC-1 cell growth. Panel A shows time course of PANC1 cell growth after transfection with KIF11 siRNA (0-500 nM). Panel B shows dose-response curve of PANC-1 cell growth after transfection with KIF11 siRNA (0-500 nM) on day 6 of cell culture.

Figure 25:
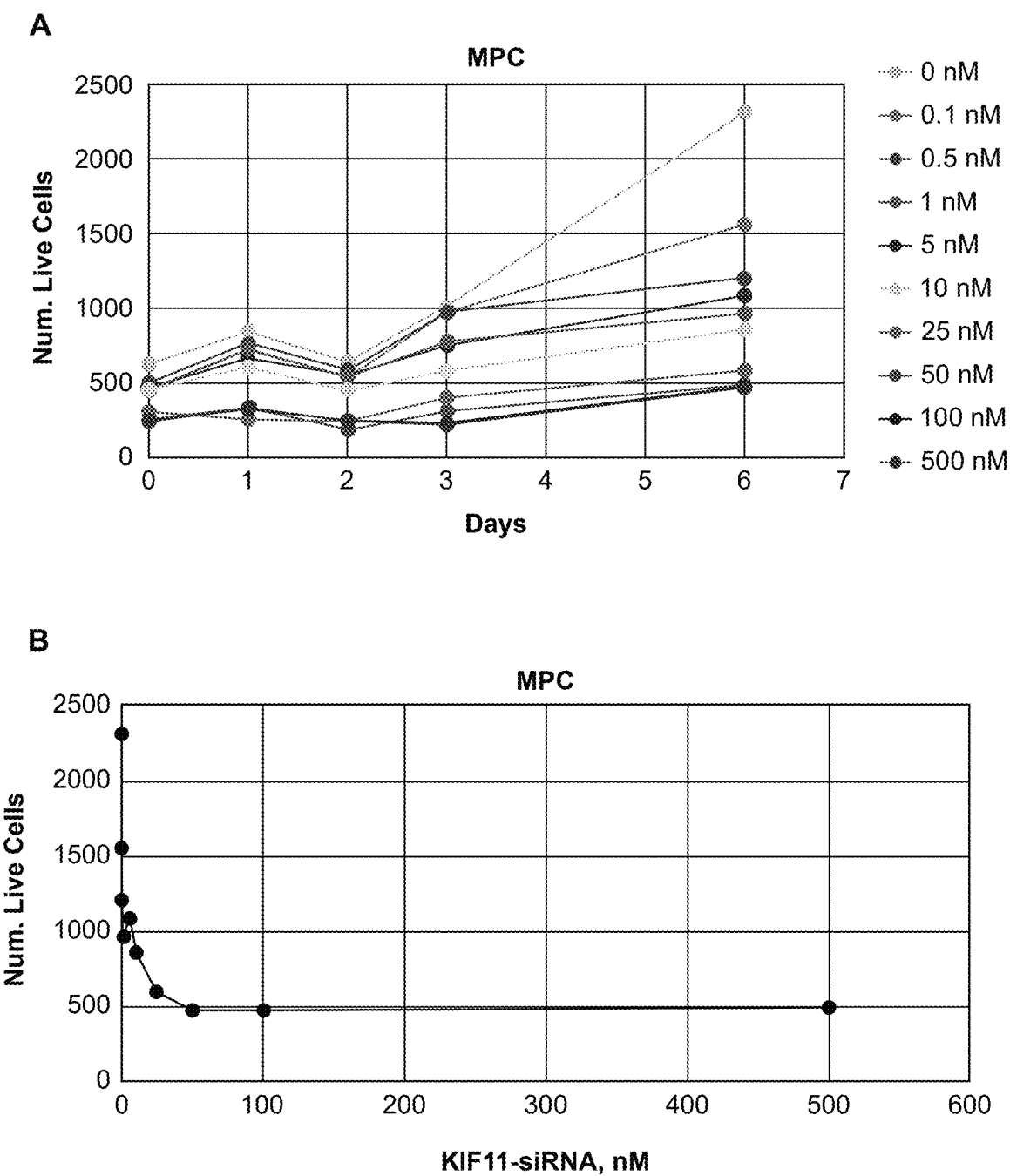

FIG. 25. Effect of KIF11 siRNA on MPC cell growth. Panel A shows time course of MPCs growth after transfection with KIF11 siRNA (0-500 nM). Panel B shows dose-response curve of MPCs cell growth after transfection with KIF11 siRNA (0-500 nM) on day 6 of cell culture.

Figure 26:
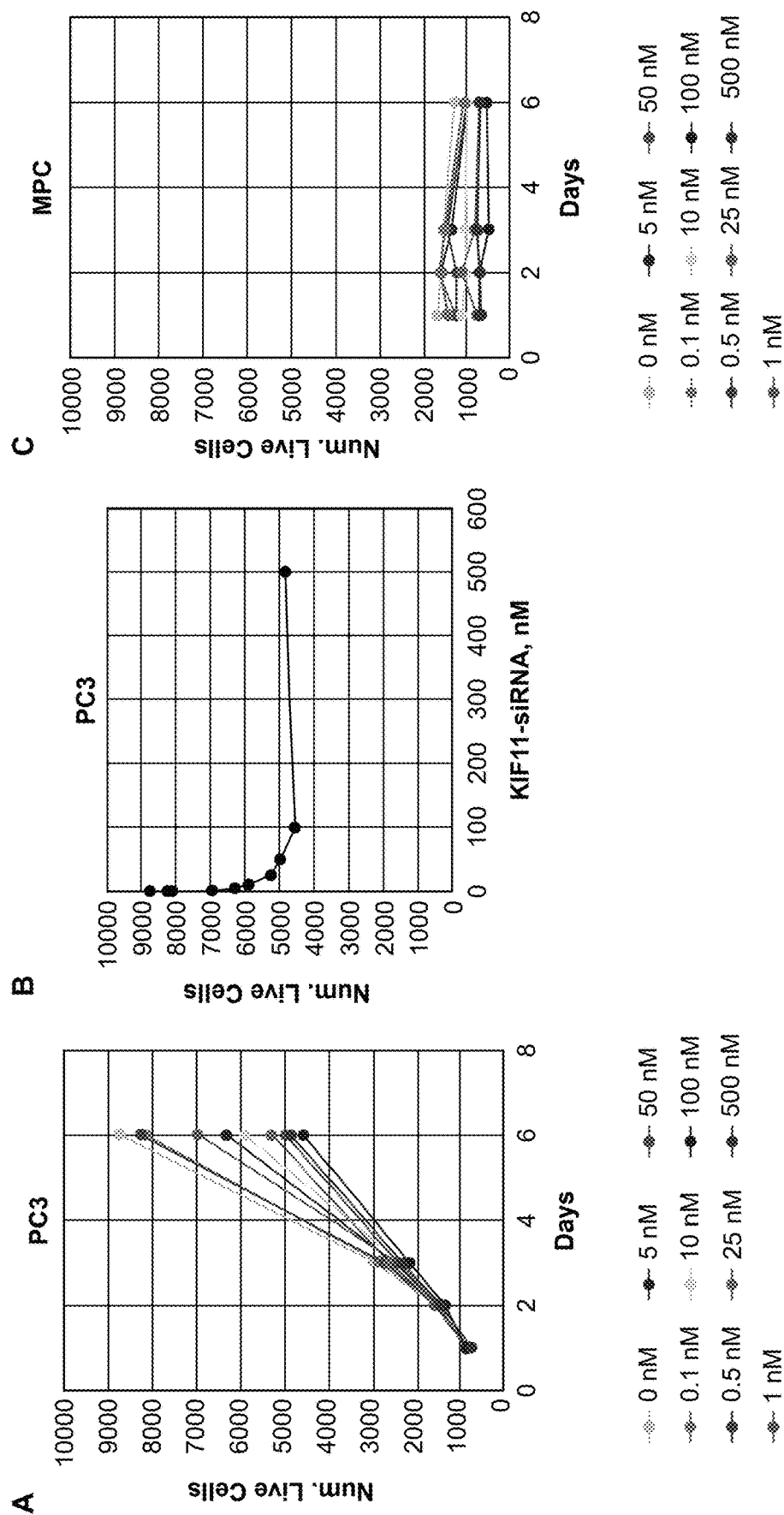

FIG. 26. Effect of KIF11 siRNA from MPCs to PC3 cells in co-culture. Panel A shows time course of PC3 cell growth in co-culture with MPCs loaded with KIF11 siRNA (0-500 nM). Panel B shows dose-response curve of PC3 cell growth in co-culture with MPCs loaded with KIF11-siRNA (0-500 nM) on day 5 of cell culture. Panel C shows time course of MPC growth after transfection with KIF11 siRNA (0-500 nM) in co-culture with PC3 cells. Results represent average of three independent measurements FIG. 27. Effect of KIF11 siRNA on PC3 cell growth. Panel A shows time course of PC3 cell growth after transfection with KIF11 siRNA (0-500 nM). Panel B shows dose-response curve of PC3 cell growth after transfection with KIF11 siRNA (0-500 nM) on day 6 of cell culture.

Figure 28:
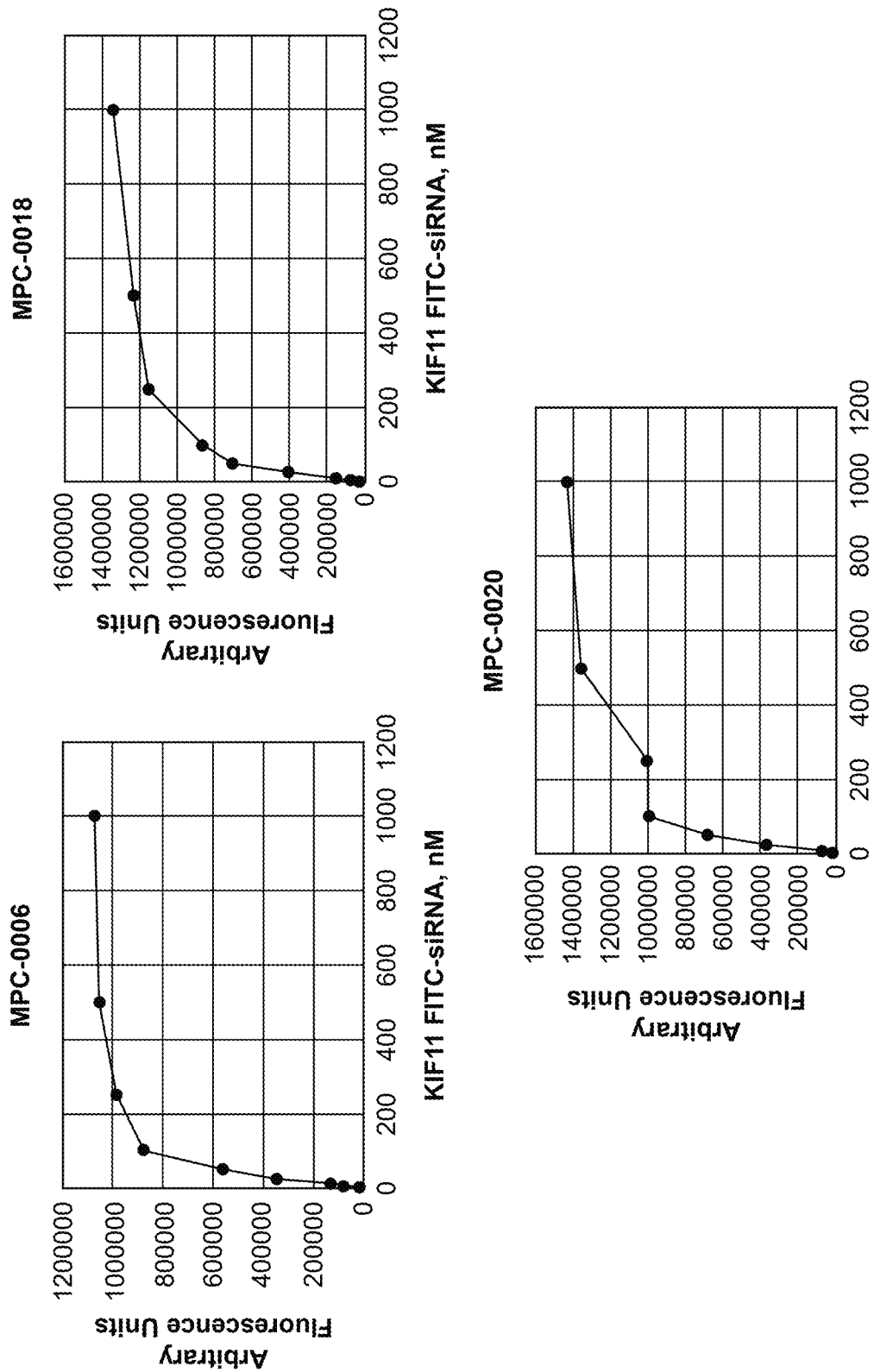

FIG. 28. MPC donor cell KIF11 siRNA loading.

Figure 29:
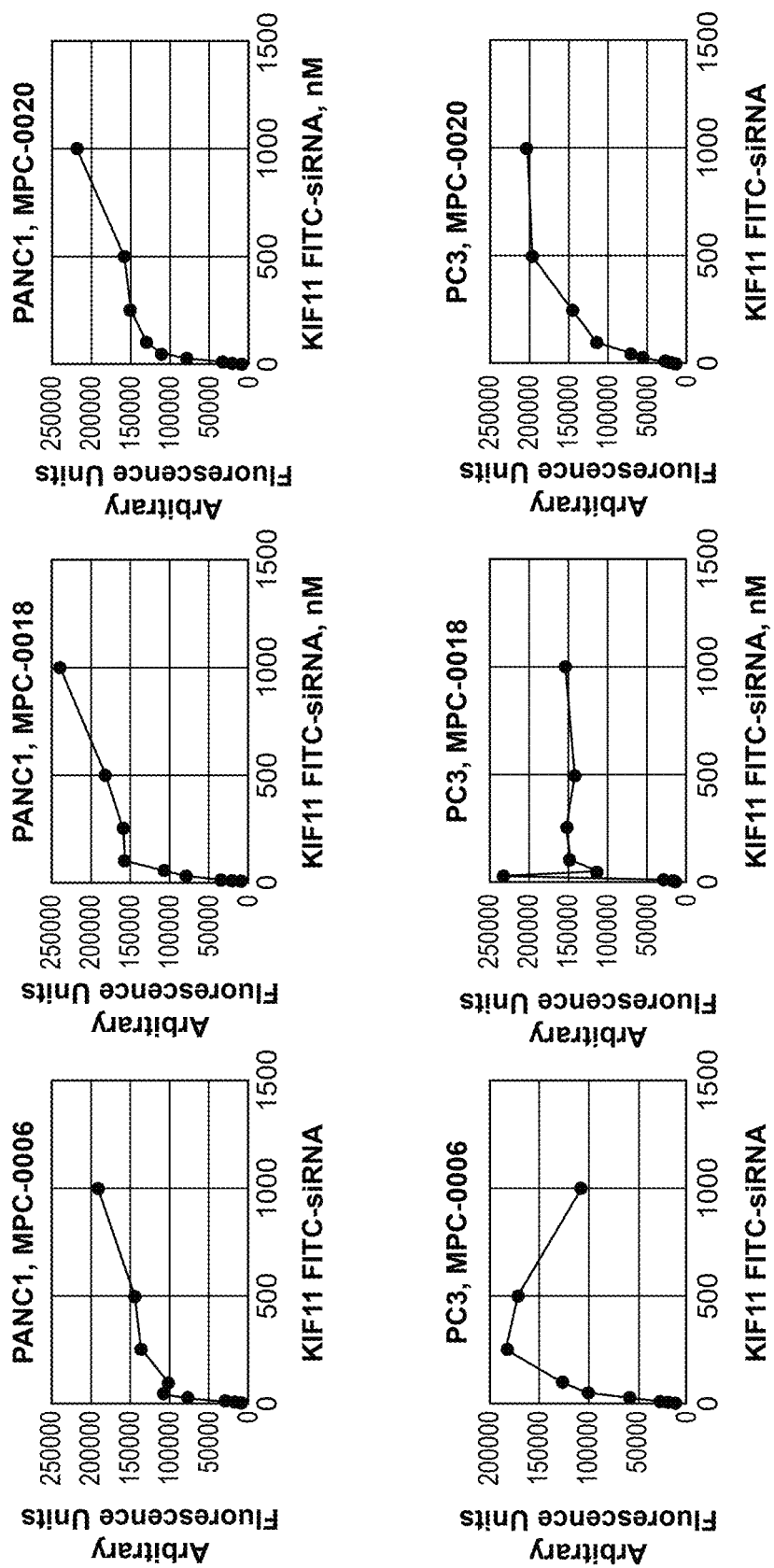

FIG. 29. MPC donor cell KIF11 siRNA transfer to tumour cells.

Figure 30:
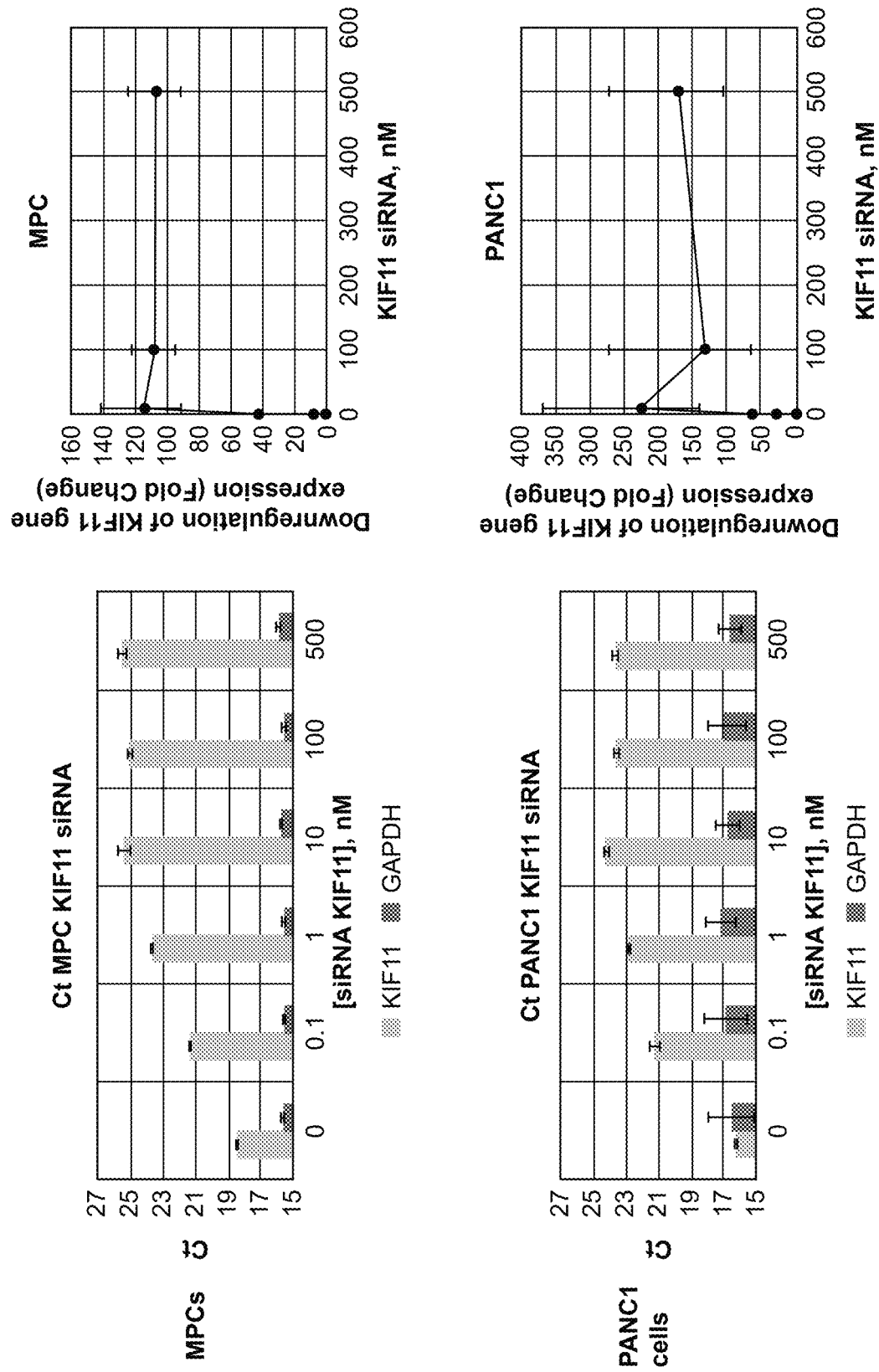

FIG. 30. KIF11 mRNA levels in KIF11 siRNA transfected cells.

Figure 31:
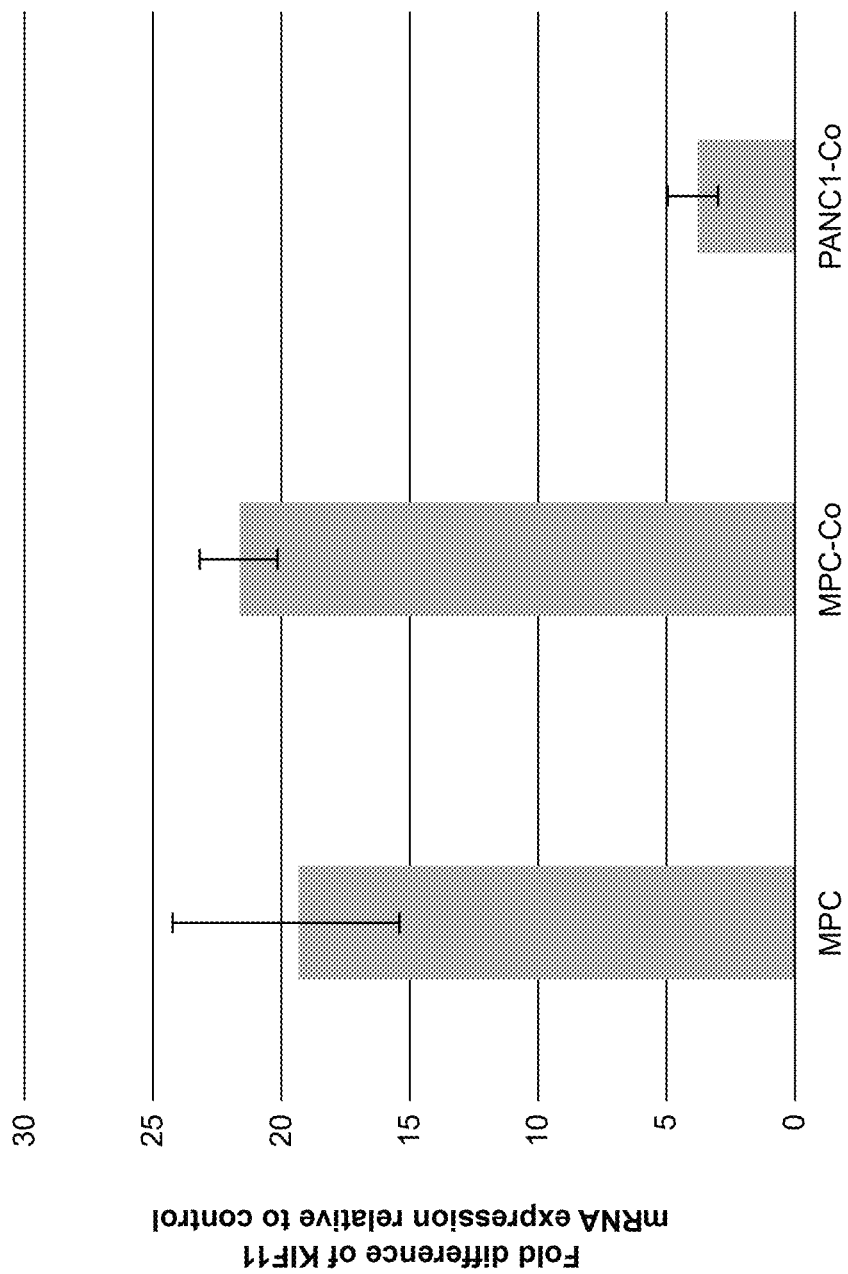

FIG. 31. KIF11 mRNA levels in PANC-1 cells following co-culture with KIF11 siRNA loaded MPCs. MPC=MPC directly transfected with KIF11 siRNA; MPC-Co=MPC directly transfected with KIF11 siRNA & co-cultured with PANC1; PANC1-Co=PANC1 cells co-cultured for 24 hours with MPCs transfected with KIF11 siRNA; KIF11 expression was assayed 48 hours after transfection. The Comparative Ct Method (ΔΔCt Method) for analyzing qRT-PCR data-1. Sample KIF11 Average Ct-GAPDH Average Ct=ΔCt KIF11-GAPDH; 2. ΔΔCT=ΔCt treated-ΔCt untreated; 3. Fold difference in KIF11 relative to untreated=2-ΔΔCt.

Figure 32:
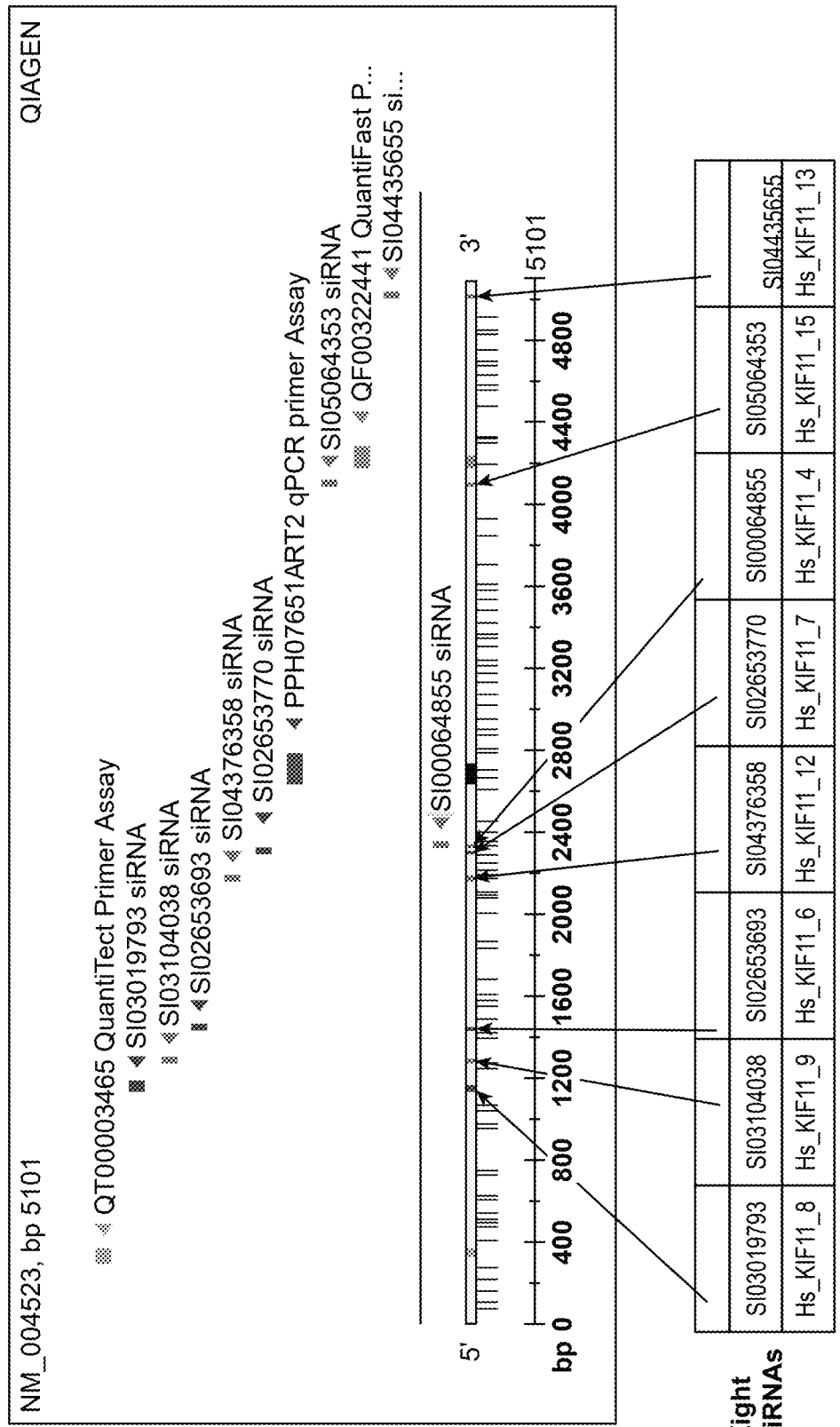

FIG. 32. Alignment of siRNAs to human KIF11 mRNA sequence.

Figure 33:
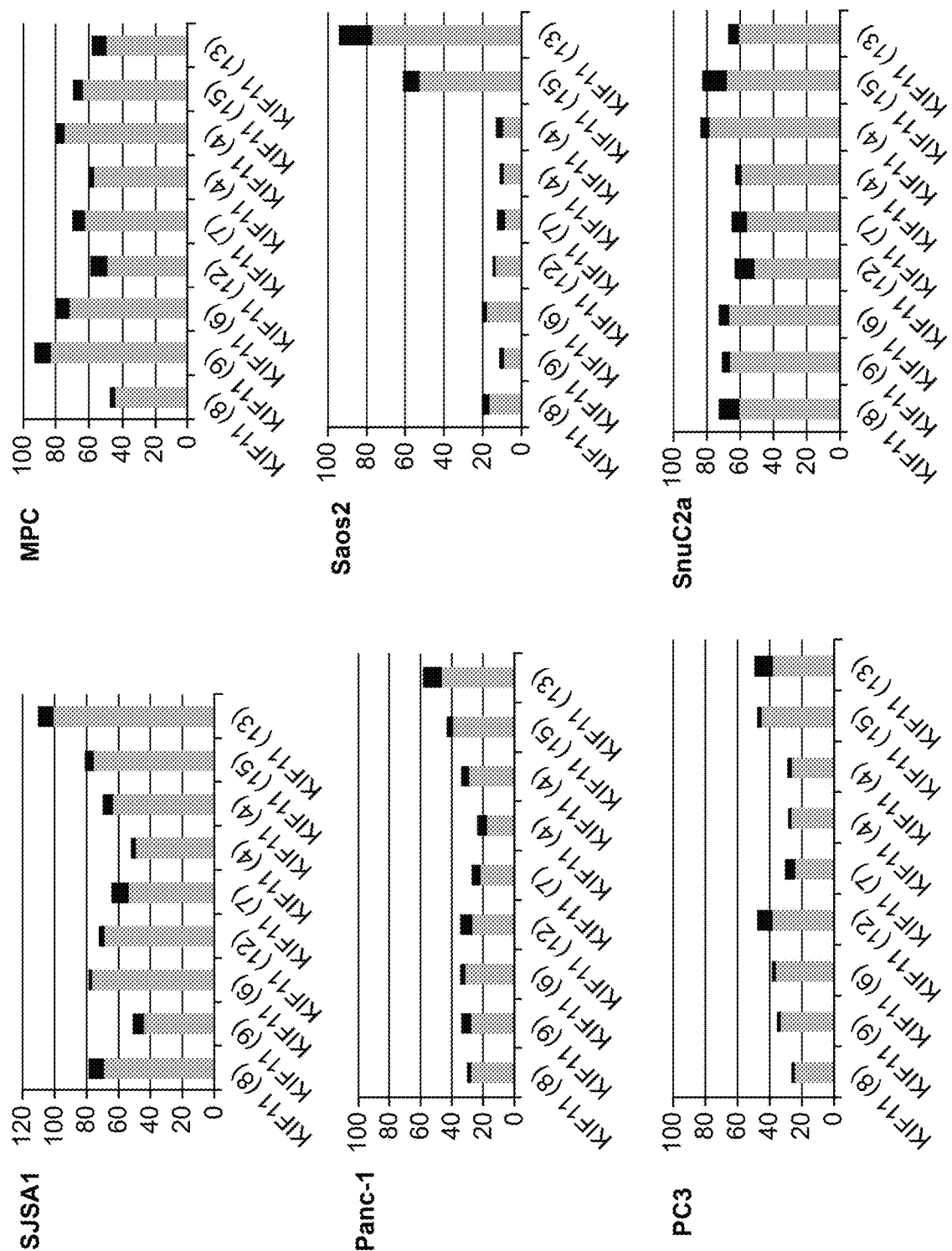

FIG. 33. Effects of KIF11 siRNAs on MPC and tumour cell viability.

FIG. 34. Gene expression analysis in MPCs and MSCs transfected with KIF11 siRNA compared with control.

KEY TO THE SEQUENCE LISTING

SEQ ID NO: 1: KIF11 mRNA (NCBI reference number NM_004523.3)
SEQ ID NO: 2: Hs_KIF11_8 siRNA
SEQ ID NO: 3: Hs_KIF11_9 siRNA
SEQ ID NO: 4: Hs_KIF11_6 siRNA
SEQ ID NO: 5: Hs_KIF11_12 siRNA
SEQ ID NO: 6: Hs_KIF11_7 siRNA
SEQ ID NO: 7: Hs_KIF11_4 siRNA

DETAILED DESCRIPTION OF THE INVENTION

General Techniques and Selected Definitions

Unless specifically defined otherwise, all technical and scientific terms used herein shall be taken to have the same meaning as commonly understood by one of ordinary skill in the art (e.g., molecular biology, cell culture, stem cell differentiation, cell therapy, genetic modification, biochemistry, physiology, and clinical studies).

Unless otherwise indicated, the molecular and statistical techniques utilized in the present disclosure are standard procedures, well known to those skilled in the art. Such techniques are described and explained throughout the literature in sources such as, J. Perbal, A Practical Guide to Molecular Cloning, John Wiley and Sons (1984), J. Sambrook et al., Molecular Cloning: A Laboratory Manual, Cold Spring Harbour Laboratory Press (1989), T. A. Brown (editor), Essential Molecular Biology: A Practical Approach, Volumes 1 and 2, IRL Press (1991), D. M. Glover and B. D. Hames (editors), DNA Cloning: A Practical Approach, Volumes 1-4, IRL Press (1995 and 1996), and F. M. Ausubel et al. (editors), Current Protocols in Molecular Biology, Greene Pub. Associates and Wiley-Interscience (1988, including all updates until present), Ed Harlow and David Lane (editors) Antibodies: A Laboratory Manual, Cold Spring Harbour Laboratory, (1988), and J. E. Coligan et al. (editors) Current Protocols in Immunology, John Wiley & Sons (including all updates until present).

As used in this specification and the appended claims, terms in the singular and the singular forms "a," "an" and "the," for example, optionally include plural referents unless the content clearly dictates otherwise. Thus, for example, reference to "an analyte" optionally includes one or more analytes.

As used herein, the term "about", unless stated to the contrary, refers to +/−10%, more preferably +/−5%, more preferably +/−1%, of the designated value.

The term "and/or", e.g., "X and/or Y" shall be understood to mean either "X and Y" or "X or Y" and shall be taken to provide explicit support for both meanings or for either meaning.

Throughout this specification the word "comprise", or variations such as "comprises" or "comprising", will be understood to imply the inclusion of a stated element, integer or step, or group of elements, integers or steps, but not the exclusion of any other element, integer or step, or group of elements, integers or steps.

The term "connexin" as used herein means a large family of trans-membrane proteins that allow intercellular communication and the transfer of ions and small signalling molecules and assemble to form gap junctions. Connexins are four-pass transmembrane proteins with both C and N cytoplasmic termini, a cytoplasmic loop (CL) and two extracellular loops, (EL-I) and (EL-2). Connexins are assembled in groups of six to form hemichannels, or connexons, and two hemichannels, one on each cell, then combine to form a gap junction between the two cells. The term Connexin is abbreviated as Cx and the gene encoding for it Cx.

The term "gap junction" as used herein means a specialized intercellular connection between cell-types. A gap junction directly connects the cytoplasm of two cells, which allows various molecules such as nucleic acids, ions and electrical impulses to directly pass through a regulated gate between cells.

Various subjects can be administered cell compositions according to the present disclosure. In an example, the subject is a mammal. The mammal may be a companion animal such as a dog or cat, or a livestock animal such as a horse or cow. In another example, the subject is a human. Terms such as "subject", "patient" or "individual" are terms that can, in context, be used interchangeably in the present disclosure.

As used herein, the term "treatment" refers to clinical intervention designed to alter the natural course of the individual or cell being treated during the course of clinical pathology. Desirable effects of treatment include decreasing the rate of disease progression, ameliorating or palliating the disease state, and remission or improved prognosis. An individual is successfully "treated", for example, if one or more symptoms associated with a disease are mitigated or eliminated.

An "effective amount" refers to at least an amount effective, at dosages and for periods of time necessary, to achieve the desired therapeutic or prophylactic result. An effective amount can be provided in one or more administrations. In some examples of the present disclosure, the term "effective amount" is used to refer to an amount necessary to effect treatment of a disease or condition as hereinbefore described. The effective amount may vary according to the disease or condition to be treated and also according to the weight, age, racial background, sex, health and/or physical condition and other factors relevant to the mammal being treated. Typically, the effective amount will fall within a relatively broad range (e.g. a "dosage" range) that can be determined through routine trial and experimentation by a medical practitioner. The effective amount can be administered in a single dose or in a dose repeated once or several times over a treatment period.

A "therapeutically effective amount" is at least the minimum concentration required to effect a measurable improvement of a particular disorder (e.g. cancer). A therapeutically effective amount herein may vary according to factors such as the disease state, age, sex, and weight of the patient, and the ability of the cellular composition to elicit a desired response in the individual. A therapeutically effective amount is also one in which any toxic or detrimental effects of the composition are outweighed by the therapeutically beneficial effects. In the case of cancer, a therapeutically effective amount can reduce the number of cancer cells; reduce the primary tumour size; inhibit (i.e., slow to some extent and, in some examples, stop) cancer cell infiltration into peripheral organs; inhibit (i.e., slow to some extent and, in some examples, stop) tumour metastasis; inhibit or delay, to some extent, tumour growth or tumour progression; and/or relieve to some extent one or more of the symptoms associated with the disorder. To the extent a composition according to the present disclosure may prevent growth and/or kill existing cancer cells, it may be cytostatic and/or cytotoxic. For cancer therapy, efficacy in vivo can, for example, be measured by assessing the duration of survival, time to disease progression (TTP), the response rates (RR), duration of response, and/or quality of life.

Mesenchymal Lineage Precursor (MPC) or Stem Cells

As used herein, the term "mesenchymal lineage precursor or stem cells" refers to undifferentiated multipotent cells that have the capacity to self renew while maintaining multipotency and the capacity to differentiate into a number of cell types either of mesenchymal origin, for example, osteoblasts, chondrocytes, adipocytes, stromal cells, fibroblasts and tendons, or non-mesodermal origin, for example, hepatocytes, neural cells and epithelial cells.

The term "mesenchymal lineage precursor or stem cells" includes both parent cells and their undifferentiated progeny. The term also includes mesenchymal lineage precursor or stem cells (MPC), multipotent stromal cells, mesenchymal stem cells, perivascular mesenchymal lineage precursor or stem cells, and their undifferentiated progeny.

Mesenchymal lineage precursor or stem cells can be autologous, allogeneic, xenogeneic, syngeneic or isogeneic. Autologous cells are isolated from the same individual to which they will be reimplanted. Allogeneic cells are isolated from a donor of the same species. Xenogeneic cells are isolated from a donor of another species. Syngeneic or isogeneic cells are isolated from genetically identical organisms, such as twins, clones, or highly inbred research animal models.

Mesenchymal lineage precursor or stem cells reside primarily in the bone marrow, but have also been shown to be present in diverse host tissues including, for example, cord blood and umbilical cord, adult peripheral blood, adipose tissue, trabecular bone and dental pulp.

In an example, mesenchymal lineage precursor or stem cells express STRO-1 and one or more integrins. Integrins are a class of cell adhesion receptors that mediate both cell-cell and cell-extracellular matrix adhesion events. Integrins consist of heterodimeric polypeptides where a single $\alpha$ chain polypeptide noncovalently associates with a single $\beta$ chain. There are now about 16 distinct $\alpha$ chain polypeptides and at least about 8 different $\beta$ chain polypeptides that constitute the integrin family of cell adhesion receptors. In general, different binding specificities and tissue distributions are derived from unique combinations of the $\alpha$ and $\beta$ chain polypeptides or integrin subunits. The family to which a particular integrin is associated with is usually characterized by the $\beta$ subunit. However, the ligand binding activity of the integrin is largely influenced by the $\alpha$ subunit.

In an example, mesenchymal lineage precursor or stem cells according to the present disclosure express STRO-1 and an integrin having a $\beta 1$ (CD29) chain polypeptide.

In another example, mesenchymal lineage precursor or stem cells according to the present disclosure express STRO-1 and an integrin having an $\alpha$ chain polypeptide selected from the group consisting of $\alpha 1$ (CD49a), $\alpha 2$ (CD49b), $\alpha 3$ (CD49c), $\alpha 4$ (CD49d), $\alpha 5$ (CD49e) and $\alpha v$ (CD51). Accordingly, in an example, mesenchymal lineage precursor or stem cells according to the present disclosure express STRO-1 and $\alpha 1$. In another example, mesenchymal lineage precursor or stem cells express STRO-1 and $\alpha 2$. In another example, mesenchymal lineage precursor or stem cells express STRO-1 and $\alpha 3$. In another example, mesenchymal lineage precursor or stem cells express STRO-1 and $\alpha 4$. In another example, mesenchymal lineage precursor or stem cells express STRO-1 and $\alpha 5$. In another example, mesenchymal lineage precursor or stem cells express STRO-1 and $\alpha v$. In another example, mesenchymal lineage precursor or stem cells express STRO-1, $\alpha 2$ and $\alpha 3$. In another example, mesenchymal lineage precursor or stem cells express STRO-1, $\alpha 2$ and $\alpha 5$. In another example, mesenchymal lineage precursor or stem cells express STRO-1, $\alpha 3$ and $\alpha 5$. In another example, mesenchymal lineage precursor or stem cells express STRO-1, $\alpha 2$, $\alpha 3$ and $\alpha 5$.

In another example, the present disclosure encompasses a population of mesenchymal lineage precursor or stem cells enriched for STRO-1+ and $\alpha 1$+ cells. In this example, a population enriched for α1+ cells can comprise at least about 3% or 4% or 5% α1+ cells.

In another example, the present disclosure encompasses a population of mesenchymal lineage precursor or stem cells enriched for STRO-1+ and α2+ cells. In this example, a population enriched for α2+ cells can comprise at least about 30% or 40% or 50% α2+ cells.

In another example, the present disclosure encompasses a population of mesenchymal lineage precursor or stem cells enriched for STRO-1+ and α3+ cells. In this example, a population enriched for α3+ cells comprises at least about 40% or 45% or 50% α3+ cells.

In another example, the present disclosure encompasses a population of mesenchymal lineage precursor or stem cells enriched for STRO-1+ and α4+ cells. In this example, a population enriched for α4+ cells comprises at least about 5% or 6% or 7% α4+ cells.

In another example, the present disclosure encompasses a population of mesenchymal lineage precursor or stem cells enriched for STRO-1+ and α5+ cells. In this example, a population enriched for α5+ cells comprises at least about 45% or 50% or 55% α5+ cells.

In another example, the present disclosure encompasses a population of mesenchymal lineage precursor or stem cells enriched for STRO-1+ and αv+ cells. In this example, a population enriched for αv+ cells comprises at least about 5% or 6% or 7% αv+ cells.

In another example, the present disclosure encompasses a population of mesenchymal lineage precursor or stem cells enriched for STRO-1, α1+, α3+, α4+ and α5+ cells.

In another example, mesenchymal lineage precursor or stem cells according to the present disclosure can express integrins selected from the group consisting of α1β1, α2β1, α3β1, α4β1 and α5β1. Accordingly, in an example, mesenchymal lineage precursor or stem cells according to the present disclosure express STRO-1 and α1β1. In another example, mesenchymal lineage precursor or stem cells express STRO-1 and α2β1. In another example, mesenchymal lineage precursor or stem cells express STRO-1 and α4β1. In another example, mesenchymal lineage precursor or stem cells express STRO-1 and α5β1.

In another example, mesenchymal lineage precursor or stem cells according to the present disclosure express STRO-1 and an integrin having a β3 (CD61) chain polypeptide. In an example, the present disclosure encompasses a population of mesenchymal lineage precursor or stem cells enriched for STRO-1+ and β3+ cells. In this example, a population enriched for β3+ cells comprises at least about 8% or 10% or 15% β3+ cells. In another example, mesenchymal lineage precursor or stem cells express STRO-1 and αvβ3. In another example, mesenchymal lineage precursor or stem cells according to the present disclosure express STRO-1 and an integrin having a β5 (ITGB5) chain polypeptide. In an example, mesenchymal lineage precursor or stem cells express STRO-1 and αvβ5. In another example, mesenchymal lineage precursor or stem cells express STRO-1 and αvβ6.

Identifying and/or enriching for mesenchymal lineage precursor or stem cells expressing above referenced integrins may be achieved using various methods known in the art. In one example, fluorescent activated cell sorting (FACS) can be employed using commercially available antibodies (e.g. Thermofisher; Pharmingen; Abcam) to identify and select for cells expressing a desired integrin polypeptide chain or combination thereof.

In an example, mesenchymal lineage precursor or stem cells express STRO-1 and coxsackievirus and adenovirus receptor. In another example, mesenchymal lineage precursor or stem cells express STRO-1, coxsackievirus and adenovirus receptor and one or more of the above referenced integrin's.

In another example, mesenchymal lineage precursor or stem cells express STRO-1, coxsackievirus and adenovirus receptor, αvβ3 and αvβ5.

In an example, mesenchymal lineage precursor or stem cells are genetically modified to express one or more of the above referenced integrin's or coxsackievirus and adenovirus receptor on their cell surface.

In an example, mesenchymal lineage precursor or stem cells express STRO-1 and a chimeric antigen receptor (CAR). In an example, mesenchymal lineage precursor or stem cells express STRO-1, CAR, αvβ3 and αvβ5.

In an example, mesenchymal lineage precursor or stem cells expressing CAR can trigger a T cell mediated immune response. In another example, the CAR acts as a means of attaching mesenchymal lineage precursor or stem cells to cancer cells. In another example, the CAR acts as a means of triggering enhanced adhesion of mesenchymal lineage precursor or stem cells to cancer cells.

In an example, the CAR is comprised of an extracellular antigen binding domain, a transmembrane domain, and an intracellular domain. In an example, the antigen binding domain possesses affinity for one or more tumour antigens. Exemplary tumour antigens include HER2, CLPP, 707-AP, AFP, ART-4, BAGE, MAGE, GAGE, SAGE, b-catenin/m, bcr-abl, CAMEL, CAP-1, CEA, CASP-8, CDK/4, CDC-27, Cyp-B, DAM-8, DAM-10, ELV-M2, ETV6, G250, Gp100, HAGE, HER-2/neu, EPV-E6, LAGE, hTERT, survivin, iCE, MART-1, tyrosinase, MUC-1, MC1-R, TEL/AML, and WT-1.

Exemplary intracellular domains include CD3-zeta, CD28 and 4-IBB. In some examples, the CAR can comprise a combination of CD3-zeta, CD28, 4-1 BB, TLR-4.

Exemplary transmembrane domains can be derived from (i.e. comprise at least the transmembrane region(s) of) the alpha, beta or zeta chain of the T-cell receptor, CD28, CD3 epsilon, CD45, CD4, CD5, CDS, CD9, CD 16, CD22, CD33, CD37, CD64, CD80, CD86, CD 134, CD137, 35 CD 154. In another example, the transmembrane domain can be synthetic, in which case it will comprise predominantly hydrophobic residues such as leucine and valine.

Mesenchymal lineage precursor or stem cells can be isolated from host tissues such as those referred to above and enriched for by immunoselection. For example, a bone marrow aspirate from a subject may be further treated with an antibody to STRO-1 or TNAP to enable selection of mesenchymal lineage precursor or stem cells. In one example, the mesenchymal lineage precursor or stem cells can be enriched for by using the STRO-1 antibody described in Simmons & Torok-Storb, 1991.

STRO-1+ cells are cells found in bone marrow, blood, dental pulp cells, adipose tissue, skin, spleen, pancreas, brain, kidney, liver, heart, retina, brain, hair follicles, intestine, lung, lymph node, thymus, bone, ligament, tendon, skeletal muscle, dermis, and periosteum; and are capable of differentiating into germ lines such as mesoderm and/or endoderm and/or ectoderm. Thus, STRO-1+ cells are capable of differentiating into a large number of cell types including, but not limited to, adipose, osseous, cartilaginous, elastic, muscular, and fibrous connective tissues. The specific lineage-commitment and differentiation pathway which these cells enter depends upon various influences from mechanical influences and/or endogenous bioactive factors, such as growth factors, cytokines, and/or local microenvironmental conditions established by host tissues.

The term "enriched" as used herein describes a population of cells in which the proportion of one particular cell type or the proportion of a number of particular cell types is increased when compared with an untreated population of the cells (e.g., cells in their native environment). In one example, a population enriched for STRO-1+ cells comprises at least about 0.1% or 0.5% or 1% or 2% or 5% or 10% or 15% or 20% or 25% or 30% or 50% or 75% STRO-1+ cells. In this regard, the term "population of cells enriched for STRO-1+ cells" will be taken to provide explicit support for the term "population of cells comprising X % STRO-1+ cells", wherein X % is a percentage as recited herein. The STRO-1+ cells can, in some examples, form clonogenic colonies, for example, CFU-F (fibroblasts) or a subset thereof (e.g., 50% or 60% or 70% or 70% or 90% or 95%) can have this activity.

In one example, the population of cells is enriched from a cell preparation comprising STRO-1+ cells in a selectable form. In this regard, the term "selectable form" will be understood to mean that the cells express a marker (e.g., a cell surface marker) permitting selection of the STRO-1+ cells. The marker can be STRO-1, but need not be. For example, as described and/or exemplified herein, cells (e.g., MPCs) expressing STRO-2 and/or STRO-3 (TNAP) and/or STRO-4 and/or VCAM-1 and/or CD146 and/or 3G5 also express STRO-1 (and can be STRO-1bright). Accordingly, an indication that cells are STRO-1+ does not mean that the cells are selected by STRO-1 expression. In one example, the cells are selected based on at least STRO-3 expression, e.g., they are STRO-3+(TNAP+).

Reference to selection of a cell or population thereof does not necessarily require selection from a specific tissue source. As described herein, STRO-1+ cells can be selected from or isolated from or enriched from a large variety of sources. That said, in some examples, these terms provide support for selection from any tissue comprising STRO-1+ cells or vascularized tissue or tissue comprising pericytes (e.g., STRO-1+ or 3G5+ pericytes) or any one or more of the tissues recited herein.

In one example, the mesenchymal lineage precursor or stem cells of the disclosure express one or more markers individually or collectively selected from the group consisting of TNAP+, VCAM-1+, THY-1+, STRO-2+, STRO-4+ (HSP-90β), CD45+, CD146+, 3G5+.

By "individually" is meant that the disclosure encompasses the recited markers or groups of markers separately, and that, notwithstanding that individual markers or groups of markers may not be separately listed herein, the accompanying claims may define such marker or groups of markers separately and divisibly from each other.

By "collectively" is meant that the disclosure encompasses any number or combination of the recited markers or groups of markers, and that, notwithstanding that such numbers or combinations of markers or groups of markers may not be specifically listed herein, the accompanying claims may define such combinations or sub-combinations separately and divisibly from any other combination of markers or groups of markers.

A cell that is referred to as being "positive" for a given marker may express either a low (lo or dim or dull), intermediate (median) or a high (bright, bri) level of that marker depending on the degree to which the marker is present on the cell surface, where the terms relate to intensity of fluorescence or other marker used in the sorting process of the cells or flow cytometric analysis of the cells. The distinction of low (lo or dim or dull), intermediate (median), or high (bright, bri) will be understood in the context of the marker used on a particular cell population being sorted or analysed. A cell that is referred to as being "negative" for a given marker is not necessarily completely absent from that cell. This term means that the marker is expressed at a relatively very low level by that cell, and that it generates a very low signal when detectably labeled or is undetectable above background levels, for example, levels detected using an isotype control antibody.

The term "bright" or bri as used herein, refers to a marker on a cell surface that generates a relatively high signal when detectably labeled. Whilst not wishing to be limited by theory, it is proposed that "bright" cells express more of the target marker protein (for example, the antigen recognized by a STRO-1 antibody) than other cells in the sample. For instance, STRO-1bri cells produce a greater fluorescent signal, when labeled with a FITC-conjugated STRO-1 antibody as determined by fluorescence activated cell sorting (FACS) analysis, than non-bright cells (STRO-1lo/dim/dull/intermediate/median). In one example, the mesenchymal lineage precursor or stem cells are isolated from bone marrow and enriched for by selection of STRO-1+ cells. In this example, "bright" cells constitute at least about 0.1% of the most brightly labeled bone marrow mononuclear cells contained in the starting sample. In other examples, "bright" cells constitute at least about 0.1%, at least about 0.5%, at least about 1%, at least about 1.5%, or at least about 2%, of the most brightly labeled bone marrow mononuclear cells contained in the starting sample. In an example, STRO-1bright cells have 2 log magnitude higher expression of STRO-1 surface expression relative to "background", namely cells that are STRO-1-. By comparison, STRO-1lo/dim/dull and/or STRO-1intermediate/median cells have less than 2 log magnitude higher expression of STRO-1 surface expression, typically about 1 log or less than "background".

In one example, the STRO-1+ cells are STRO-1bright. In one example, the STRO-1bright cells are preferentially enriched relative to STRO-1lo/dim/dull or STRO-1intermediate/median cells.

In one example, the STRO-1bright cells are additionally one or more of TNAP+, VCAM-1+, THY-1+, STRO-2+, STRO-4+(HSP-90β) and/or CD146+. For example, the cells are selected for one or more of the foregoing markers and/or shown to express one or more of the foregoing markers. In this regard, a cell shown to express a marker need not be specifically tested, rather previously enriched or isolated cells can be tested and subsequently used, isolated or enriched cells can be reasonably assumed to also express the same marker.

In one example, the STRO-1bright cells are perivascular mesenchymal lineage precursor or stem cells as defined in WO 2004/85630, characterized by the presence of the perivascular marker 3G5.

As used herein the term "TNAP" is intended to encompass all isoforms of tissue non-specific alkaline phosphatase. For example, the term encompasses the liver isoform (LAP), the bone isoform (BAP) and the kidney isoform (KAP). In one example, the TNAP is BAP. In one example, TNAP refers to a molecule which can bind the STRO-3 antibody produced by the hybridoma cell line deposited with ATCC on 19 Dec. 2005 under the provisions of the Budapest Treaty under deposit accession number PTA-7282.

Furthermore, in one example, the STRO-1+ cells are capable of giving rise to clonogenic CFU-F.

In one example, a significant proportion of the STRO-1+ cells are capable of differentiation into at least two different germ lines. Non-limiting examples of the lineages to which the cells may be committed include bone precursor cells; hepatocyte progenitors, which are multipotent for bile duct epithelial cells and hepatocytes; neural restricted cells, which can generate glial cell precursors that progress to oligodendrocytes and astrocytes; neuronal precursors that progress to neurons; precursors for cardiac muscle and cardiomyocytes, glucose-responsive insulin secreting pancreatic beta cell lines. Other lineages include, but are not limited to, odontoblasts, dentin-producing cells and chondrocytes, and precursor cells of the following: retinal pigment epithelial cells, fibroblasts, skin cells such as keratinocytes, dendritic cells, hair follicle cells, renal duct epithelial cells, smooth and skeletal muscle cells, testicular progenitors, vascular endothelial cells, tendon, ligament, cartilage, adipocyte, fibroblast, marrow stroma, cardiac muscle, smooth muscle, skeletal muscle, pericyte, vascular, epithelial, glial, neuronal, astrocyte and oligodendrocyte cells.

In one example, the mesenchymal lineage precursor or stem cells are MSCs. The MSCs may be a homogeneous composition or may be a mixed cell population enriched in MSCs. Homogeneous MSC compositions may be obtained by culturing adherent bone marrow or periosteal cells, and the MSCs may be identified by specific cell surface markers which are identified with unique monoclonal antibodies. A method for obtaining a cell population enriched in MSCs is described, for example, in U.S. Pat. No. 5,486,359. MSC prepared by conventional plastic adherence isolation relies on the non-specific plastic adherent properties of CFU-F. Mesenchymal lineage precursor or stem cells isolated from bone marrow by immunoselection based on STRO-1 specifically isolates clonogenic mesenchymal precursors from bone marrow populations in the absence of other plastic adherent bone marrow populations. Alternative sources for MSCs include, but are not limited to, blood, skin, cord blood, muscle, fat, bone, and perichondrium.

In one example, the mesenchymal lineage precursor or stem cells are derived from pluripotent cells such as induced pluripotent stem cells (iPS cells). In one embodiment the pluripotent cells are human pluripotent cells. Suitable processes for generation of mesenchymal lineage precursor or stem cells from pluripotent cells are described, for example, in U.S. Pat. No. 7,615,374 and US 2014273211, Barberi et al; Plos medicine, Vol 2(6):0554-0559 (2005), and Vodyanik et al. Cell Stem cell, Vol 7:718-728 (2010).

In another example, the mesenchymal lineage precursor or stem cells are immortalised. Exemplary processes for generation of immortalised mesenchymal lineage precursor or stem cells are described, for example, in Obinata M., Cell, Vol 2:235-244 (1997), U.S. Pat. No. 9,453,203, Akimov et al. Stem Cells, Vol 23:1423-1433 and Kabara et al. Laboratory Investigation, Vol 94: 1340-1354 (2014).

In a preferred embodiment of the present disclosure, the mesenchymal lineage precursor or stem cells are obtained from a master cell bank derived from mesenchymal lineage precursor or stem cells enriched from the bone marrow of healthy volunteers. The use of mesenchymal lineage precursor or stem cells derived from such a source is particularly advantageous for subjects who do not have an appropriate family member available who can serve as the mesenchymal lineage precursor or stem cell donor, or are in need of immediate treatment and are at high risk of relapse, disease-related decline or death, during the time it takes to generate mesenchymal lineage precursor or stem cells.

In another example, mesenchymal lineage precursor cells express Cx43. In another example, mesenchymal lineage precursor cells express Cx40. In another example, mesen-chymal lineage precursor cells express Cx43 and Cx40. In another example, mesenchymal lineage precursor cells express Cx45, Cx32 and/or Cx37. In an example, mesenchymal lineage precursor cells are not modified to express a particular connexin.

In another example, mesenchymal lineage precursor cells express STRO-1 and CD46. In this example, mesenchymal lineage precursor cells can also express one or more integrin's referenced above.

Isolated or enriched mesenchymal lineage precursor cells can be expanded in vitro by culture. Isolated or enriched mesenchymal lineage precursor cells can be cryopreserved, thawed and subsequently expanded in vitro by culture.

In one example, isolated or enriched mesenchymal lineage precursor cells are seeded at 50,000 viable cells/cm' in culture medium (serum free or serum-supplemented), for example, alpha minimum essential media (αMEM) supplemented with 5% fetal bovine serum (FBS) and glutamine, and allowed to adhere to the culture vessel overnight at 37° C., 20% $O^2$. The culture medium is subsequently replaced and/or altered as required and the cells cultured for a further 68 to 72 hours at 37° C., 5% $O^2$.

As will be appreciated by those of skill in the art, cultured mesenchymal lineage precursor cells are phenotypically different to cells in vivo. For example, in one embodiment they express one or more of the following markers, CD44, CD46, NG2, DC146 and CD140b. Cultured mesenchymal lineage precursor cells are also biologically different to cells in vivo, having a higher rate of proliferation compared to the largely non-cycling (quiescent) cells in vivo.

Ang1 and VEGF Levels

In an example, mesenchymal lineage precursor or stem cells express Ang1 in an amount of at least $0.1 \mu g/10^6$ cells. However, in other examples, mesenchymal lineage precursor or stem cells express Ang1 in an amount of at least $0.2 \mu g/10^6$ cells, $0.3 \mu g/10^6$ cells, $0.4 \mu g/10^6$ cells, $0.5 \mu g/10^6$ cells, $0.6 \mu g/10^6$ cells, $0.7 \mu g/10^6$ cells, $0.8 \mu g/10^6$ cells, $0.9 \mu g/10^6$ cells, $1 \mu g/10^6$ cells, $1.1 \mu g/10^6$ cells, $1.2 \mu g/10^6$ cells, $1.3 \mu g/10^6$ cells, $1.4 \mu g/10^6$ cells, $1.5 \mu g/10^6$ cells.

In another example, mesenchymal lineage precursor or stem cells express VEGF in an amount less than about $0.05 \mu g/10^6$ cells. However, in other examples, mesenchymal lineage precursor or stem cells express VEGF in an amount less than about $0.05 \mu g/10^6$ cells, $0.04 \mu g/10^6$ cells, $0.03 \mu g/10^6$ cells, $0.02 \mu g/10^6$ cells, $0.01 \mu g/10^6$ cells, $0.009 \mu g/10^6$ cells, $0.008 \mu g/10^6$ cells, $0.007 \mu g/10^6$ cells, $0.006 \mu g/10^6$ cells, $0.005 \mu g/10^6$ cells, $0.004 \mu g/10^6$ cells, $0.003 \mu g/10^6$ cells, $0.002 \mu g/10^6$ cells, $0.001 \mu g/10^6$ cells.

The amount of cellular Ang1 and/or VEGF that is expressed in a composition or culture of mesenchymal lineage precursor or stem cells may be determined by methods known to those skilled in the art. Such methods include, but are not limited to, quantitative assays such as quantitative ELISA assays, for example. In this example, a cell lysate from a culture of mesenchymal lineage precursor or stem cells is added to a well of an ELISA plate. The well may be coated with a primary antibody, either a monoclonal or a polyclonal antibody(ies), against the Ang1 or VEGF. The well then is washed, and then contacted with a secondary antibody, either a monoclonal or a polyclonal antibody(ies), against the primary antibody. The secondary antibody is conjugated to an appropriate enzyme, such as horseradish peroxidase, for example. The well then may be incubated, and then is washed after the incubation period. The wells then are contacted with an appropriate substrate for the enzyme conjugated to the secondary antibody, such as one or more chromogens. Chromogens which may be employed include, but are not limited to, hydrogen peroxide and tetramethylbenzidine. After the substrate(s) is (are) added, the well is incubated for an appropriate period of time. Upon completion of the incubation, a "stop" solution is added to the well in order to stop the reaction of the enzyme with the substrate(s). The optical density (OD) of the sample is then measured. The optical density of the sample is correlated to the optical densities of samples containing known amounts of Ang1 or VEGF in order to determine the amount of Ang1 or VEGF expressed by the culture of stem cells being tested.

In another aspect, mesenchymal lineage precursor or stem cells express Ang1:VEGF at a ratio of at least about 2:1. However, in other examples, mesenchymal lineage precursor or stem cells express Ang1:VEGF at a ratio of at least about 10:1, 15:1, 20:1, 21:1, 22:1, 23:1, 24:1, 25:1, 26:1, 27:1, 28:1, 29:1, 30:1, 31:1, 32:1, 33:1, 34:1, 35:1, 50:1.

Methods for determining the Ang1:VEGF expression ratio will be apparent to one of skill in the art. For example Ang1 and VEGF expression levels can be quantitated via quantitative ELISA as discussed above. After quantifying the levels of Ang1 and VEGF, a ratio based on the quantitated levels of Ang1 and VEGF could be represented as: (level of Ang1/level of VEGF)=Ang1:VEGF ratio.

In an example, the mesenchymal lineage precursor or stem cells of the present disclosure are not genetically modified to express Ang1 and/or VEGF at an above exemplified level or ratio. Cells that are not genetically modified to express Ang1 and/or VEGF have not been modified by transfection with a nucleic acid expressing or encoding Ang1 and/or VEGF. For the avoidance of doubt, in the context of the present disclosure a mesenchymal lineage precursor or stem cell transfected with a nucleic acid encoding Ang1 and/or VEGF would be considered genetically modified. In the context of the present disclosure cells not genetically modified to express Ang1 and/or VEGF naturally express Ang1 and/or VEGF to some extent without transfection with a nucleic acid encoding Ang1 and/or VEGF1.

Nucleic Acids

The present disclosure encompasses use of various nucleic acids. The terms "nucleic acid" and "nucleic acid molecule" may be used interchangeably throughout the disclosure. Exemplary nucleic acids include DNA (e.g., complementary DNA (cDNA), genomic DNA (gDNA)), RNA (e.g., message RNA (mRNA), short hairpin RNA (shRNA), short inhibitory RNA (siRNA), ribosomal RNA (rRNA), tRNA, microRNA, DNA or RNA analogues (e.g., containing base analogues, sugar analogues and/or a non-native backbone and the like), RNA/DNA hybrids and polyamide nucleic acids (PNAs), all of which can be in single- or double-stranded form. In an example, the nucleic acid is isolated. As used herein, the term "isolated nucleic acid" means a nucleic acid that is altered or removed from the natural state through human intervention.

Another exemplary nucleic acid is an oligonucleotide. The term "oligonucleotide" as used herein means a short DNA or RNA molecule. Oligonucleotides readily bind, in a sequence-specific manner, to their respective complementary oligonucleotides, DNA, or RNA to form duplexes.

In an example, the oligonucleotide can be a DNA molecule. In another example, the oligonucleotide can be an RNA molecule.

In various examples, oligonucleotides can be about five, six, seven, eight, nine, 10, 11, 12, 13, 14, 15, 16, 17, 18, 19, 20, 21, 22, 23, 24, 25, 26, 27, 28, 29, 30 nucleotides or larger in length.

In an example, oligonucleotides of the present disclosure are inhibitory oligonucleotides. In an example, the term "inhibitory oligonucleotide" refers to any oligonucleotide that reduces the production, expression or biological activity of one or more proteins. For example, an inhibitory oligonucleotide can interfere with translation of mRNA into protein in a ribosome. In another example, an inhibitory oligonucleotide can be sufficiently complementary to either a gene or a mRNA encoding one or more proteins to bind to (hybridize with) a targeted gene(s) or mRNA thereby reducing expression or biological activity of the target protein. In another example, an inhibitory oligonucleotide inhibits the biological activity of an intracellular nucleic acid that does not code for a protein. For example, an inhibitory oligonucleotide can inhibit the biological activity of a non-coding RNA.

Exemplary inhibitory oligonucleotides include isolated or synthetic antisense RNA or DNA, siRNA or siDNA, miRNA, miRNA mimics, shRNA or DNA and Chimeric Antisense DNA or RNA.

The term "antisense" as used herein means a sequence of nucleotides complementary to and therefore capable of binding to a coding sequence, which may be either that of the strand of a DNA double helix that undergoes transcription, or that of a messenger RNA molecule. Antisense DNA is the non-coding strand complementary to the coding strand in double-stranded DNA. The antisense strand serves as the template for messenger RNA (mRNA) synthesis.

The terms "short hairpin RNA" or "shRNA" refer to an RNA structure having a duplex region and a loop region.

The term small interfering RNA (siRNA), sometimes known as short interfering RNA or silencing RNA, is a class of double-stranded RNA molecules, 20-25 base pairs in length. A siRNA that inhibits or prevents translation to a particular protein is indicated by the protein name coupled with the term siRNA. Thus a siRNA that interferes with the translation of KIF11 is indicated by the expression "KIF11 siRNA". Typically, a siRNA in various embodiments is a double-stranded nucleic acid molecule comprising two nucleotide strands, each strand having about 19 to about 28 nucleotides (i.e. about 19, 20, 21, 22, 23, 24, 25, 26, 27, or 28 nucleotides). Exemplary siRNAs encompassed by the present disclosure include KIF11 siRNA, KRAS siRNA and PLK1 siRNA.

The term "microRNA" (abbreviated miRNA) is a small non-coding RNA molecule (containing about 22 nucleotides) found in plants, animals and some viruses, that functions in RNA silencing and post-transcriptional regulation of gene expression. The prefix "miR" is followed by a dash and a number, the latter often indicating order of naming. Different miRNAs with nearly identical sequences except for one or two nucleotides are annotated with an additional lower case letter. Numerous miRNAs are known in the art (miRBase V.21 nomenclature; Kozomara et al. 2013; Griffiths-Jones, S. 2004). Examples of human miRNAs include, hsa-let-7d-3p, hsa-miR-101-5p, hsa-miR-106b-3p, hsa-miR-1179, hsa-miR-125a-5p, hsa-miR-141-3p, hsa-miR-148a-3p, hsa-miR-16-5p, hsa-miR-192-5p, hsa-miR-195-5p, hsa-miR-19b-3p, hsa-miR-20a-5p, hsa-miR-200b-3p, hsa-miR-217, hsa-miR-223-3p, hsa-miR-371a-3p, hsa-miR-487b, hsa-miR-515-3p, hsa-miR-605, hsa-let-7a-3p, hsa-let-7a-5p, hsa-let-7b-3p, hsa-let-7b-5p, hsa-let-7c, hsa-let-7d-5p, hsa-let-7e-3p, hsa-let-7e-5p, hsa-let-7f-1-3p, hsa-let-7f-2-3p, hsa-let-7f-5p, hsa-let-7g-3p, hsa-let-7g-5p, hsa-let-7i-3p, hsa-let-7i-5p, hsa-miR-1, hsa-miR-100-3p, hsa-miR-100-5p, hsa-miR-101-3p, hsa-miR-103a-2-5p, hsa-miR-103a-3p, hsa-miR-103b, hsa-miR-105-

5p, hsa-miR-106a-3p, hsa-miR-106a-5p, hsa-miR-106b-5p, hsa-miR-107, hsa-miR-10a-3p, hsa-miR-10a-5p, hsa-miR-10b-3p, hsa-miR-10b-5p, hsa-miR-1178-3p, hsa-miR-1180, hsa-miR-1181, hsa-miR-1182, hsa-miR-1183, hsa-miR-1184, hsa-miR-1185-5p, hsa-miR-1204, hsa-miR-1207, hsa-miR-1208, hsa-miR-122-3p, hsa-miR-122-5p, hsa-miR-1224, hsa-miR-1226, hsa-miR-1227-3p, hsa-miR-1228-5p, hsa-miR-1229-3p, hsa-miR-1231, hsa-miR-124-3p, hsa-miR-1245 a, hsa-miR-1246, hsa-miR-1249, hsa-miR-125a-3p, hsa-miR-125b-1-3p, hsa-miR-125b-2-3p, hsa-miR-125b-5p, hsa-miR-1251, hsa-miR-1252, hsa-miR-1253, hsa-miR-1255 a, hsa-miR-1255b-5p, hsa-miR-126-3p, hsa-miR-1260a, hsa-miR-1260b, hsa-miR-1262, hsa-miR-1263, hsa-miR-1265, hsa-miR-1268a, hsa-miR-127-3p, hsa-miR-1270, hsa-miR-1272, hsa-miR-1273 a, hsa-miR-1275, hsa-miR-1276, hsa-miR-1277-3p, hsa-miR-1278, hsa-miR-128, hsa-miR-1285-3p, hsa-miR-1286, hsa-miR-1287, hsa-miR-129-2-3p, hsa-miR-1292-5p, hsa-miR-1293, hsa-miR-1301, hsa-miR-1302, hsa-miR-1303, hsa-miR-1305, hsa-miR-130a-3p, hsa-miR-130a-5p, hsa-miR-130b-3p, hsa-miR-130b-5p, hsa-miR-132-3p, hsa-miR-132-5p, hsa-miR-1321, hsa-miR-1323, hsa-miR-1324, hsa-miR-133a, hsa-miR-133b, hsa-miR-134, hsa-miR-135a-3p, hsa-miR-135a-5p, hsa-miR-135b-3p, hsa-miR-135b-5p, hsa-miR-136-3p, hsa-miR-136-5p, hsa-miR-137, hsa-miR-138-1-3p, hsa-miR-138-2-3p, hsa-miR-138-5p, hsa-miR-139-3p, hsa-miR-139-5p, hsa-miR-140-3p, hsa-miR-140-5p, hsa-miR-142-3p, hsa-miR-142-5p, hsa-miR-143-3p, hsa-miR-143-5p, hsa-miR-144-3p, hsa-miR-144-5p, hsa-miR-145-3p, hsa-miR-145-5p, hsa-miR-1468, hsa-miR-146a-5p, hsa-miR-146b-3p, hsa-miR-146b-5p, hsa-miR-147a, hsa-miR-147b, hsa-miR-148a-5p, hsa-miR-148b-3p, hsa-miR-148b-5p, hsa-miR-149-3p, hsa-miR-149-5p, hsa-miR-150-3p, hsa-miR-150-5p, hsa-miR-151a-3p, hsa-miR-151a-5p, hsa-miR-152, hsa-miR-153, hsa-miR-1538, hsa-miR-1539, hsa-miR-154-3p, hsa-miR-154-5p, hsa-miR-155-5p, hsa-miR-15a-3p, hsa-miR-15a-5p, hsa-miR-15b-3p, hsa-miR-15b-5p, hsa-miR-16-1-3p, hsa-miR-16-2-3p, hsa-miR-17-3p, hsa-miR-17-5p, hsa-miR-181a-2-3p, hsa-miR-181a-3p, hsa-miR-181a-5p, hsa-miR-181b-5p, hsa-miR-181c-3p, hsa-miR-181c-5p, hsa-miR-181d, hsa-miR-182-5p, hsa-miR-1827, hsa-miR-183-3p, hsa-miR-183-5p, hsa-miR-184, hsa-miR-185-3p, hsa-miR-185-5p, hsa-miR-186-3p, hsa-miR-186-5p, hsa-miR-187-3p, hsa-miR-187-5p, hsa-miR-188-5p, hsa-miR-18a-3p, hsa-miR-18a-5p, hsa-miR-18b-3p, hsa-miR-18b-5p, hsa-miR-190a, hsa-miR-190b, hsa-miR-191-3p, hsa-miR-191-5p, hsa-miR-1915-3p, hsa-miR-192-3p, hsa-miR-193a-3p, hsa-miR-193a-5p, hsa-miR-193b-3p, hsa-miR-193b-5p, hsa-miR-194-5p, hsa-miR-195-3p, hsa-miR-196a-3p, hsa-miR-196a-5p, hsa-miR-196b-5p, hsa-miR-197-3p, hsa-miR-198, hsa-miR-199a-3p, hsa-miR-199a-5p, hsa-miR-199b-3p, hsa-miR-199b-5p, hsa-miR-19a-3p, hsa-miR-19a-5p, hsa-miR-1909-3p, hsa-miR-191 1-3p, hsa-miR-200a-3p, hsa-miR-200a-5p, hsa-miR-200b-5p, hsa-miR-200c-3p, hsa-miR-200c-5p, hsa-miR-202-3p, hsa-miR-202-5p, hsa-miR-203a, hsa-miR-203b-5p, hsa-miR-204-5p, hsa-miR-205-5p, hsa-miR-206, hsa-miR-208b, hsa-miR-20a-3p, hsa-miR-20b-3p, hsa-miR-20b-5p, hsa-miR-21-3p, hsa-miR-21-5p, hsa-miR-210, hsa-miR-21 1-5p, hsa-miR-2110, hsa-miR-212-3p, hsa-miR-214-3p, hsa-miR-214-5p, hsa-miR-215, hsa-miR-216a-5p, hsa-miR-218-1-3p, hsa-miR-218-5p, hsa-miR-219-1-3p, hsa-miR-219-5p, hsa-miR-22-3p, hsa-miR-22-5p, hsa-miR-221-3p, hsa-miR-221-5p, hsa-miR-222-3p, hsa-miR-222-5p, hsa-miR-223-5p, hsa-miR-224-3p, hsa-miR-224-5p, hsa-miR-2355-3p, hsa-miR-23a-3p, hsa-miR-23a-5p, hsa-miR-23b-3p, hsa-miR-23b-5p, hsa-miR-24-1-5p, hsa-miR-24-2-5p, hsa-miR-24-3p, hsa-miR-25-3p, hsa-miR-25-5p, hsa-miR-26a-2-3p, hsa-miR-26a-5p, hsa-miR-26b-3p, hsa-miR-26b-5p, hsa-miR-27a-3p, hsa-miR-27a-5p, hsa-miR-27b-3p, hsa-miR-27b-5p, hsa-miR-28-3p, hsa-miR-28-5p, hsa-miR-296-3p, hsa-miR-296-5p, hsa-miR-297, hsa-miR-298, hsa-miR-299-3p, hsa-miR-299-5p, hsa-miR-29a-3p, hsa-miR-29a-5p, hsa-miR-29b-1-5p, hsa-miR-29b-2-5p, hsa-miR-29b-3p, hsa-miR-29c-3p, hsa-miR-29c-5p, hsa-miR-2909, hsa-miR-301a-3p, hsa-miR-301b, hsa-miR-302a-5p, hsa-miR-302b-5p, hsa-miR-302c-5p, hsa-miR-302d-3p, hsa-miR-302d-5p, hsa-miR-302f, hsa-miR-3064-5p, hsa-miR-3065-3p, hsa-miR-3065-5p, hsa-miR-3074-3p, hsa-miR-3074-5p, hsa-miR-30a-3p, hsa-miR-30a-5p, hsa-miR-30b-3p, hsa-miR-30b-5p, hsa-miR-30c-1-3p, hsa-miR-30c-2-3p, hsa-miR-30c-5p, hsa-miR-30d-3p, hsa-miR-30d-5p, hsa-miR-30e-3p, hsa-miR-30e-5p, hsa-miR-31-3p, hsa-miR-31-5p, hsa-miR-3120-3p, hsa-miR-3120-5p, hsa-miR-3184-5p, hsa-miR-32-3p, hsa-miR-32-5p, hsa-miR-320a, hsa-miR-320b, hsa-miR-320c, hsa-miR-323 a-3p, hsa-miR-323b-5p, hsa-miR-324-3p, hsa-miR-324-5p, hsa-miR-325, hsa-miR-326, hsa-miR-328, hsa-miR-329, hsa-miR-330-3p, hsa-miR-330-5p, hsa-miR-331-3p, hsa-miR-331-5p, hsa-miR-335-3p, hsa-miR-335-5p, hsa-miR-337-3p, hsa-miR-337-5p, hsa-miR-338-3p, hsa-miR-338-5p, hsa-miR-339-3p, hsa-miR-339-5p, hsa-miR-33a-5p, hsa-miR-33b-3p, hsa-miR-33b-5p, hsa-miR-340-3p, hsa-miR-340-5p, hsa-miR-342-3p, hsa-miR-342-5p, hsa-miR-345-5p, hsa-miR-346, hsa-miR-34a-3p, hsa-miR-34a-5p, hsa-miR-34b-3p, hsa-miR-34b-5p, hsa-miR-34c-3p, hsa-miR-34c-5p, hsa-miR-3591-3p, hsa-miR-361-3p, hsa-miR-361-5p, hsa-miR-3613-5p, hsa-miR-3615, hsa-miR-3619, hsa-miR-362-3p, hsa-miR-362-5p, hsa-miR-363-3p, hsa-miR-363-5p, hsa-mir-365a-3p, hsa-mir-365a-5p, hsa-mir-3653, hsa-miR-3656, hsa-miR-367-3p, hsa-miR-367-5p, hsa-miR-3676-3p, hsa-miR-369-3p, hsa-miR-369-5p, hsa-miR-370, hsa-miR-372, hsa-miR-373-3p, hsa-miR-373-5p, hsa-miR-374a-3p, hsa-miR-374a-5p, hsa-miR-374b-3p, hsa-miR-374b-5p, hsa-miR-375, hsa-miR-376a-2-5p, hsa-miR-376a-3p, hsa-miR-376a-5p, hsa-miR-376b-3p, hsa-miR-376c-3p, hsa-miR-377-3p, hsa-miR-377-5p, hsa-miR-378a-3p, hsa-miR-378a-5p, hsa-miR-378c, hsa-miR-378d, hsa-miR-379-3p, hsa-miR-379-5p, hsa-miR-380-3p, hsa-miR-380-5p, hsa-miR-381-3p, hsa-miR-382-3p, hsa-miR-382-5p, hsa-miR-383, hsa-miR-384, hsa-miR-3912, hsa-miR-3928, hsa-miR-409-3p, hsa-miR-409-5p, hsa-miR-410, hsa-miR-41 1-3p, hsa-miR-41 1-5p, hsa-miR-412, hsa-miR-421, hsa-miR-422a, hsa-miR-423-3p, hsa-miR-423-5p, hsa-miR-424-3p, hsa-miR-424-5p, hsa-miR-425-3p, hsa-miR-425-5p, hsa-miR-429, hsa-miR-4291, hsa-miR-431-5p, hsa-miR-432-5p, hsa-miR-433, hsa-miR-4421, hsa-miR-449a, hsa-miR-450a-5p, hsa-miR-450b-3p, hsa-miR-450b-5p, hsa-miR-4505, hsa-miR-4510, hsa-miR-4516, hsa-miR-451a, hsa-miR-452-3p, hsa-miR-452-5p, hsa-miR-4533, hsa-miR-4539, hsa-miR-454-3p, hsa-miR-454-5p, hsa-miR-455-3p, hsa-miR-455-5p, hsa-miR-4634, hsa-miR-4732-3p, hsa-miR-4732-5p, hsa-miR-4747-5p, hsa-miR-4792, hsa-miR-483-3p, hsa-miR-483-5p, hsa-miR-484, hsa-miR-485-5p, hsa-miR-486-3p, hsa-miR-486-5p, hsa-miR-489, hsa-miR-490, hsa-miR-491-3p, hsa-miR-491-5p, hsa-miR-492, hsa-miR-493-3p, hsa-miR-493-5p, hsa-miR-494, hsa-miR-495-3p, hsa-miR-496, hsa-miR-497-3p, hsa-miR-497-5p, hsa-miR-498, hsa-miR-499a-5p, hsa-miR-500a-3p, hsa-miR-501-3p, hsa-miR-501-5p, hsa-miR-502-3p, hsa-miR-502-5p, hsa-miR-503-5p, hsa-miR-504, hsa-miR-505-3p, hsa-miR-505-5p, hsa-miR-506-3p, hsa-miR-508-3p, hsa-miR-508-5p, hsa-miR-509-3p, hsa-miR-511, hsa-miR-512-5p, hsa-miR-513a-3p, hsa-miR-513a-5p, hsa-miR-513b, hsa-miR-514a-3p, hsamiR-514a-5p, hsa-miR-515-5p, hsa-miR-516b-3p, hsa-miR-516b-5p, hsa-miR-517a-3p, hsa-miR-518a-3p, hsa-miR-518b, hsa-miR-518e-3p, hsa-miR-518e-5p, hsa-miR-518f-3p, hsa-miR-519a-5p, hsa-miR-519b-5p, hsa-miR-519c-3p, hsa-miR-519c-5p, hsa-miR-519d, hsa-miR-519e-5p, hsa-miR-520c-3p, hsa-miR-520e, hsa-miR-520f, hsa-miR-520g, hsa-miR-520h, hsa-miR-521, hsa-miR-522-5p, hsa-miR-523-5p, hsa-miR-525-3p, hsa-miR-532-3p, hsa-miR-532-5p, hsa-miR-539-5p, hsa-miR-541, hsa-miR-542-3p, hsa-miR-542-5p, hsa-miR-543, hsa-miR-545-3p, hsa-miR-545-5p, hsa-miR-548a-3p, hsa-miR-548d-3p, hsa-miR-548e, hsa-miR-548i, hsa-miR-548m, hsa-miR-549, hsa-miR-550a-3p, hsa-miR-550a-5p, hsa-miR-551b-3p, hsa-miR-551b-5p, hsa-miR-552, hsa-miR-553, hsa-miR-554, hsa-miR-557, hsa-miR-563, hsa-miR-564, hsa-miR-567, hsa-miR-569, hsa-miR-570-3p, hsa-miR-571, hsa-miR-572, hsa-miR-574-3p, hsa-miR-574-5p, hsa-miR-575, hsa-miR-576-3p, hsa-miR-576-5p, hsa-miR-577, hsa-miR-578, hsa-miR-580, hsa-miR-582-3p, hsa-miR-582-5p, hsa-miR-583, hsa-miR-584-5p, hsa-miR-585, hsa-miR-586, hsa-miR-589-3p, hsa-miR-589-5p, hsa-miR-590-3p, hsa-miR-590-5p, hsa-miR-593-3p, hsa-miR-593-5p, hsa-miR-595, hsa-miR-598, hsa-miR-601, hsa-miR-602, hsa-miR-603, hsa-miR-606, hsa-miR-608, hsa-miR-609, hsa-miR-611, hsa-miR-612, hsa-miR-613, hsa-miR-615-3p, hsa-miR-615-5p, hsa-miR-616-5p, hsa-miR-618, hsa-miR-619, hsa-miR-620, hsa-miR-623, hsa-miR-625-5p, hsa-miR-626, hsa-miR-627, hsa-miR-628-3p, hsa-miR-628-5p, hsa-miR-629-3p, hsa-miR-629-5p, hsa-miR-630, hsa-miR-631, hsa-miR-634, hsa-miR-635, hsa-miR-636, hsa-miR-638, hsa-miR-639, hsa-miR-641, hsa-miR-642a-3p, hsa-miR-642a-5p, hsa-miR-643, hsa-miR-645, hsa-miR-646, hsa-miR-647, hsa-miR-649, hsa-miR-650, hsa-miR-651, hsa-miR-652-3p, hsa-miR-653, hsa-miR-654-3p, hsa-miR-655, hsa-miR-656, hsa-miR-657, hsa-miR-658, hsa-miR-659-3p, hsa-miR-660-5p, hsa-miR-663a, hsa-miR-663b, hsa-miR-664a-3p, hsa-miR-664a-5p, hsa-miR-668, hsa-miR-671-5p, hsa-miR-675-3p, hsa-miR-675-5p, hsa-miR-7-1-3p, hsa-miR-7-2-3p, hsa-miR-7-5p, hsa-miR-708-3p, hsa-miR-708-5p, hsa-miR-718, hsa-miR-744-3p, hsa-miR-744-5p, hsa-miR-761, hsa-miR-765, hsa-miR-766, hsa-miR-767-3p, hsa-miR-769-3p, hsa-miR-769-5p, hsa-miR-770-5p, hsa-miR-874, hsa-miR-875, hsa-miR-876, hsa-miR-877-3p, hsa-miR-877-5p, hsa-miR-885-3p, hsa-miR-887, hsa-miR-888-3p, hsa-miR-889, hsa-miR-890, hsa-miR-891a, hsa-miR-891b, hsa-miR-9-3p, hsa-miR-9-5p, hsa-miR-92a-3p, hsa-miR-92b-3p, hsa-miR-92b-5p, hsa-miR-921, hsa-miR-922, hsa-miR-93-3p, hsa-miR-93-5p, hsa-miR-935, hsa-miR-940, hsa-miR-941, hsa-miR-942, hsa-miR-95, hsa-miR-96-3p, hsa-miR-96-5p, hsa-miR-98-5p, hsa-miR-99a-3p, hsa-miR-99a-5p, hsa-miR-99b-3p, and/or hsa-miR-99b-5p. Sequences of these miRNAs are well known in the art and may be found, for example, on the world wide web at mirbase dot org.

Suitable example miRNAs from the above list include hsa-miR-155, hsa-miR-155-inh, hsa-miR-181-B1, hsa-miR-15a, hsa-miR-16-1, hsa-miR-21, hsa-miR-34a, hsa-miR-221 and hsa-miR-29a.

In an example, "inhibitory oligonucleotides" mimic the activity of one or more miRNA. The term "miRNA mimic", as used herein, refers to small, double-stranded RNA molecules designed to mimic endogenous mature miRNA molecules when introduced into cells. miRNA mimics can be obtained from various suppliers such as Sigma Aldrich and Thermo Fisher Scientific.

In another example, "inhibitory oligonucleotides" inhibit the activity of one or more miRNA. Various miRNA species are suitable for this purpose. Examples include, without limitation, antagomirs, interfering RNA, ribozymes, miRNA sponges and miR-masks. The term "antagomir" is used in the context of the present disclosure to refer to chemically modified antisense oligonucleotides that bind to a target miRNA and inhibit miRNA function by preventing binding of the miRNA to its cognate gene target. Antagomirs can include any base modification known in the art. In an example, the above referenced miRNA species are about 10 to 50 nucleotides in length. For example, antagomirs can have antisense portions of 10, 11, 12, 13, 14, 15, 16, 17, 18, 19, 20, 21, 22, 23, 24, 25, 26, 27, 28, 29, 30, 31, 32, 33, 34, 35, 36, 37, 38, 39, 40, 41, 42, 43, 44, 45, 46, 47, 48, 49, or 50 nucleotides in length.

In an example, the miRNA species are chimeric oligonucleotides that contain two or more chemically distinct regions, each made up of at least one nucleotide. These oligonucleotides typically contain at least one region of modified nucleotides that confers one or more beneficial properties (such as, for example, increased nuclease resistance, increased uptake into cells, increased binding affinity for the target) and a region that is a substrate for enzymes capable of cleaving RNA:DNA or RNA:RNA hybrids.

In an example, nucleic acids encompassed by the present disclosure are synthetic. The term "synthetic nucleic acid" means that the nucleic acid does not have a chemical structure or sequence of a naturally occurring nucleic acid. Synthetic nucleotides include an engineered nucleic acid such as a DNA or RNA molecule. It is contemplated, however, that a synthetic nucleic acid administered to a cell may subsequently be modified or altered in the cell such that its structure or sequence is the same as non-synthetic or naturally occurring nucleic acid, such as a mature miRNA sequence. For example, a synthetic nucleic acid may have a sequence that differs from the sequence of a precursor miRNA, but that sequence may be altered once in a cell to be the same as an endogenous, processed miRNA. Consequently, it will be understood that the term "synthetic miRNA" refers to a "synthetic nucleic acid" that functions in a cell or under physiological conditions as a naturally occurring miRNA. In another example, the nucleic acid structure can also be modified into a locked nucleic acid (LNA) with a methylene bridge between the 2' Oxygen and the 4' carbon to lock the ribose in the 3'-endo (North) conformation in the A-type conformation of nucleic acids (Lennox et al 2011; Bader et al 2011). In the context of miRNAs, this modification can significantly increase both target specificity and hybridization properties of the molecule.

Nucleic acids for use in the methods disclosed herein can be designed using routine methods as required. For example, in the context of inhibitory oligonucleotides, target segments of 5, 6, 7, 8, 9, 10 or more nucleotides in length comprising a stretch of at least five (5) consecutive nucleotides within the seed sequence, or immediately adjacent thereto, are considered to be suitable for targeting a gene. Exemplary target segments can include sequences that comprise at least the 5 consecutive nucleotides from the 5'-terminus of one of the seed sequence (the remaining nucleotides being a consecutive stretch of the same RNA beginning immediately upstream of the 5'-terminus of the seed sequence and continuing until the nucleic acid contains about 5 to about 30 nucleotides). In another example, target segments are represented by RNA sequences that comprise at least the 5 consecutive nucleotides from the 3'-terminus of one of the seed sequence (the remaining nucleotides being a consecutive stretch of the same RNA beginning immediately downstream of the 3'-terminus of the target segment and continuing until the nucleic acid contains about 5 to about 30 nucleotides). The term "seed sequence" is used in the context of the present disclosure to refer to a 6-8 nucleotide (nt) long substring within the first 8 nt at the 5-end of the miRNA (i.e., seed sequence) that is an important determinant of target specificity. Once one or more target regions, segments or sites have been identified, inhibitory nucleic acid compounds are chosen that are sufficiently complementary to the target, i.e., that hybridize sufficiently well and with sufficient specificity (i.e., do not substantially bind to other non-target nucleic acid sequences), to give the desired effect.

Modification

Mesenchymal lineage precursor or stem cells of the present disclosure can be modified to introduce an above referenced nucleic acid. The term "introduced" is used in the context of the present disclosure to refer to the introduction of a nucleic acid into the nucleus or cytoplasm of a mesenchymal lineage precursor or stem cell according to the present disclosure.

Mesenchymal lineage precursor or stem cells are considered "modified" when a nucleic acid has been transferred into the cell by any suitable means of artificial manipulation, or where the cell is a progeny of an originally altered cell that has inherited a nucleic acid.

Terms such as "genetically altered", "transfected", "transduced" or "genetically transformed" can also be used interchangeably in the context of the present disclosure to refer to modified mesenchymal lineage precursor or stem cells. Mesenchymal lineage precursor or stem cells can be modified in a stable or transient fashion.

In an example, mesenchymal lineage precursor or stem cells of the present disclosure can be modified to introduce at least one, at least two, at least three, at least four, at least five, at least six, at least seven, at least eight, at least nine, a least 10, at least 15, at least 20 nucleic acids such as siRNA or miRNA. For example, mesenchymal lineage precursor or stem cells of the present disclosure can be modified to introduce KIF11 siRNA, KRAS siRNA, PLK1 siRNA or a combination thereof. For example, mesenchymal lineage precursor or stem cells of the present disclosure can be modified to introduce KIF11 siRNA. For example, the mesenchymal lineage precursor or stem cells can be modified to introduce KIF11 siRNA that binds towards the 5' end of KIF11 mRNA as shown in SEQ ID NO: 1 (NCBI reference number NM_004523.3). In an example, the KIF11 siRNA binds the KIF11 mRNA transcript between bp 800 and bp 3,600 from the 5' end. In another example, the KIF11 siRNA binds the KIF11 mRNA transcript between bp 900 and bp 3,200 from the 5' end. In another example, the KIF11 siRNA binds the KIF11 mRNA transcript between bp 900 and bp 2,500 from the 5' end. In another example, the KIF11 siRNA binds the KIF11 mRNA transcript before bp 3,200 from the 5' end. In another example, the KIF11 siRNA binds the KIF11 mRNA transcript after bp 3,600 from the 5' end. In another example, the KIF11 siRNA binds the KIF11 mRNA transcript after bp 4,000 from the 5' end. In another example, the KIF11 siRNA binds the KIF11 mRNA transcript between bp 3,600 and bp 5101 from the 5' end. In another example, the KIF11 siRNA binds the KIF11 mRNA transcript between bp 4,600 and bp 5101 from the 5' end.

In another example, mesenchymal lineage precursor or stem cells of the present disclosure can be modified to introduce KIF11_4 siRNA. In another example, mesenchymal lineage precursor or stem cells can be modified to introduce KIF11_6. In another example, mesenchymal lineage precursor or stem cells can be modified to introduce KIF11_9. In another example, mesenchymal lineage precursor or stem cells can be modified to introduce one or more of KIF11_8, KIF11_9, KIF11_6, KIF11_12, KIF11_7 or KIF11_4.

In another example, the the KIF11 siRNA binds the KIF11 mRNA transcript between bp 800 and bp 4,800 from the 5' end. In another example, the the KIF11 siRNA binds the KIF11 mRNA transcript between bp 900 and bp 4,800 from the 5' end. In another example, mesenchymal lineage precursor or stem cells can be modified to introduce one or more of KIF11_8, KIF11_9, KIF11_6, KIF11_12, KIF11_7, KIF11_4, KIF11_15 or KIF11_13. In another example, mesenchymal lineage precursor or stem cells can be modified to introduce KIF11_15 or KIF11_13.

The sequence details for the above referenced KIF11 siRNA are shown below in Table 1.

TABLE 1

KIF11 siRNA sequences

| SEQ ID NO | KIF11 siRNA reference (#Qiagen product number) | Sequence |
| --- | --- | --- |
| SEQ ID NO: 2 | Hs_KIF11_8 (#SI03019793) | CTCGGGAAGCTGGAAATATAA |
| SEQ ID NO: 3 | Hs_KIF11_9 (#SI03104038) | GAGGGCGTACAAGAACATCTA |
| SEQ ID NO: 4 | Hs_KIF11_6 (#SI02653693) | ACGGAGGAGATAGAACGTTTA |
| SEQ ID NO: 5 | Hs_KIF11_12 (#SI04376358) | CAGGAATTGATTAATGTACTC |
| SEQ ID NO: 6 | Hs_KIF11_7 (#SI02653770) | GCCGATAAGATAGAAGATCAA |
| SEQ ID NO: 7 | Hs_KIF11_4 (#SI00064855) | CTAGATGGCTTTCTCAGTATA |
| SEQ ID NO: 8 | Hs_KIF11_15 (#SI05064353) | CAGCTTGAGCTTACATAGGTA |
| SEQ ID NO: 9 | Hs_KIF11_13 (#SI04435655) | TAAGCGATGGATAATACCTAA |

In another example, mesenchymal lineage precursor or stem cells of the present disclosure can be modified to introduce has-miR-let7b, hsa-miR-155, hsa-miR-155-inh, hsa-miR-181-B1, hsa-miR-15a, hsa-miR-16-1, hsa-miR-21, hsa-miR-34a, hsa-miR-221, hsa-miR-29a or a combination thereof. In another example, mesenchymal lineage precursor or stem cells are modified to introduce an oligonucleotide or vector expressing the same that preferentially kills the target cell compared with the mesenchymal lineage precursor or stem cell.

In another example, mesenchymal lineage precursor or stem cells are modified to introduce an oligonucleotide or vector expressing the same that kills the target cell but does not substantially affect viability of the mesenchymal lineage precursor or stem cell.

In another example, mesenchymal lineage precursor or stem cells are modified to introduce an oligonucleotide or vector expressing the same that does not kill the mesenchymal lineage precursor or stem cells before they can deliver the oligonucleotide to a target cell such as a cancer cell.

In an example, mesenchymal lineage precursor or stem cells of the present disclosure can be modified to introduce a vector expressing an above referenced nucleic acid. Numerous vectors for expression in cells are known in the art. Vector components generally include, but are not limited to, one or more of the following: a signal sequence, a sequence encoding a nucleic acid such as an oligonucleotide, an enhancer element, a promoter, and a transcription termination sequence.

Exemplary expression vectors include plasmid, phage, autonomously replicating sequence (ARS), viral, centromere, artificial chromosome, chromosome, or other structure able to express a nucleic acid in a mesenchymal lineage precursor or stem cell according to the present disclosure.

Suitable vector plasmids for transfecting into mesenchymal lineage precursor or stem cells include lipid/DNA complexes, such as those described in U.S. Pat. Nos. 5,578,475; 6,020,202; and 6,051,429. Suitable reagents for making DNA-lipid complexes include lipofectamine (Gibco/Life Technologies #11668019) and FuGENE™ 6 (Roche Diagnostics Corp. #1814443); and LipoTAXI™ (Invitrogen Corp., #204110).

In another example, mesenchymal lineage precursor or stem cells are modified to introduce an oligonucleotide using a viral expression vector. Exemplary viral expression vectors include Lentivirus, Baculovirus, Retrovirus, Adenovirus (AdV), Adeno-associated virus (AAV) including recombinant forms such as recombinant adeno-associated virus (rAAV) and derivatives thereof such as self-complementary AAV (scAAV) and non-integrating AV.

In an example, the viral vector is replication-defective. In this example, replication genes are deleted or replaced with an expression cassette with a high activity promoter. For example, in the context of AV, E1/E3 genes can be deleted or replaced. In the context of AAV, E1A and E1B genes can be deleted or replaced. Exemplary high activity promoters include CMV, EF1a, SV40, PGK1, Ubc, human beta actin, CAG, TRE, UAS and Ac5.

In an example, mesenchymal lineage precursor or stem cells are modified to introduce an oligonucleotide using an AV vector or a recombinant form thereof. Various AV serotypes may be suitable for modifying mesenchymal lineage precursor or stem cells to introduce an oligonucleotide. In an example, AV serotype 1 (AV1) is used to modify mesenchymal lineage precursor or stem cells. In another example, AV2 is used to modify mesenchymal lineage precursor or stem cells. In other examples, AV3, AV4, AV7, AVB, AV9, AV10, AV11, AV12 or AV13 is used to modify mesenchymal lineage precursor or stem cells. In another example, AV5 is used to modify mesenchymal lineage precursor or stem cells. In another example, AV6 is used to modify mesenchymal lineage precursor or stem cells.

In an example, mesenchymal lineage precursor or stem cells are modified to introduce an oligonucleotide using an AAV vector or a recombinant form thereof. Various AAV serotypes may also be suitable for modifying mesenchymal lineage precursor or stem cells to introduce an oligonucleotide.

In an example, AAV serotype 1 (AAV1) is used to modify mesenchymal lineage precursor or stem cells. In another example, AAV2 is used to modify mesenchymal lineage precursor or stem cells. In other examples, AAV3, AAV4, AAV7, AAV8, AAV9, AAV10, AAV11, AAV12 or AAV13 is used to modify mesenchymal lineage precursor or stem cells. In another example, AAV5 is used to modify mesenchymal lineage precursor or stem cells. In another example, AAV6 is used to modify mesenchymal lineage precursor or stem cells.

The optimal vector can be identified using various techniques known in the art. In an example, mesenchymal lineage precursor or stem cells can be contacted/transfected with various vectors expressing green fluorescent protein (GFP). In this example, optimal vectors can be identified based on transfection/transduction efficiency, GFP expression level, cellular tropism, and/or persistence of GFP expression.

Methods of viral transduction are known in the art (e.g. U.S. Pat. Nos. 6,723,561; 6,627,442). Various viral expression vector systems are also available from commercial suppliers such as Miltenyi Biotech (MACSductin), Sigma-Aldrich (ExpressMag) and Thermo Fisher Scientific (ViraPower).

Efficiencies of modification are rarely 100%, and it is usually desirable to enrich the population for cells that have been successfully modified. In an example, modified cells can be enriched by taking advantage of a functional feature of the new genotype. One exemplary method of enriching modified cells is positive selection using resistance to a drug such as neomycin.

In an example, modified mesenchymal lineage precursor or stem cells comprise sufficient levels of oligonucleotide to reduce viability of a target cell. In an example, the target cell is a cancer cell. Accordingly, in an example, modified mesenchymal lineage precursor or stem cells comprise sufficient levels of oligonucleotide to reduce viability of a cancer cell. In an example, modified mesenchymal lineage precursor or stem cells comprise sufficient levels of inhibitory oligonucleotide to effect transfer of at least 0.25 nM of the inhibitory oligonucleotide to a target cell. In an example, modified mesenchymal lineage precursor or stem cells comprise sufficient levels of inhibitory oligonucleotide to effect transfer of at least 0.3 nM of the inhibitory oligonucleotide to a target cell. In an example, modified mesenchymal lineage precursor or stem cells comprise sufficient levels of inhibitory oligonucleotide to effect transfer of at least 0.4 nM of the inhibitory oligonucleotide to a target cell. In an example, modified mesenchymal lineage precursor or stem cells comprise sufficient levels of inhibitory oligonucleotide to effect transfer of at least 0.5 nM of the inhibitory oligonucleotide to a target cell. In an example, modified mesenchymal lineage precursor or stem cells comprise sufficient levels of inhibitory oligonucleotide to effect transfer of at least 1 nM of the inhibitory oligonucleotide to a target cell. In an example, modified mesenchymal lineage precursor or stem cells comprise sufficient levels of inhibitory oligonucleotide to effect transfer of at least 3 nM of the inhibitory oligonucleotide to a target cell. In another example, modified mesenchymal lineage precursor or stem cells comprise sufficient levels of inhibitory oligonucleotide to effect transfer of between 0.25 to 5 nM of the inhibitory oligonucleotide to a target cell. In another example, modified mesenchymal lineage precursor or stem cells comprise sufficient levels of inhibitory oligonucleotide to effect transfer of between 0.5 to 5 nM of the inhibitory oligonucleotide to a target cell. In another example, modified mesenchymal lineage precursor or stem cells comprise sufficient levels of inhibitory oligonucleotide to effect transfer of between 0.5 to 4 nM of the inhibitory oligonucleotide to a target cell. In another example, modified mesenchymal lineage precursor or stem cells comprise sufficient levels of inhibitory oligonucleotide to effect transfer of between 0.5 to 3.5 nM of the inhibitory oligonucleotide to a target cell.

In another example, modified mesenchymal lineage precursor or stem cells comprise at least 100 nM of inhibitory oligonucleotide. In another example, modified mesenchymal lineage precursor or stem cells comprise at least 200 nM of inhibitory oligonucleotide. In another example, modified mesenchymal lineage precursor or stem cells comprise at least 300 nM of inhibitory oligonucleotide. In another example, modified mesenchymal lineage precursor or stem cells comprise at least 400 nM of inhibitory oligonucleotide. In another example, modified mesenchymal lineage precursor or stem cells comprise at least 500 nM of inhibitory oligonucleotide. In another example, modified mesenchymal lineage precursor or stem cells comprise at least 600 nM of inhibitory oligonucleotide. In another example, modified mesenchymal lineage precursor or stem cells comprise at least 700 nM of inhibitory oligonucleotide. In another example, modified mesenchymal lineage precursor or stem cells comprise at least 1 µM of inhibitory oligonucleotide.

Delivery to Target Cells

The present inventors have identified that mesenchymal lineage precursor or stem cells can transfer nucleic acids to target cells. Accordingly, in an example, the present disclosure encompasses methods of delivering an above referenced nucleic acid to target cells by contacting them with mesenchymal lineage precursor or stem cells that have been modified to introduce an above referenced nucleic acid or vector expressing the same. For the avoidance of doubt the nucleic acid being delivered to a target cell is the nucleic acid introduced to the modified mesenchymal lineage precursor or stem cell.

The term "contacting" is used in the context of the present disclosure to refer to "direct" or "indirect" contact. "Direct contact" is used in the context of the present disclosure to refer to physical contact between the target cell and a modified mesenchymal lineage precursor or stem cell that facilitates transfer of a nucleic acid. For example, a target cell and a modified mesenchymal lineage precursor or stem cell can be in direct contact via a common connexin (i.e. a connexin that is expressed by both the target cell and the modified mesenchymal lineage precursor or stem cell). In this example, the common connexin facilitates transfer of the nucleic acid from the mesenchymal lineage precursor or stem cell to the target cell via a gap junction. Accordingly, in an example, contacting occurs under conditions permitting the mesenchymal lineage precursor or stem cell to form a gap junction with the target cell, whereby a nucleic acid is delivered to the target cell by traversing the gap junction. In an example, the gap junction is formed by Cx40. In another example, the gap junction is formed by Cx43. In another example, the gap junction is formed Cx45, Cx32 and/or Cx37.

"Indirect contact" is used in the context of the present disclosure to refer to delivery of a nucleic acid from a modified mesenchymal lineage precursor or stem cell to a target cell without direct contact. For example, a modified mesenchymal lineage precursor or stem cell in close proximity to a target cell may be in indirect contact with the target cell. In an example, a modified mesenchymal lineage precursor or stem cell in indirect contact with a target cell can deliver a nucleic acid to the target cell via exosomes.

In another example, a modified mesenchymal lineage precursor or stem cell in direct contact with a target cell can deliver a nucleic acid to the target cell via a common connexin and indirectly via exosomes.

Target cells receiving a nucleic acid from a modified mesenchymal lineage precursor or stem cell are not particularly limited so long as they can directly or indirectly contacted by the modified mesenchymal lineage precursor or stem cell to facilitate transfer of a nucleic acid. Exemplary target cells include cells in syncytial tissue. The term "syncytial" is used in the context of the present disclosure to refer to tissue that is made up of cells interconnected by specialized membrane with gap junctions, which are synchronized electrically in an action potential. Exemplary syncytial cells include cardiac myocytes, smooth muscle cells, epithelial cells, connective tissue cells and syncytial cancer cells. In an example, the target cell is an immune cell. For example, the target cell can be a white blood cell.

In an example, the target cell is a cancer cell. For example, the target cell can be a pancreatic cancer cell. In another example, the target cell can be a lung cancer cell. In another example, the target cell can be a cervical cancer cell. In another example, the target cell can be a colorectal cancer cell. In another example, the target cell can be a liver cancer cell. In another example, the target cell can be an bone cancer cell. In another example, the target cell can be an osteosarcoma cell. In another example, the target cell can be a prostate cancer cell. In another example, the target cell can be a melanoma cell.

In another example, a target cell has a common connexin with the modified mesenchymal lineage precursor or stem cell. In an example, a target cell expresses Cx40. In another example, a target cell expresses Cx43. In another example, a target cell expresses Cx45, Cx32 and/or Cx37.

Delivery of nucleic acids from a modified mesenchymal lineage precursor or stem cell to a target cell can be facilitated in vitro or in vivo. In an example, delivery of nucleic acids from a modified mesenchymal lineage precursor or stem cell to a target cell can be facilitated in vitro by co-culturing the modified mesenchymal lineage precursor or stem cell with the target cell. In an example, delivery of nucleic acids from a modified mesenchymal lineage precursor or stem cell to a target cell can be facilitated in vivo by administering the modified mesenchymal lineage precursor or stem cell to a subject. For example, mesenchymal lineage precursor or stem cells may be administered systemically, such as, for example, by intravenous, intraarterial, or intraperitoneal administration. The mesenchymal lineage precursor or stem cells may also be administered by intranasal, intramuscular or intracardiac administration. In an example, the mesenchymal lineage precursor or stem cells are administered to a site in close proximity to a target cell such as surrounding tissue. In another example, the mesenchymal lineage precursor or stem cells are administered directly into tissue comprising a target cell.

Method of Treatment

In one example, compositions according to the present disclosure can be administered for the treatment of a cancer. The term "cancer" refers to or describes the physiological condition in mammals that is typically characterized by unregulated cell growth. Examples of cancer include but are not limited to, carcinoma, lymphoma, blastoma, sarcoma, and leukemia or lymphoid malignancies. More particular examples of such cancers include, but are not limited to, squamous cell cancer (e.g., epithelial squamous cell cancer), lung cancer including small-cell lung cancer, non-small cell lung cancer, adenocarcinoma of the lung and squamous carcinoma of the lung, cancer of the peritoneum, hepatocellular cancer, gastric or stomach cancer including gastrointestinal cancer and gastrointestinal stromal cancer, pancreatic cancer, glioblastoma, cervical cancer, ovarian cancer, liver cancer, bladder cancer, cancer of the urinary tract, hepatoma, breast cancer, colon cancer, rectal cancer, colorectal cancer, endometrial or uterine carcinoma, salivary gland carcinoma, kidney or renal cancer, prostate cancer, vulval cancer, thyroid cancer, hepatic carcinoma, anal carcinoma, penile carcinoma, melanoma, superficial spreading melanoma, lentigo maligna melanoma, acral lentiginous melanomas, nodular melanomas, multiple myeloma and B-cell lymphoma (including low grade/follicular non-Hodgkin's lymphoma (NHL); small lymphocytic (SL) NHL; intermediate grade/follicular NHL; intermediate grade diffuse NHL; high grade immunoblastic NHL; high grade lymphoblastic NHL; high grade small non-cleaved cell NHL; bulky disease NHL; mantle cell lymphoma; AIDS-related lymphoma; and Waldenstrom's Macroglobulinemia); chronic lymphocytic leukemia (CLL); acute lymphoblastic leukemia (ALL); hairy cell leukemia; chronic myeloblastic leukemia; and post-transplant lymphoproliferative disorder (PTLD), as well as abnormal vascular proliferation associated with phakomatoses, edema (such as that associated with brain tumors), Meigs' syndrome, brain, as well as head and neck cancer, and associated metastases.

In an example, the cancer has the oncogenic G12D mutation in KRAS. Those of skill in the art will appreciate that the G12D mutation is a single nucleotide point mutation which is present in codon 12. For example, the cancer can be selected from the group consisting of colon cancer, lung cancer, melanoma, liver cancer and osteosarcoma, wherein the cancer, has the oncogenic G12D mutation in KRAS.

In an example, the cancer is pancreatic cancer. In another example, the cancer is lung cancer. In another example, the cancer is cervical cancer. In another example, the cancer is colorectal cancer. In another example, the cancer is liver cancer. In another example, the cancer is osteosarcoma. In another example, the cancer is prostate cancer. In another example, the cancer is melanoma.

In another example, cancer treated according to the present disclosure comprises cells that share a common connexin with a mesenchymal lineage precursor or stem cell according to the present disclosure. In this example, the common connexin facilitates transfer of the nucleic acid from the mesenchymal lineage precursor or stem cell to cancer cells.

In an example, the cancer comprises cells expressing Cx40. In another example, the cancer comprises cells expressing Cx43. In another example, the cancer comprises cells expressing Cx40 and Cx43.

Improved Preservation and/or Homing of Modified Mesenchymal Lineage Precursor or Stem Cells In one aspect, the mesenchymal lineage precursor or stem cells defined herein are treated in order to modify their cell-surface glycans. Modification of glycans on cell surface proteins such as CD44 has been shown to create E-selectin ligands which can bind to the E-selectin molecules expressed in vivo on microvessels at sites of inflammation. In this way, modification of cell-surface glycans on mesenchymal lineage precursor or stem cells improves homing of the mesenchymal lineage precursor or stem cells to sites of tissue damage in vivo.

The present inventors have also identified that glycosyltransferase mediated modification of cell-surface glycans improves cell viability post-cryopreservation (i.e. more cells are viable following a freeze-thaw cycle). Accordingly, in an example, the present disclosure encompasses a cryopreserved population of mesenchymal lineage precursor or stem cells that have been treated with a glycosyltransferase (E.C 2.4) under conditions that modified cell-surface glycans on the cells. In another example, the present disclosure encompasses a method of cryopreserving mesenchymal lineage precursor or stem cells, the method comprising: treating a population of mesenchymal lineage precursor or stem cells with a glycosyltransferase under conditions that result in modification of cell-surface glycans on the cells, and cryopreserving the cells in a composition. In another example, the present disclosure encompasses a method of producing therapeutic cells, the method comprising: treating a population of mesenchymal lineage precursor or stem cells with a glycosyltransferase under conditions that result in modification of cell-surface glycans on the cells, and cryopreserving the cells in a composition.

In an example, mesenchymal lineage precursor or stem cell "treatment" includes contacting the cells with a glycosyltransferase under conditions in which the glycosyltransferase has enzymatic activity. In this example, the glycosyltransferase modifies cell surface glycans on mesenchymal lineage precursor or stem cells. An example of cell surface glycan modification is fucosylation. In an example, CD44 is modified. In another example, CD14 is modified. In another example, one or more of CD44, CD14, CD3 and CD19 are modified.

In an example, surface glycan modification is identified using flow cytometry. In this example, modified mesenchymal lineage precursor or stem cells have a 1 log magnitude higher expression of a fucosylated cell surface glycan(s) than untreated mesenchymal lineage precursor cells. In another example, modified mesenchymal lineage precursor or stem cells have a 2 log magnitude higher expression of a fucosylated cell surface glycan(s) than untreated mesenchymal lineage precursor cells. In another example, modified mesenchymal lineage precursor or stem cells have a 3 log magnitude higher expression of a fucosylated cell surface glycan(s) than untreated mesenchymal lineage precursor cells. For example, modified mesenchymal lineage precursor or stem cells can have a 1 log magnitude higher expression of fucosylated CD14 than untreated mesenchymal lineage precursor cells. In another example, modified mesenchymal lineage precursor or stem cells have a 2 log magnitude higher expression of fucosylated CD14 than untreated mesenchymal lineage precursor cells. In another example, modified mesenchymal lineage precursor or stem cells have a 3 log magnitude higher expression of fucosylated CD14 than untreated mesenchymal lineage precursor cells.

In an example, the "treatment" includes contacting the mesenchymal lineage precursor or stem cells with a glycosyltransferase in the presence of a nucleotide sugar donor substrate. Suitable donor substrates include fucose, galactose, sialic acid, or N-acetyl glucosamine. For example, the substrate can be GDP-fucose.

For example, treatment can involve contacting a population of mesenchymal lineage precursor or stem cells with an exogenous glycosyltransferase such as a fucosyltransferase. In this example, a glycosyltransferase can be added to cell culture media or other physiologically acceptable solution comprising mesenchymal lineage precursor or stem cells. For example, mesenchymal lineage precursor or stem cells can be cultured in medium comprising a glycosyltransferase. In another example, mesenchymal lineage precursor or stem cells are suspended in culture medium comprising a glycosyltransferase. For example, mesenchymal linage precursor or stem cells can be dissociated from culture and resuspending in a suitable medium comprising a glycosyltransferase. In an example, cells can be dissociated using Ethylenediaminetetraacetic acid (EDTA). In another example, cells can be dissociated using a protease such as trypsin alone oFr in combination with EDTA.

In an example, the cell culture medium comprises at least 1.8 µg of glycosyltransferase. In another example, the cell culture medium comprises at least 2.0 µg of glycosyltransferase. In another example, the cell culture medium comprises at least 2.5 µg of glycosyltransferase. In another example, the cell culture medium comprises between 2 and 15 µg of glycosyltransferase. In another example, the cell culture medium comprises between 2 and 10 µg of glycosyltransferase. In another example, the cell culture medium comprises between 2 and 5 µg of glycosyltransferase. In an example, the cell culture medium comprises at least 1.8 µg of fucosyltransferase. In another example, the cell culture medium comprises at least 2.0 µg of fucosyltransferase. In another example, the cell culture medium comprises at least 2.5 µg of fucosyltransferase. In another example, the cell culture medium comprises between 2 and 15 µg of fucosyltransferase. In another example, the cell culture medium comprises between 2 and 10 µg of fucosyltransferase. In another example, between 2 and 5 µg of fucosyltransferase is added to the cell culture media. In these examples, the glycosyltransferase can be provided in 30 µl reaction volume to around $5 \times 10^5$ mesenchymal lineage precursor or stem cells.

For example, mesenchymal lineage precursor or stem cells can be treated with exogenous glycosyltransferase in a process known as exofucosylation. In this embodiment the glycosyltransferase may be provided in a physiologically acceptable solution that has low levels of divalent metal co-factors. In various embodiments, the physiologically acceptable solution is buffered. The physiologically acceptable solution may be, for example, Hank's Balanced Salt Solution, Dulbecco's Modified Eagle Medium, a Good's buffer (see N. E. Good, G. D. Winget, W. Winter, T N. Conolly, S. Izawa and R. M. M. Singh, Biochemistry 5, 467 (1966); N. E. Good, S. Izawa, Methods Enzymol. 24, 62 (1972) such as a HEPES buffer, a 2-Morpholinoethanesulfonic acid (IVIES) buffer, phosphate buffered saline (PBS).

In an example, the physiologically acceptable solution is substantially free of glycerol.

In another example, mesenchymal lineage precursor or stem cells are treated with a glycosyltransferase by modifying the cells to express a glycosyltransferase. For example, the glycosyltransferase can be generated intracellularly by the mesenchymal lineage precursor or stem cell. In this embodiment, a nucleic acid molecule(s) which encodes a glycosyltransferase is introduced into the mesenchymal lineage precursor or stem cell. The glycosyltransferase is then expressed by the mesenchymal lineage precursor or stem cells to effect modification of its surface glycans.

Mesenchymal lineage precursor or stem cells are considered "genetically modified to express a glycosyltransferase" when nucleic acid encoding a glycosyltransferase has been transferred into the cell by any suitable means of artificial manipulation, or where the cell is a progeny of an originally altered cell that carries the nucleic acid encoding the glycosyltransferase. Cells can be stably or transiently modified to express a glycosyltransferase.

In an example, expression of the glycosyltransferase in genetically modified mesenchymal lineage precursor or stem cells results in enhanced retention of the cells at a site of inflammation in vivo. For example, genetically modified mesenchymal lineage precursor or stem cells may be retained at a tumour or metastasis thereof. In another example, genetically modified mesenchymal lineage precursor or stem cells may be retained at a site of organ transplant rejection. In another example, genetically modified mesenchymal lineage precursor or stem cells may be retained at a site of injury such as an infarcted heart. Various methods are available for determining whether a genetically modified mesenchymal lineage precursor or stem cell is retained at a site of inflammation in vivo. In an example, cells are imaged in vivo using a radiotracer or other suitable label.

Mesenchymal lineage precursor or stem cells can be genetically modified using various methods known in the art. In an example, mesenchymal lineage precursor or stem cells are treated with a viral vector in vitro. Genetically modified viruses have been widely applied for the delivery of nucleic acids into cells. Exemplary viral vectors for genetic modification of the cells described herein include retroviral vectors such as gamma retroviral vectors, lentivirus, murine leukemia virus (MLV or MuLV), and adenovirus. For example, virus can be added to mesenchymal lineage precursor or stem cell culture medium. Non-viral methods may also be employed. Examples include plasmid transfer and the application of targeted gene integration through the use of integrase or transposase technologies, liposome or protein transduction domain mediated delivery and physical methods such as electroporation.

Efficiencies of genetic modification are rarely 100%, and it is usually desirable to enrich the population for cells that have been successfully modified. In an example, modified cells can be enriched by taking advantage of a functional feature of the new genotype. One exemplary method of enriching modified cells is positive selection using resistance to a drug such as neomycin or colorimetric selection based on expression of lacZ.

In various embodiments, the mesenchymal lineage precursor or stem cell is contacted with more than one glycosyltransferase and its appropriate donor substrate (e.g. sugar). For example, the cell is contacted with two glycosyltransferases simultaneously, or sequentially, each adding a distinct monosaccharide in appropriate linkage to the (extending) core glycan structure. In another example, genetically modified cells express two glycosyltransferases.

In one embodiment, treated mesenchymal lineage precursor or stem cells expresses CD44, e.g., alpha(2,3)sialyated CD44. In another embodiment, the mesenchymal lineage precursor or stem cell does not express CD34 or PSGL-1. In an example, treated mesenchymal lineage precursor or stem cell binds E-selectin and or L-selectin. In an example, the modified mesenchymal lineage precursor or stem cell does not bind P-selectin.

In another example, CD14 is fucosylated on treated mesenchymal lineage precursor or stem cells. In another example, CD14 and CD3 are fucosylated on treated mesenchymal lineage precursor or stem cells.

In one embodiment, the glycosyltransferase is capable of transferring 1.0 mmole of sugar per minute at pH 6.5 at 37° C.

In an example, the glycosyltransferase is a fucosyltransferase (catalyses transfer of L-fucose sugar). In another example, the glycosyltransferase is an alpha 1,3 fucosyltransferase, e.g., an alpha 1,3 fucosyltransferase III, alpha 1,3 fucosyltransferase IV, an alpha 1,3 fucosyltransferase VI, an alpha 1,3 fucosyltransferase VII, an alpha 1,3 fucosyltransferase IX, an alpha 1,3 fucosyltransferase X, an alpha 1,3 fucosyltransferase XI). For example, cells can be treated with alpha 1,3 fucosyltransferase VII. In another example, cells can be treated with alpha 1,3 fucosyltransferase VI. In these examples, fucosylation of mesenchymal lineage precursor or stem cells can be identified by detecting an increase in the ability of treated cells to bind to a selectin such as E-selectin and/or an increase in the reactivity of treated cells with an antibody known in the art to bind to sLeX including, but not limited to, the HECA-452.

In another example, the glycosyltransferase is a galactosyltransferase (catalyses the transfer of galactose). In another example, the glycosyltransferase is a sialyltransferase (catalyses the transfer of sialic acid).

Cellular Compositions

In performing the methods of the present disclosure mesenchymal lineage precursor or stem cells can be administered in the form of a composition.

Exemplary compositions according to the present disclosure can comprise mesenchymal lineage precursor or stem cells that have been modified to introduce an siRNA or a miRNA or a vector expressing the same. For example, a composition according to the present disclosure can comprise mesenchymal lineage precursor or stem cells that have been modified to introduce KIF11 siRNA, KRAS siRNA, PLK1 siRNA, a combination thereof or a vector expressing the same.

In an example, the composition comprises stem cells that have been modified to introduce KIF11 siRNA, wherein the KIF11 siRNA binds the KIF11 mRNA transcript between bp 800 and bp 3,600 from the 5' end. In another example, the composition comprises stem cells that have been modified to introduce KIF11 siRNA, wherein the siRNA binds the KIF11 mRNA transcript between bp 900 and bp 3,200 from the 5' end. In another example, the composition comprises stem cells that have been modified to introduce KIF11 siRNA, wherein the siRNA binds the KIF11 mRNA transcript between bp 900 and bp 2,500 from the 5' end. In another example, the composition comprises stem cells that have been modified to introduce KIF11 siRNA, wherein the siRNA binds the KIF11 mRNA transcript before bp 3,200 from the 5' end. In these examples, the KIF11 mRNA transcript is as shown in SEQ ID NO: 1 (NCBI reference number NM_004523.3).

In an example, the composition comprises stem cells that have been modified to introduce KIF11_4. In another example, the composition comprises stem cells that have been modified to introduce KIF11_6. In another example, the composition comprises stem cells that have been modified to introduce KIF11_9. In another example, the composition comprises stem cells that have been modified to introduce one or more of KIF11_8, KIF11_9, KIF11_6, KIF11_12, KIF11_7 or KIF11_4.

In another example, the composition comprises stem cells that have been modified to introduce one or more KIF11 siRNA, wherein the siRNA binds the KIF11 mRNA transcript between bp 800 and bp 4,800 from the 5' end. In another example, the composition comprises stem cells that have been modified to introduce one or more KIF11 siRNA, wherein the siRNA binds the KIF11 mRNA transcript between bp 900 and bp 4,800 from the 5' end. In another example, the composition comprises stem cells that have been modified to introduce one or more KIF11 siRNA, wherein the siRNA binds the KIF11 mRNA transcript before bp 3,600 from the 5' end. In another example, the composition comprises stem cells that have been modified to introduce one or more KIF11 siRNA, wherein the siRNA binds the KIF11 mRNA transcript after bp 3,600 from the 5' end. In another example, the composition comprises stem cells that have been modified to introduce one or more KIF11 siRNA, wherein the siRNA binds the KIF11 mRNA transcript after bp 4,000 from the 5' end. In another example, the KIF11 siRNA binds the KIF11 mRNA transcript between bp 3,600 and bp 5101 from the 5' end. In another example, the composition comprises stem cells that have been modified to introduce one or more KIF11 siRNA, wherein the siRNA binds the KIF11 mRNA transcript between bp 4,600 and bp 5101 from the 5' end.

In another example, the composition comprises stem cells that have been modified to introduce one or more of KIF11_8, KIF11_9, KIF11_6, KIF11_12, KIF11_7, KIF11_4, KIF11_15 or KIF11_13. In another example, the composition comprises stem cells that have been modified to introduce one or both of KIF11_15 or KIF11_13.

The sequence details for the above referenced KIF11 siRNA are shown above in Table 1.

In other examples, compositions according to the present disclosure can comprise mesenchymal lineage precursor or stem cells modified to introduce an above referenced miRNA, a combination thereof or a vector expressing the same. For example, compositions according to the present disclosure can comprise mesenchymal lineage precursor or stem cells modified to introduce hsa-miR-let7b, hsa-miR-155, hsa-miR-155-inh, hsa-miR-181-B1, hsa-miR-15a, hsa-miR-16-1, hsa-miR-21, hsa-miR-34a, hsa-miR-221, hsa-miR-29, a combination thereof or a vector expressing the same.

In another example, compositions according to the present disclosure can comprise mesenchymal lineage precursor or stem cells modified to introduce an inhibitory oligonucleotide or vector expressing the same that does not kill the mesenchymal lineage precursor or stem cells before they can deliver the at least one type of inhibitory oligonucleotide to a target cell such as a cancer cell.

In one example, such a composition comprises a pharmaceutically acceptable carrier and/or excipient.

The terms "carrier" and "excipient" refer to compositions of matter that are conventionally used in the art to facilitate the storage, administration, and/or the biological activity of an active compound (see, e.g., Remington's Pharmaceutical Sciences, 16th Ed., Mac Publishing Company (1980). A carrier may also reduce any undesirable side effects of the active compound. A suitable carrier is, for example, stable, e.g., incapable of reacting with other ingredients in the carrier. In one example, the carrier does not produce significant local or systemic adverse effect in recipients at the dosages and concentrations employed for treatment.

Suitable carriers for the present disclosure include those conventionally used, e.g., water, saline, aqueous dextrose, lactose, Ringer's solution, a buffered solution, hyaluronan and glycols are exemplary liquid carriers, particularly (when isotonic) for solutions. Suitable pharmaceutical carriers and excipients include starch, cellulose, glucose, lactose, sucrose, gelatin, malt, rice, flour, chalk, silica gel, magnesium stearate, sodium stearate, glycerol monostearate, sodium chloride, glycerol, propylene glycol, water, ethanol, and the like.

In another example, a carrier is a media composition, e.g., in which a cell is grown or suspended. Such a media composition does not induce any adverse effects in a subject to whom it is administered.

Exemplary carriers and excipients do not adversely affect the viability of a cell and/or the ability of a cell to treat or prevent disease.

In one example, the carrier or excipient provides a buffering activity to maintain the cells and/or soluble factors at a suitable pH to thereby exert a biological activity, e.g., the carrier or excipient is phosphate buffered saline (PBS). PBS represents an attractive carrier or excipient because it interacts with cells and factors minimally and permits rapid release of the cells and factors, in such a case, the composition of the disclosure may be produced as a liquid for direct application to the blood stream or into a tissue or a region surrounding or adjacent to a tissue, e.g., by injection.

The cellular compositions described herein may be administered alone or as admixtures with other cells. The cells of different types may be admixed with a composition of the disclosure immediately or shortly prior to administration, or they may be co-cultured together for a period of time prior to administration.

In one example, the composition comprises an effective amount or a therapeutically effective amount of cells. For example, the composition comprises about $1 \times 10^5$ cells to about $1 \times 10^9$ cells or about $1.25 \times 10^3$ cells to about $1.25 \times 10^7$ cells. The exact amount of cells to be administered is dependent upon a variety of factors, including the age, weight, and sex of the subject, and the extent and severity of the disorder being treated.

Exemplary dosages include at least about $1.2 \times 10^8$ to about $8 \times 10^{10}$ cells, such as between about $1.3 \times 10^8$ to about $8 \times 10^9$ cells, about $1.4 \times 10^8$ to about $8 \times 10^8$ cells, about $1.5 \times 10^8$ to about $7.2 \times 10^8$ cells, about $1.6 \times 10^8$ to about $6.4 \times 10^8$ cells, about $1.7 \times 10^8$ to about $5.6 \times 10^8$ cells, about $1.8 \times 10^8$ to about $4.8 \times 10^8$ cells, about $1.9 \times 10^8$ to about $4.0 \times 10^8$ cells, about $2.0 \times 10^8$ to about $3.2 \times 10^8$ cells, about $2.1 \times 10^8$ to about $2.4 \times 10^8$ cells. For example, a dose can include at least about $1.5 \times 10^8$ cells. For example, a dose can include at least about $2.0 \times 10^8$ cells.

Put another way, exemplary doses include at least about $1.5 \times 10^6$ cells/kg (80 kg subject). In an example, a dose can include at least about $2.5 \times 10^6$ cells/kg. In other examples, a dose can comprise between about $1.5 \times 10^6$ to about $1 \times 10^9$ cells/kg, about $1.6 \times 10^6$ to about $1 \times 10^8$ cells/kg, about $1.8 \times 10^6$ to about $1 \times 10^7$ cells/kg, about $1.9 \times 10^6$ to about $9 \times 10^6$ cells/kg, about $2.0 \times 10^6$ to about $8 \times 10^6$ cells/kg, about $2.1 \times 10^6$ to about $7 \times 10^6$ cells/kg, about $2.3 \times 10^6$ to about $6 \times 10^6$ cells/kg, about $2.4 \times 10^6$ to about $5 \times 10^6$ cells/kg, about $2.5 \times 10^6$ to about $4 \times 10^6$ cells/kg, about $2.6 \times 10^6$ to about $3 \times 10^6$ cells/kg.

In an example, modified mesenchymal lineage precursor or stem cells comprise at least about 5%, at least about 10%, at least about 15%, at least about 20%, at least about 25%, at least about 30%, at least about 35%, at least about 40%, at least about 45%, at least about 50%, at least about 55%, at least about 60%, at least about 65%, at least about 70%, at least about 75%, at least about 80%, at least about 85%, at least about 90%, at least about 95%, at least about 99% of the cell population of the composition.

Compositions of the disclosure may be cryopreserved. Cryopreservation of mesenchymal lineage precursor or stem cells can be carried out using slow-rate cooling methods or 'fast' freezing protocols known in the art. Preferably, the method of cryopreservation maintains similar phenotypes, cell surface markers and growth rates of cryopreserved cells in comparison with unfrozen cells.

The cryopreserved composition may comprise a cryopreservation solution. The pH of the cryopreservation solution is typically 6.5 to 8, preferably 7.4.

The cyropreservation solution may comprise a sterile, non-pyrogenic isotonic solution such as, for example, PlasmaLyte ATM. 100 mL of PlasmaLyte ATM contains 526 mg of sodium chloride, USP (NaCl); 502 mg of sodium gluconate (C6H11NaO7); 368 mg of sodium acetate trihydrate, USP (C2H3NaO2.3H2O); 37 mg of potassium chloride, USP (KCl); and 30 mg of magnesium chloride, USP (MgCl2.6H2O). It contains no antimicrobial agents. The pH is adjusted with sodium hydroxide. The pH is 7.4 (6.5 to 8.0).

The cryopreservation solution may comprise Profreeze™. The cryopreservation solution may additionally or alternatively comprise culture medium, for example, αMEM.

To facilitate freezing, a cryoprotectant such as, for example, dimethylsulfoxide (DMSO), is usually added to the cryopreservation solution. Ideally, the cryoprotectant should be nontoxic for cells and patients, nonantigenic, chemically inert, provide high survival rate after thawing and allow transplantation without washing. However, the most commonly used cryoprotector, DMSO, shows some cytotoxicity. Hydroxylethyl starch (HES) may be used as a substitute or in combination with DMSO to reduce cytotoxicity of the cryopreservation solution.

The cryopreservation solution may comprise one or more of DMSO, hydroxyethyl starch, human serum components and other protein bulking agents. In one example, the cryopreserved solution comprises about 5% human serum albumin (HSA) and about 10% DMSO. The cryopreservation solution may further comprise one or more of methycellulose, polyvinyl pyrrolidone (PVP) and trehalose.

In one embodiment, cells are suspended in 42.5% Profreeze™/50% αMEM/7.5% DMSO and cooled in a controlled-rate freezer.

The cryopreserved composition may be thawed and administered directly to the subject or added to another solution, for example, comprising hyaluronic acid. Alternatively, the cryopreserved composition may be thawed and the mesenchymal lineage precursor or stem cells resuspended in an alternate carrier prior to administration.

In an example, the cellular compositions described herein may be administered as a single dose. In another example, cellular compositions are administered over multiple doses. For example, at least 2, at least 3, at least 4, at least 5, at least 6, at least 7, at least 8, at least 9, at least 10 doses.

In one example, the mesenchymal lineage precursor or stem cells are isolated, or isolated and enriched, and culture expanded ex vivo or in vitro prior to cryopreservation. In another example, the mesenchymal lineage precursor or stem cells are isolated, or isolated and enriched, cryopreserved, thawed and subsequently culture expanded ex vivo or in vitro. In yet another example, the mesenchymal lineage precursor or stem cells are culture expanded prior to and after cryopreservation. For example, mesenchymal lineage precursor or stem cells can be defrosted and then culture expanded. Various methods of mesenchymal lineage precursor or stem cell culture are known in the art. In an example, mesenchymal lineage precursor or stem cells are culture expanded in a serum free medium prior to administration. For example, mesenchymal lineage precursor or stem cells can be passaged at least once, twice, three, four, five, six, seven, eight, nine, 10 or more times prior to administration.

Mesenchymal precursor cells may be administered systemically, such as, for example, by intravenous, intraarterial, or intraperitoneal administration. The mesenchymal precursor cells may also be administered by intranasal, intramuscular or intracardiac administration. In an example, the mesenchymal precursor cells are administered directly into a subject's tumour.

EXAMPLES

Example 1—Cellular Transfer of MiRs/siRNAs by Mesenchymal Precursor Cells

Figure 1B:
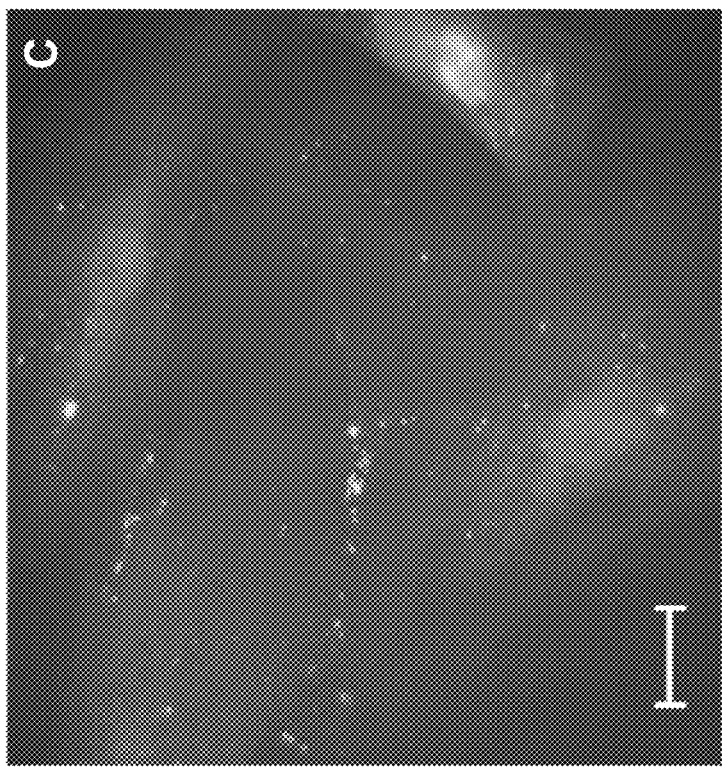
Figure 1B:
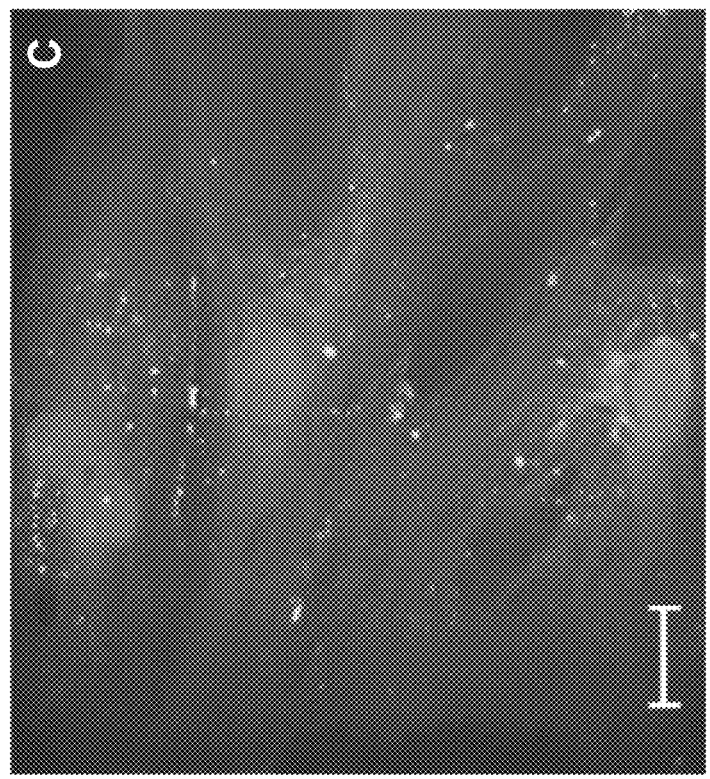
Figure 1B:
Figure 1B:

Human mesenchymal precursor cell (MPC) expression of connexins was assessed via Immunohistochemistry and Western Blot. Data generated demonstrate that MPCs express functional Cx43 and Cx40 and make functional gap junctions with target cell types that also express a common connexin (FIG. 1A). Human mesenchymal stem cell (MSC) expression of connexins was also assessed via Immunohistochemistry and Western Blot. Punctate Cx43 and Cx40 staining was observed on hMSCs (FIG. 1B). Functional gap junctions were also demonstrated in MPCs using patch clamp technique (FIG. 2). Various tumour cells also express Cx43 (FIG. 3) and Cx40 (data not shown).

MPC mediated delivery of nucleic acids to target cells via gap junctional transfer was investigated. Lipid based loading of MPCs was demonstrated with fluorescently labelled MiRs. High level intracellular loading of miRs and siRNAs was achieved using lipid based transection (Lipofectamine™; Thermo Fisher Scientific; FIG. 4).

Experiments were also conducted to show transfer of Mir16 to HeLa-Cx43 and PANC-1 tumour cells. MPCs transfected with Cy-5 Mir16 (Red; 100 nM) were co-cultured for 24 hours with GFP expressing HeLa-Cx43 and GFP-expressing PANC-1 cells. FIG. 5A shows transfer of the Cy-5-Mir16 to both the HeLa cells (A) and the PANC-1 cells (B). FIG. 5B shows transfer of KIF11 siRNA to GFP expressing PANC-1 cells.

Figure 6A:
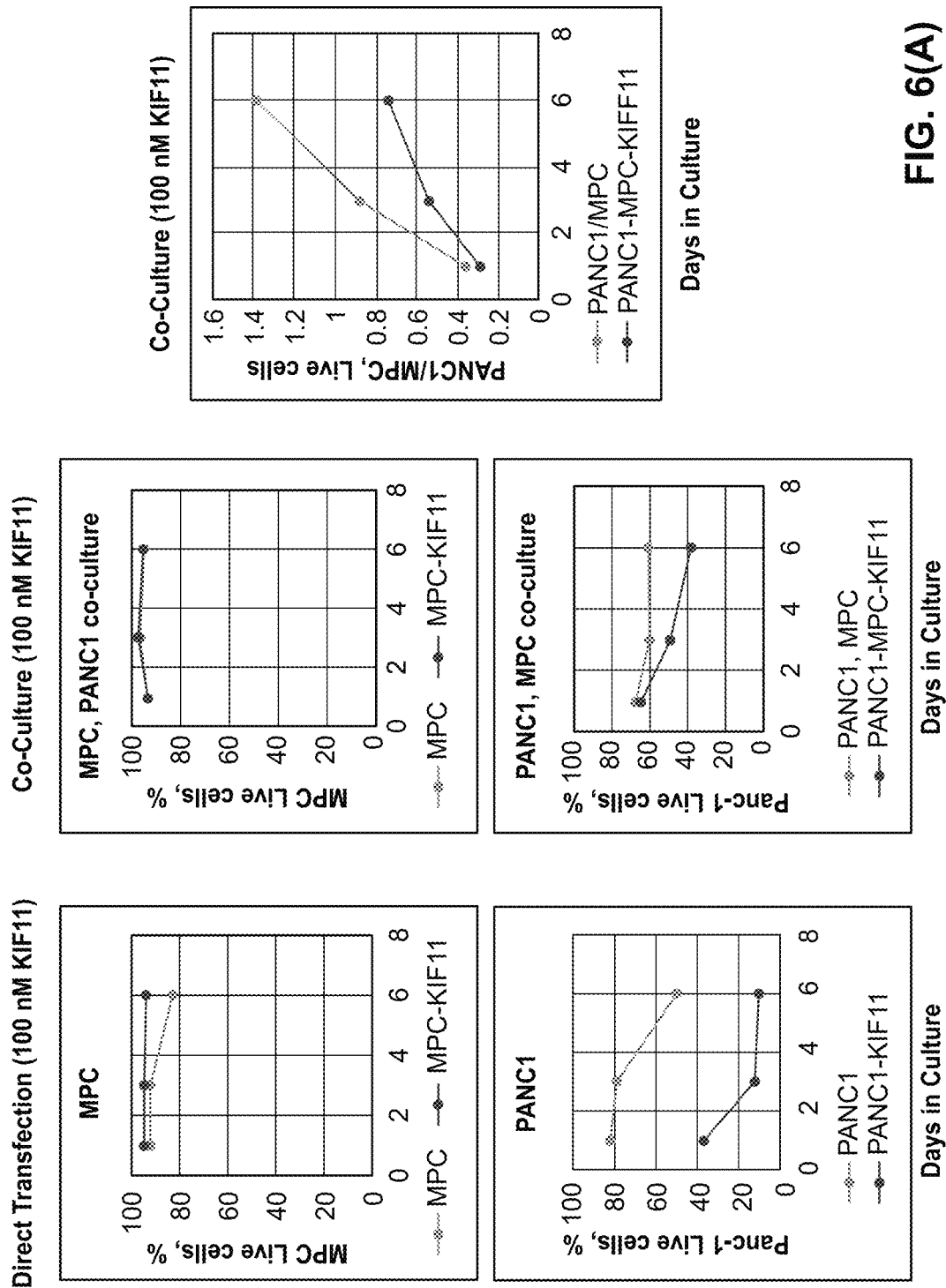
Figure 6B:
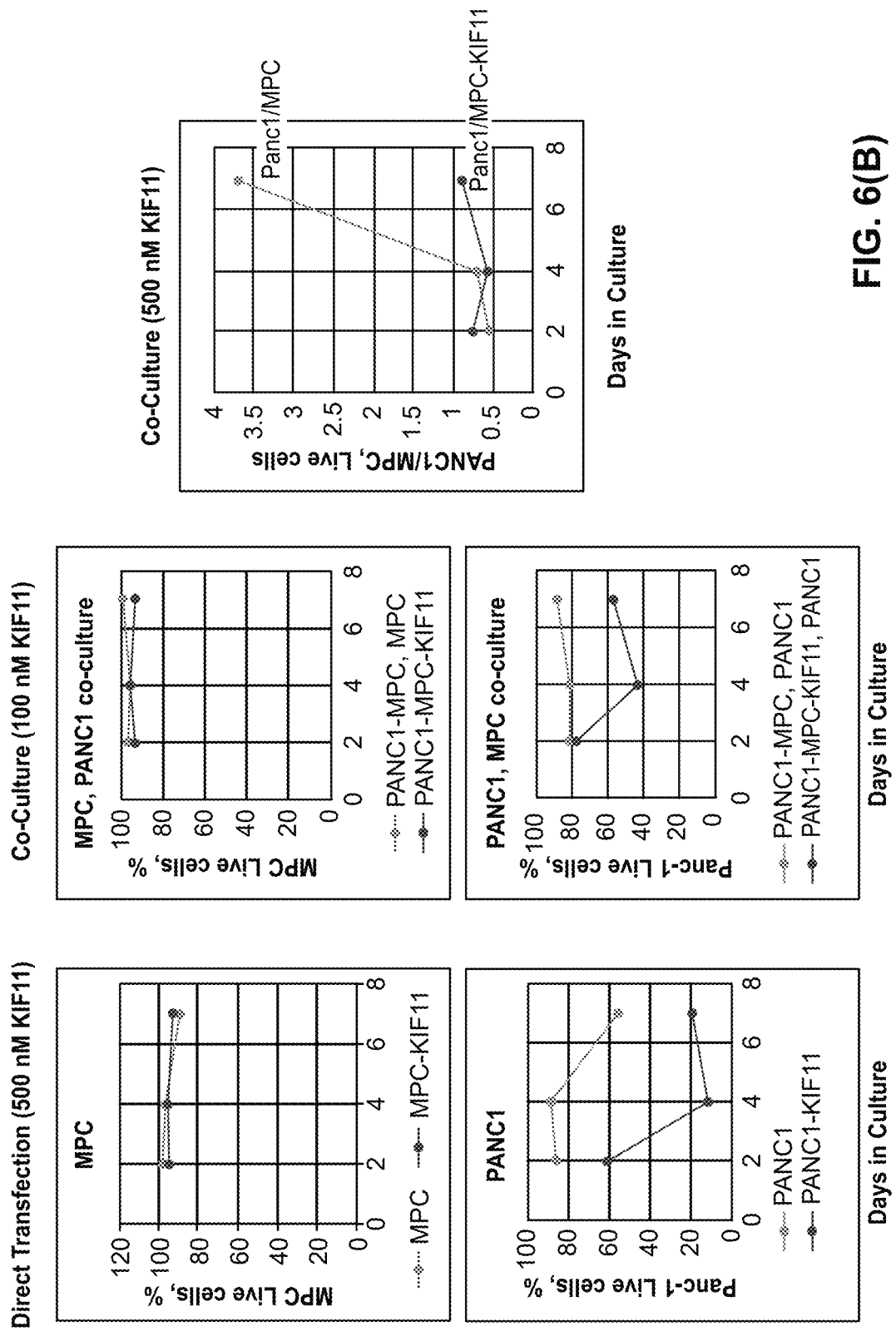

A co-culture assay was subsequently established to measure anti-proliferative and cytotoxic effects of MPC-loaded miRs and siRNAs on tumour cell lines. Results of co-culture of KIF11 siRNA loaded MPCs (100 nM) with PANC-1 are shown in FIG. 6A. Results of co-culture of KIF11 siRNA loaded MPCs (500 nM) with PANC-1 are shown in FIG. 6B. These results show that PANC-1 cell death is induced in the presence of KIF11 siRNA loaded MPCs (100 nM) and increased in the presence of a higher dose (500 nM) of KIF11 siRNA.

Results of co-culture of KIF11 siRNA loaded MPCs (500 nM) with SNUC2A cells are shown in FIG. 7. These results show that MPC transfer of KIF11 induces SNUC2A tumor cell death.

Results of co-culture of KIF11 siRNA loaded MPCs (500 nM) with SAOS2 cells are shown in FIGS. 8 (A) and (B). These results show that MPC transfer of KIF11 induces SAOS2 tumor cell death.

Co-culture of Mir-16 loaded MPCs (100 nM) with PANC-1 tumour cell lines also induced tumour cell death (FIG. 9A). Co-culture of Mir-16 loaded MPCs with unloaded MPCs inhibited MPC proliferation but did not significantly affect viability of unloaded MPCs (FIG. 9B).

CRISPR/CAS9 mediated knockout of Cx43 was subsequently performed in PANC-1 cells to assess the role of Gap junctions in the transfer of nucleic acids from MPCs to target cells.

Co-culture of let7b loaded MPCs (500 nM) with PANC-1 cells inhibited PANC-1 cell growth. However, growth of Cx43 knockout PANC-1 cells was not significantly affected when co-cultured with the let7b loaded MPCs, suggesting transfer of let7b is occurring through Cx43 (FIG. 10A). FIG. 10B shows that direct transfection of let7b in MPCs resulted in decreased cell proliferation but not increased cell death as is observed with the PANC-1 cells.

Co-culture of KIF11 siRNA loaded MPCs with PANC-1 cells induced cell death. Reduced levels of cell death were observed in Cx43 knockout PANC-1 cells when co-cultured with KIF11 siRNA loaded MPCs. However, MPC directed inhibition of cell growth was surprisingly maintained in Cx43 knockout PANC-1 cells (FIGS. 11A and 12). This suggests that transfer of the siRNA is occurring not only via connexin 43, but also through another mechanism such as, for example, a different connexin (e.g. Cx40, Cx45, Cx30.3, Cx31 or Cx31.1) or via formation of exosomes. FIG. 11B indicates that direct transfection of KIF11 siRNA in MPCs resulted in decreased cell proliferation but not increased cell death as is observed with the PANC-1 cells.

Co-culture of Mir-34a loaded MPCs with PANC-1 cells also induced cell death. Reduced levels of cell death were observed in Cx43 knockout PANC-1 cells when co-cultured with Mir-34a loaded MPCs. However, MPC directed inhibition of cell growth was surprisingly maintained in Cx43 knockout PANC-1 cells (FIG. 13A). Again, this suggests that transfer of the Mir-34a is occurring not only via connexin 43, but also through another mechanism such as, for example, a different connexin or via formation of exosomes. FIG. 13B indicates that direct transfection of Mir-34a in MPCs resulted in decreased cell proliferation but not increased cell death as is observed with the PANC-1 cells.

Effects of miRNAs and siRNAs on cell death and cell proliferation were assessed in MPCs, PANC-1, PC3 and SOAS2 cells. Cells were plated at ~25% confluency on 96-well or 3.5 cm cell culture plates and transfected with 100 nM siRNA or miR-mimic using Lipofectamine RNAiMax as a transfection reagent. Effects of hsa-miR-15A, hsa-miR-16-1, hsa-miR-34a, hsa-miR-155, hsa-let7b, hs_KIF11_4 siRNA and hs_PLK1_2 siRNA were assessed. Effects of siRNAs and miRNAs on cell death and cell growth were measured 5 days after transfection (FIGS. 14-17). Comparative analysis of cell death and WST Assays shown in FIGS. 18 and 19. These data show that transfected miRs and siRNAs can kill and/or inhibit growth of various cancer cells.

Example 2: In Vivo Efficacy of MPC Based Delivery of siRNA

Six mice were orthotopically implanted in the prostate with 0.5 million PC3 cells stably expressing luciferase, with or without 0.5 million MPC loaded with 500 nM siRNA against KIF 11 (24 hours prior). Volume of the injections was 60 ul in PBS. One week later, mice were injected with lucifern and then imaged with the IVIS imaging system to visualise the tumors (FIGS. 20 A and B). Thirty five days later, MPC-treated mice were injected with 1 million MPC loaded with 500 nM siRNA against KIF11. Control mice were injected with saline. As shown in FIG. 20C, median survival times were 38 days for the control group and 57 days for the MPC-treated group, P=0.0067 (Log-Rank test).

These results show that KIF11 loaded MPCs significantly increased survival time in a mouse PC3 prostate xenograft tumour model.

Example 3: MPC Based Delivery of siRNA and Dose Dependent Reduction in Cell Viability PANC-1 cells were co-cultured with KIF11 siRNA loaded MPCs (500 nM KIF11). Co-culture for 6 days reduced viability of PANC-1 cells by 77% (FIG. 21). About an 80% decrease in cell growth rate was also observed (FIG. 22).

PANC-1 cells were then directly transfected with increasing amounts of KIF11 siRNA (0-3.3 nM). Viability of PANC-1 cells was measured 6 days after transfection. A dose dependent reduction in cell viability was observed following direct transfection (FIG. 23). Notably, maximum reduction in PANC-1 viability at 3.3 nM was 76%, similar to that seen after co-culture with 500 nM-transfected MPC. As shown in FIGS. 6(a) and 6(b), MPCs transfected with 500 nM KIF11 siRNA inhibited PANC-1 proliferation by more than 30% relative to MPCs transfected with 100 nM KIF11 siRNA. These results are consistent with a step-wise inhibition of PANC-1 viability by MPCs transfected with concentrations of KIF11 siRNA from 100 to 500 nM. Since the effect of direct oligonucleotide inhibition of PANC-1 viability was reduced by approximately 30% from 3.3 to 0.5 nM, we conclude that MPC mediated transfer of the oligonucleotide to target tumour cells occurs at sufficient levels to result in a concentration of oligonucleotide inside the tumour cell of 0.5-3.3 nM.

In a further experiment, cultures of MPC or PANC-1 cells were directly transfected with increasing amounts of KIF11 siRNA (0-500 nM). Dose response curves for PANC-1 cells are shown in FIG. 24 and MPCs in FIG. 25.

Figure 27:
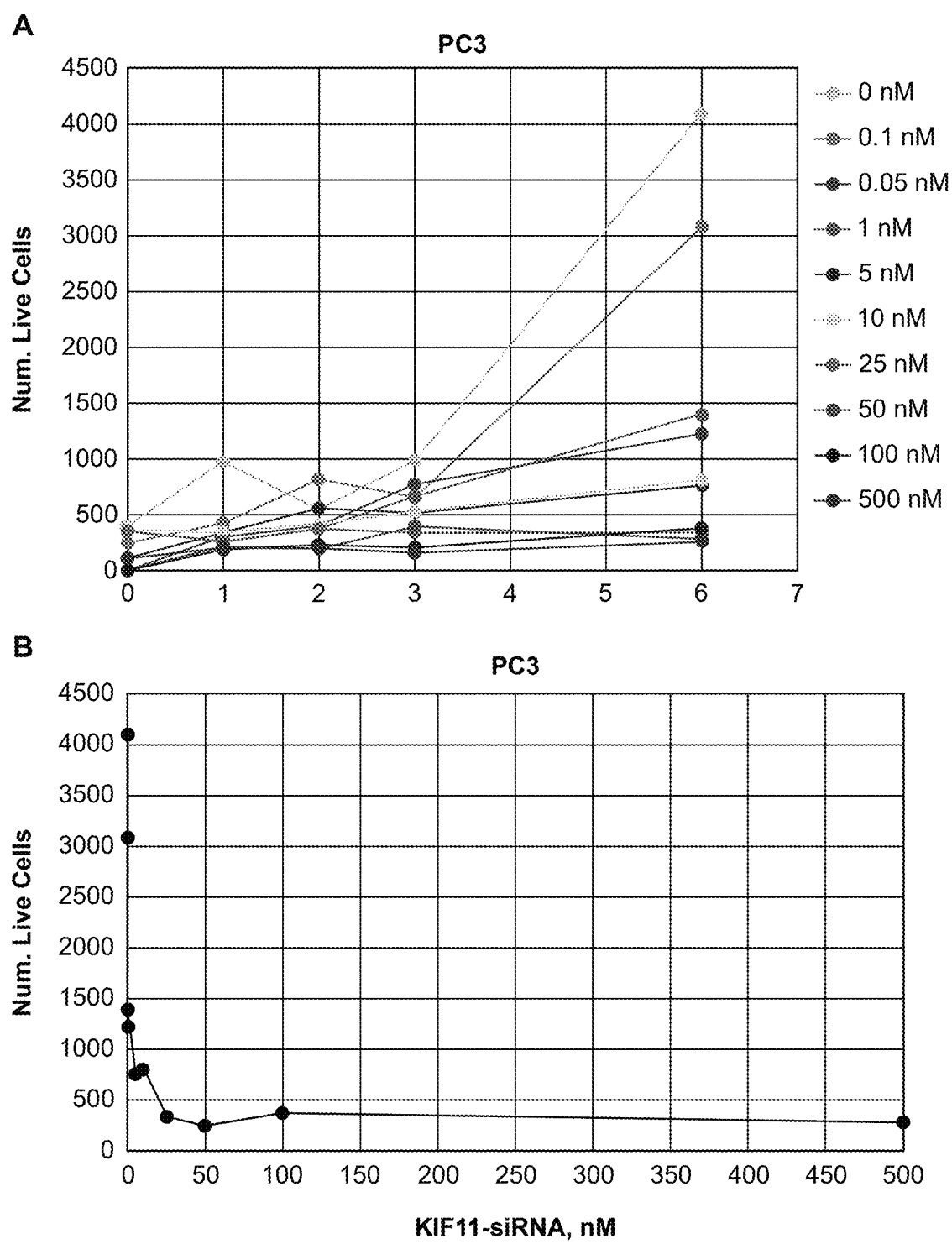

PC3 cells were also co-cultured with KIF11 siRNA loaded MPCs (500 nM KIF11). Co-culture for 6 days reduced cell growth rate by around 55% (FIG. 26). PC3 cells were then directly transfected with increasing amounts of KIF11 siRNA (0-500 nM). Dose response curves are shown in FIG. 27.

Example 4: MPC Loading and Viability

MPCs from three donors were transfected with KIF11-FITC-siRNA (0-1000 nM) using lipofectamine RNAiMax transfection reagent (15 µl/well). Accumulation of florescent label in MPCs 24 hours post transfection was then assayed by flow cytometry (FIG. 28). The optimal concentration for siRNA loading into MPCs was determined to be ~500 nM.

MPCs loaded with KIF11-FITC-siRNA were then co-cultured with PANC-1 or PC3 cells. Transfer of siRNA from MPCs loaded with KIF11-FITC-siRNA to cancer cells was measured 24 hours after co-culture. Within 24 hours, approximately 10% of siRNA was transferred to cancer cells with transfer showing little variability with respect to MPC donor (FIG. 29).

MPCs and PANC-1 cells were then cultured in 6 well plates at $1.3 \times 10^5$ cells/well. Cells were transfected with siRNA at different concentrations (0-500 nM final) using lipofectamine RNAiMax transfection reagent (15 µl/well). RNA was harvested from cells 2 days post-transfection and gene expression was assessed using qRT-PCR (Taqman gene expression assays; Applied Biosystems; s03929097_g1 for housekeeping gene glyceraldehyde-3-phosphate dehydrogenase (GAPDH) and Hs00189698_m1 for KIF11). FIGS. 30 and 31 shows that KIF11 siRNA species retain their function in MPC and tumour cells (i.e. siRNA that is transfected into and transferred from MPCs to tumour cells is able to reduce KIF11 mRNA).

Example 5: Effects of KIF11 siRNAs on MPC and Tumor Cell Viability

MPC, SJSA1, PANC-1, PC3, SAOS2 and SNUC2a cells were plated at 25-50% confluency in 96 well plates (n=3 wells per treatment group). Cells were transfected with 100 nM of either KIF11 siRNA or control siRNA (Lipofectamine; RNAiMax; siRNA sequence details shown above in Table 1; KIF11 sequence target summarized in FIG. 32). Cell viability was measured 5 days post transfection and viability data was normalized using control cell data (FIG. 33). Surprisingly, KIF11 siRNA targeted towards 5' end of the KIF11 mRNA transcript had greater effect of reducing tumour cell viability, in particular in PANC-1 and SAOS2 lines. For example, KIF11_13 and KIF11_15 which target the 3' end of KIF11 mRNA transcript had relatively low effect on tumor cell viability compared to other KIF11 siRNA tested (FIG. 33). It was also surprising to note that KIF11_4, KIF11_6 and KIF11_9 siRNAs consistently reduced tumor cell viability while having minimal effect on MPC viability (FIG. 33).

Example 6: Effects of KIF11 siRNAs on Gene Expression in MPCs and MSCs

MPCs and MSCs were plated in 6 well plates at $1.25 \times 10^6$ cells/well and transfected with KIF11 siRNA (100 nM) using lipofectamine. Control cells were treated with lipofectamine alone. RNA was harvested 48 hours after cell treatment and global gene expression was analysed using human Clariom S Assay (Affymetrix). Gene expression analysis indicated that MPCs and MSCs are similar in regards to genes that are downregulated by the KIF-11 siRNA (FIG. 34; top 10 down regulated genes). KIF11 siRNA reduced KIF11 mRNA levels around 18 fold in MPCs and around 20 fold in MSCs. Looking at the top 10 downregulated genes, FSTL1:MIR198, ALDH9A1, ELK3 & SYPL1 mRNAs were also reduced in both MPCs and MSCs. Taken together with the findings outlined above, in particular Example 1 which notes that both MPCs and MSCs express Cx43 and Cx40, the gene expression analysis further supports that both MPCs and MSCs can be used as vehicles for oligonucleotide transfer to cancer cells.

It will be appreciated by persons skilled in the art that numerous variations and/or modifications may be made to the disclosure as shown in the specific embodiments without departing from the spirit or scope of the disclosure as broadly described. The present embodiments are, therefore, to be considered in all respects as illustrative and not restrictive.

The present application claims priority from 62/589,764 filed 22 Nov. 2017, the disclosures of which are incorporated herein by reference.

All publications discussed above are incorporated herein in their entirety.

Any discussion of documents, acts, materials, devices, articles or the like which has been included in the present specification is solely for the purpose of providing a context for the present disclosure. It is not to be taken as an admission that any or all of these matters form part of the prior art base or were common general knowledge in the field relevant to the present disclosure as it existed before the priority date of each claim of this application.

REFERENCES

Ausubel et al. (editors) (1988, including all updates until present) Current Protocols in Molecular Biology, Greene Pub. Associates and Wiley-Interscience.
Bader et al. (2011) Gene Ther. 18:1121-6.
Brown T A (editor) (1991) Essential Molecular Biology: A Practical Approach, Volumes 1 and 2, IRL Press.
Coligan et al. (editors) (including all updates until present) Current Protocols in Immunology, John Wiley & Sons.
Glover and Hames (editors) (1995 & 1996) DNA Cloning: A Practical Approach, Volumes 1-4, IRL Press.
Griffiths-Jones, S. 2004 Nucl Acids Res, 32, D109-D111.
Harlow and Lane (editors) (1988) Antibodies: A Laboratory Manual, Cold Spring Harbour Laboratory.
Kozomara et al. 2013; Nucl Acids Res, 42, D68-D73.
Lennox and Behlke (2011) Gene Ther. 18"1111-20.
Perbal J (1984) A Practical Guide to Molecular Cloning, John Wiley and Sons. Sambrook et al., (1989) Molecular Cloning: A Laboratory Manual, Cold Spring Harbour Laboratory Press.
Simmons & Torok-Storb (1991) Blood. 78:55-62

The invention claimed is:

1. A method of treating a cancer in a subject, the method comprising administering to the subject a composition comprising mesenchymal precursor cells (MPCs) or mesenchymal stem cells (MSCs), wherein said MPCs or MSCs comprise an siRNA to KRAS G12D and contact target cancer cells in the subject, whereby the MPCs or MSCs form gap junctions with the contacted target cancer cells, and wherein said cancer comprises an oncogenic G12D mutation in KRAS.

2. The method of claim 1, wherein the composition comprises MPCs.

3. The method of claim 2, wherein the MPCs express tissue non-specific alkaline phosphatase (TNAP).

4. The method of claim 1, wherein the cancer is prostate cancer.

5. The method of claim 1, wherein the cancer is a pancreatic cancer or a colorectal cancer.

6. The method of claim 1, wherein the MPCs or MSCs are culture-expanded.

7. The method of claim 1, wherein the MPCs or MSCs are derived from pluripotent cells.

8. The method of claim 1, wherein the target cancer cells are non-syncytial cancer cells.

9. The method of claim 1, wherein the target cancer cells are syncytial cells.

10. The method of claim 1, wherein the MPCs or MSCs express a viral vector.

* * * * *

SEQUENCE LISTING

```
<160> NUMBER OF SEQ ID NOS: 9

<210> SEQ ID NO 1
<211> LENGTH: 5101
<212> TYPE: DNA
<213> ORGANISM: Homo sapiens

<400> SEQUENCE: 1
agcgcagcca ttggtccggc tactctgtct cttttcaaa ttgaggcgcc gagtcgttgc      60
ttagtttctg gggattcggg cggagacgag attagtgatt tggcggctcc gactggcgcg     120
ggacaaacgc cacggccaga gtaccgggta gagagcgggg acgccgacct gcgtgcgtcg     180
gtcctccagg ccacgccagc gcccgagagg gaccaggag actccggccc ctgtcggccg     240
ccaagcccct ccgcccctca cagcgcccag gtccgcggcc gggccttgat tttttggcgg     300
ggaccgtcat ggcgtcgcag ccaaattcgt ctgcgaagaa gaaagaggag aagggggaaga    360 acatccaggt ggtggtgaga tgcagaccat ttaatttggc agagcggaaa gctagcgccc     420
attcaatagt agaatgtgat cctgtacgaa aagaagttag tgtacgaact ggaggattgg     480
ctgacaagag ctcaaggaaa acatacactt ttgatatggt gtttggagca tctactaaac     540
agattgatgt ttaccgaagt gttgtttgtc caattctgga tgaagttatt atgggctata     600
attgcactat ctttgcgtat ggccaaactg gcactggaaa aactttaca atggaaggtg      660 aaaggtcacc taatgaagag tatacctggg aagaggatcc cttggctggt ataattccac     720 gtaccccttca tcaaattttt gagaaactta ctgataatgg tactgaattt tcagtcaaag     780
tgtctctgtt ggagatctat aatgaagagc tttttgatct tcttaatcca tcatctgatg     840
tttctgagag actacagatg tttgatgatc cccgtaacaa gagaggagtg ataattaaag     900
gtttagaaga aattacagta cacaacaagg atgaagtcta tcaaatttta gaaaaggggg     960
cagcaaaaag gacaactgca gctactctga tgaatgcata ctctagtcgt tcccactcag    1020
ttttctctgt tacaatacat atgaaagaaa ctacgattga tggagaagag cttgttaaaa    1080
tcggaaagtt gaacttggtt gatcttgcag gaagtgaaaa cattggccgt tctggagctg    1140
ttgataagag agctcgggaa gctggaaata taaatcaatc cctgttgact ttgggaaggg    1200
tcattactgc ccttgtagaa agaacacctc atgttcctta tcgagaatct aaactaacta    1260
gaatcctcca ggattctctt ggagggcgta caagaacatc tataattgca acaatttctc    1320
ctgcatctct caatcttgag gaaactctga gtacattgga atatgctcat agagcaaaga    1380
acatattgaa taagcctgaa gtgaatcaga aactccaccaa aaaagctctt attaaggagt    1440
atacggagga gatagaacgt ttaaaacgag atcttgctgc agcccgtgag aaaaatggag    1500
tgtatatttc tgaagaaaat tttagagtca tgagtggaaa attaactgtt caagaagagc    1560
```

-continued

```
agattgtaga attgattgaa aaaattggtg ctgttgagga ggagctgaat agggttacag    1620
agttgtttat ggataataaa aatgaacttg accagtgtaa atctgacctg caaaataaaa    1680
cacaagaact tgaaaccact caaaaacatt tgcaagaaac taaattacaa cttgttaaag    1740
aagaatatat cacatcagct ttggaaagta ctgaggagaa acttcatgat gctgccagca    1800
agctgcttaa cacagttgaa gaaactacaa aagatgtatc tggtctccat tccaaactgg    1860
atcgtaagaa ggcagttgac caacacaatg cagaagctca ggatattttt ggcaaaaacc    1920
tgaatagtct gtttaataat atggaagaat taattaagga tggcagctca aagcaaaagg    1980
ccatgctaga agtacataag accttatttg gtaatctgct gtcttccagt gtctctgcat    2040
tagataccat tactacagta gcacttggat ctctcacatc tattccagaa aatgtgtcta    2100
ctcatgtttc tcagattttt aatatgatac taaaagaaca atcattagca gcagaaagta    2160
aaactgtact acaggaattg attaatgtac tcaagactga tcttctaagt tcactggaaa    2220
tgattttatc cccaactgtg gtgtctatac tgaaaatcaa tagtcaacta agcatatttt    2280
tcaagacttc attgacagtg gccgataaga tagaagatca aaaaaaggaa ctagatggct    2340
ttctcagtat actgtgtaac aatctacatg aactacaaga aataccattt gttccttgg     2400 ttgagtcaca aaagcaatgt ggaaacctaa ctgaagacct gaagacaata aagcagaccc    2460
attcccagga actttgcaag ttaatgaatc tttggacaga gagattctgt gctttggagg    2520
aaaagtgtga aaatatacag aaaccactta gtagtgtcca ggaaaatata cagcagaaat    2580
ctaaggatat agtcaacaaa atgactttte acagtcaaaa attttgtgct gattctgatg    2640
gcttctcaca ggaactcaga aattttaacc aagaaggtac aaaattggtt gaagaatctg    2700
tgaaacactc tgataaactc aatggcaacc tggaaaaaat atctcaagag actgaacaga    2760
gatgtgaatc tctgaacaca agaacagttt attttctga acagtgggta tcttccttaa     2820
atgaaaggga acaggaactt cacaacttat tggaggttgt aagccaatgt tgtgaggctt    2880
caagttcaga catcactgag aaatcagatg gacgtaaggc agctcatgag aaacagcata    2940
acatttttct tgatcagatg actattgatg aagataaatt gatagcacaa aatctagaac    3000
ttaatgaaac cataaaaatt ggtttgacta agcttaattg ctttctggaa caggatctga    3060
aactggatat cccaacaggt acgacaccac agaggaaaag ttatttatac ccatcaacac    3120
tggtaagaac tgaaccacgt gaacatctcc ttgatcagct gaaaaggaaa cagcctgagc    3180
tgttaatgat gctaaactgt tcagaaaaca caaagaaga gacaattccg gatgtggatg     3240
tagaagaggc agttctgggg cagtatactg aagaacctct aagtcaagag ccatctgtag    3300
atgctggtgt ggattgttca tcaattggcg gggttccatt tttccagcat aaaaaatcac    3360
atggaaaaga caaagaaaac agaggcatta acacactgga gaggtctaaa gtggaagaaa    3420
ctacagagca cttggttaca aagagcagat tacctctgcg agcccagatc aacctttaat    3480
tcacttgggg gttggcaatt ttatttttaa agaaaactta aaaataaaac ctgaaccccc    3540
agaacttgag ccttgtgtat agattttaaa agaatatata tatcagccgg gcgcggtggc    3600
tcatgcctgt aatcccagca ctttgggagg ctgaggcggg tggattgctt gagcccagga    3660
gtttgagacc agcctggcca acgtggcaaa acctcgtctc tgttaaaaat agccgggcg    3720 tggtggcaca ctcctgtaat cccagctact ggggaggctg aggcacgaga atcacttgaa    3780
cccaggaagc ggggttgcag tgagccaaag gtacaccact acactccagc ctgggcaaca    3840
gagcaagact cggtctcaaa aacaaaattt aaaaagata taaggcagta ctgtaaattc     3900
agttgaattt tgatatctac ccatttttct gtcatcccta tagttcactt tgtattaaat    3960
```

```
tgggtttcat ttgggatttg caatgtaaat acgtatttct agttttcata taaagtagtt    4020
cttttataac aaatgaaaag tattttttctt gtatattatt aagtaatgaa tatataagaa    4080
ctgtactctt ctcagcttga gcttacatag gtaaatatca ccaacatctg tccttagaaa    4140
ggaccatctc atgttttttt tcttgctatg acttgtgtat tttcttgcat cctccctaga    4200
cttccctatt tcgctttctc ctcggctcac tttctccctt tttattttc accaaaccat     4260 ttgtagagct acaaaaggta tcctttctta ttttcagtag tcagaatttt atctagaaat    4320
cttttaacac cttttttagtg gttatttcta aaatcactgt caacaataaa tctaaccta     4380 gttgtatccc tcctttcagt attttcact tgttgcccca aatgtgaaag catttcattc     4440
ctttaagagg cctaactcat tcaccctgac agagttcaca aaaagcccac ttaagagtat    4500
acattgctat tatgggagac cacccagaca tctgactaat ggctctgtgc ccacactcca    4560
agacctgtgc cttttagaga agctcacaat gatttaagga ctgtttgaaa cttccaatta    4620
tgtctataat ttatattctt ttgtttacat gatgaaactt tttgttgttg cttgtttgta    4680
tataatacaa tgtgtacatg tatcttttc tcgattcaaa tcttaaccct taggactctg     4740 gtattttga tctggcaacc atatttctgg aagttgagt gtttcagctt gaagaaccaa       4800
aacagaagga atatgtacaa agaataaatt ttctgctcac gatgagttta gtgtgtaaag    4860
tttagagaca tctgactttg atagctaaat taaaccaaac cctattgaag aattgaatat    4920
atgctacttc aagaaactaa attgatctcg tagaattatc ttaataaaat aatggctata    4980
atttctctgc aaaatcagat gtcagcataa gcgatggata atacctaata aactgccctc    5040
agtaaatcca tggttaataa atgtggtttc tacattaaaa aaaaaaaaa aaaaaaaaaa     5100 a                                                                    5101

<210> SEQ ID NO 2
<211> LENGTH: 21
<212> TYPE: DNA
<213> ORGANISM: Artificial Sequence
<220> FEATURE:
<223> OTHER INFORMATION: Synthetic Sequence

<400> SEQUENCE: 2
ctcgggaagc tggaaatata a                                              21

<210> SEQ ID NO 3
<211> LENGTH: 21
<212> TYPE: DNA
<213> ORGANISM: Artificial Sequence
<220> FEATURE:
<223> OTHER INFORMATION: Synthetic Sequence

<400> SEQUENCE: 3
gagggcgtac aagaacatct a                                              21

<210> SEQ ID NO 4
<211> LENGTH: 21
<212> TYPE: DNA
<213> ORGANISM: Artificial Sequence
<220> FEATURE:
<223> OTHER INFORMATION: Synthetic Sequence

<400> SEQUENCE: 4
acggaggaga tagaacgttt a                                              21

<210> SEQ ID NO 5
```

```
<211> LENGTH: 21
<212> TYPE: DNA
<213> ORGANISM: Artificial Sequence
<220> FEATURE:
<223> OTHER INFORMATION: Synthetic Sequence

<400> SEQUENCE: 5
caggaattga ttaatgtact c                                              21

<210> SEQ ID NO 6
<211> LENGTH: 21
<212> TYPE: DNA
<213> ORGANISM: Artificial Sequence
<220> FEATURE:
<223> OTHER INFORMATION: Synthetic Sequence

<400> SEQUENCE: 6
gccgataaga tagaagatca a                                              21

<210> SEQ ID NO 7
<211> LENGTH: 21
<212> TYPE: DNA
<213> ORGANISM: Artificial Sequence
<220> FEATURE:
<223> OTHER INFORMATION: Synthetic Sequence

<400> SEQUENCE: 7
ctagatggct ttctcagtat a                                              21

<210> SEQ ID NO 8
<211> LENGTH: 21
<212> TYPE: DNA
<213> ORGANISM: Artificial Sequence
<220> FEATURE:
<223> OTHER INFORMATION: Synthetic Sequence

<400> SEQUENCE: 8
cagcttgagc ttacataggt a                                              21

<210> SEQ ID NO 9
<211> LENGTH: 21
<212> TYPE: DNA
<213> ORGANISM: Artificial Sequence
<220> FEATURE:
<223> OTHER INFORMATION: Synthetic Sequence

<400> SEQUENCE: 9
taagcgatgg ataataccta a                                              21
```